US012223006B2

(12) United States Patent
Kurahashi et al.

(10) Patent No.: US 12,223,006 B2
(45) Date of Patent: Feb. 11, 2025

(54) INFORMATION PROCESSING APPARATUS, TERMINAL APPARATUS, INFORMATION PROCESSING METHOD, AND RECORDING MEDIUM

(71) Applicant: PLAID, INC., Tokyo (JP)

(72) Inventors: Kenta Kurahashi, Tokyo (JP); Yuuki Makino, Tokyo (JP); Atsushi Fujikawa, Tokyo (JP); Kazuki Takahashi, Tokyo (JP)

(73) Assignee: PLAID, INC., Tokyo (JP)

( * ) Notice: Subject to any disclaimer, the term of this patent is extended or adjusted under 35 U.S.C. 154(b) by 39 days.

(21) Appl. No.: 17/787,856

(22) PCT Filed: Dec. 14, 2020

(86) PCT No.: PCT/JP2020/046503
§ 371 (c)(1),
(2) Date: Jun. 21, 2022

(87) PCT Pub. No.: WO2021/131843
PCT Pub. Date: Jul. 1, 2021

(65) Prior Publication Data
US 2023/0030513 A1 Feb. 2, 2023

(30) Foreign Application Priority Data
Dec. 23, 2019 (JP) ................................ 2019-231531

(51) Int. Cl.
*G06F 16/93* (2019.01)
*G06F 16/957* (2019.01)
*G06F 16/958* (2019.01)

(52) U.S. Cl.
CPC ........ *G06F 16/9577* (2019.01); *G06F 16/972* (2019.01)

(58) Field of Classification Search
CPC .. G06F 16/9577; G06F 16/972; G06F 16/955; G06F 13/00
See application file for complete search history.

(56) References Cited

U.S. PATENT DOCUMENTS

2013/0301820 A1* 11/2013 Williams .......... H04M 3/42195 379/201.01
2016/0140622 A1* 5/2016 Wang .................... G06Q 50/01 705/14.66

(Continued)

FOREIGN PATENT DOCUMENTS

JP 2001-337983 A 12/2001
JP 2002-183155 A 6/2002

(Continued)

OTHER PUBLICATIONS

International Search Report dated Feb. 16, 2021 issued in International Patent Application No. PCT/JP2020/046503, with English translation.

(Continued)

*Primary Examiner* — Keith D Bloomquist
(74) *Attorney, Agent, or Firm* — Rimon P.C.

(57) ABSTRACT

An information processing apparatus stores management information each having user specifying information and page specifying information. The apparatus includes an access information receiving unit that receives access information having a user identifier and a page identifier of a page that a user identified with the user identifier accessed; a management information determining unit that determines management information corresponding to the user identifier and the page identifier; an executing unit that acquires a processing result obtained by executing processing corresponding to the management information; a processing result transmitting unit that transmits the processing result, an alteration instruction receiving unit that, after transmis- (Continued)

| ID | User specifying information | Page specifying information | Another-user specifying information | Processing identifier | Alteration information |
|---|---|---|---|---|---|
| 1 | U01 | URL1 | * | Acquire currently-visiting-user information | - |
| 2 | U02 | URL2 | Score >= 50 | Transmit message | - |
| 3 | Administrator flag = 1 | URL3 | - | Statistical processing | - |
| 4 | Administrator flag =1 | URL4 | - | Transmit alteration information | |
| ⋮ | ⋮ | ⋮ | ⋮ | ⋮ | ⋮ |

sion of the processing result, receives an alteration instruction to alter a page identified with the page identifier, the alteration instruction being input to a terminal apparatus of a user; and a page alteration processing unit that performs alteration processing on the page corresponding to the alteration instruction.

19 Claims, 42 Drawing Sheets

(56) References Cited

U.S. PATENT DOCUMENTS

| | | | | |
|---|---|---|---|---|
| 2016/0140635 | A1* | 5/2016 | Devageorge | G06Q 30/0613 705/26.41 |
| 2016/0171734 | A1* | 6/2016 | Colby | G06F 3/0484 345/634 |
| 2017/0344568 | A1* | 11/2017 | Jacob | G06F 40/177 |
| 2020/0042562 | A1* | 2/2020 | Hart | G06F 3/0484 |

FOREIGN PATENT DOCUMENTS

| | | | |
|---|---|---|---|
| JP | 2011-039796 | A | 2/2011 |
| JP | 2018-190008 | A | 11/2018 |

OTHER PUBLICATIONS

Office Action issued in corresponding Japanese Patent Application No. 2019-231531, dated Jun. 27, 2023, with English translation.

* cited by examiner

| ID | User specifying information | Page specifying information | Another-user specifying information | Processing identifier | Alteration information |
|---|---|---|---|---|---|
| 1 | U01 | URL1 | * | Acquire currently-visiting-user information | - |
| 2 | U02 | URL2 | Score >= 50 | Transmit message | - |
| 3 | Administrator flag = 1 | URL3 | - | Statistical processing | - |
| 4 | Administrator flag =1 | URL4 | - | Transmit alteration information |  |
| ⋮ | ⋮ | ⋮ | ⋮ | ⋮ | ⋮ |

| User identifier | Name | E-mail address | Static attribute value | | | | | | Dynamic attribute value | | | | | | | | | |
|---|---|---|---|---|---|---|---|---|---|---|---|---|---|---|---|---|---|---|
| | | | | | | | | | Real-time dynamic attribute value | | | Historical-information-using dynamic attribute value | | | | | | |
| | | | Gender | Age | Unmarried /married | Place of birth | Administrator flag | ... | Time spent (sec) | Number of pages viewed | ... | Number of visits | Number of purchases | Purchase total (yen) | Average number of PVs | Score | ... |
| P001 | A-o Yamada | ya@x.jp | M | 27 | Unmarried | Aomori | 0 | ... | 128 | 3 | ... | 21 | 5 | 23,000 | 10 | 99 | ... |
| P002 | B-o Ota | ob@y.com | M | 25 | Married | Chiba | 0 | ... | 321 | 8 | ... | 19 | 7 | 127,500 | 7 | 42 | ... |
| P003 | C-suke Tanaka | tc@z.co.jp | M | 48 | Married | Tokyo | 0 | ... | 57 | 2 | ... | 8 | 3 | 81,300 | 11 | 99 | ... |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| U01 | D-ko Inoue | id@a.jp | F | 30 | Unmarried | Tokyo | 1 | ... | ........................................ | | | | | | | | |
| U02 | E-o Kato | ke@b.jp | M | 40 | Unmarried | Tokyo | 1 | ... | ........................................ | | | | | | | | |
| ⋮ | ⋮ | ⋮ | ⋮ | ⋮ | ⋮ | ⋮ | ⋮ | ⋮ | ⋮ | | | | | | | | |

FIG.12

| ID | Page identifier | User identifier | Time information | Deletion flag |
|---|---|---|---|---|
| 1 | URL1 | P001 | 13:15:40 | 0 |
| 2 | URL2 | P002 | 13:15:41 | 0 |
| 3 | URL1 | P003 | 13:15:44 | 0 |
| ⋮ | ⋮ | ⋮ | ⋮ | ⋮ |

FIG.13

| ID | User identifier | Date/time | Page identifier | Operation specifying information |
|---|---|---|---|---|
| ⋮ | ⋮ | ⋮ | ⋮ | ⋮ |
| 638 | P001 | 2019/6/4 17:42 | URL2 | Exited from the site |
| ⋮ | ⋮ | ⋮ | ⋮ | ⋮ |
| 821 | P001 | 2019/6/5 10:40 | URL1 | Started viewing of the site |
| 822 | P001 | 2019/6/5 10:40 | URL1 | Displayed customer service "Notice of Marketo-cooperation (PLAID page): hie plan" |
| ⋮ | ⋮ | ⋮ | ⋮ | ⋮ |
| 848 | P001 | 2019/6/5 10:40 | URL1 | Closed "Notice of Marketo-cooperation (PLAID page): hie plan" |
| ⋮ | ⋮ | ⋮ | ⋮ | ⋮ |
| 911 | P001 | 2019/6/5 10:42 | URL3 | Viewing "Best ... for customers" |
| 912 | P001 | 2019/6/5 10:42 | URL3 | Displayed customer service "Guide from PC resident Widget-plaid.co.jp to Karate.io: dv-plan" |
| ⋮ | ⋮ | ⋮ | ⋮ | ⋮ |

FIG.14

FIG.15
HOME
TOPICS
INSIDE
INTERVIEW
CXDIVE
ABOUT
FOLLOW US
CX DIVE
#CX DIVE
MaaSに挑む新たな移動体験の
創出──モビリティ企業3社が
語る #CXDIVE
CX DIVE
CX DIVE

FIG.17
1701
HOME
TOPICS
INSIDE
INTERVIEW
CXDIVE
ABOUT
CX DIVE
#CX DIVE
MaaSに挑む新たな移動体験の
創出——モビリティ企業3社が
語る #CXDIVE
CX DIVE
1702

FIG.19
HOME
TOPICS
INSIDE
INTERVIEW
CXDIVE
ABOUT
FOLLOW US
CX DIVE
#CX DIVE
MaaSに挑む新たな移動体験の
1,234
853
50
1901

```
<script    type ="text/    javascript      " >
( function    (){ var
t,e,n,r,a;      for (t= function    (){ var  t; return
t=[],    function    (){ var
e,n,r,a;      for (n=[ "init"   , "start"   , "stop"   , "use
r" , "track"   , "action"   , "event"   , "goal"  , "chat"
, "buy" , "page"  , "view"  , "admin"  , "group"  , "ali
as" , "ready"   , "link"   , "form"   , "click"   , "submit
" , "cmd" , "emit"   , "on"  , "send"  , "css"  , "js"  , "st
yle" , "option"   , "get"  , "set"  , "collection"     ],e
=function    (e){ return    function    (){ return
t.push ([e].   concat ( Array  .prototype.slice.c
all ( arguments , 0)))}},r=    0,a=[];r<    n.length   ;
)t[n[r]]=e(n[r]),        a.push (r++);   return
a}(),   t.init   =function   ( e,n ){ var  r,a;  return
t.api_key   =e,t.options   =n||{},a=    document .cr
eateElement  ( "script"   ), a.type  ="text/   javasc
ript   ", a.async  =! 0,a.charset=    "utf   -
8" ,a.src=   t.options.tracker_url      || "https://
static.karte.io/libs/tracker.          js " ,r= docume
nt .getElementsByTagName   ( "script"   )[ 0], r.pa
rentNode.insertBefore    ( a,r )},t},r=    window .k
arte_tracker_names      ||[ "tracker"   ],e=  0,n= r.l
ength;n  >e;e ++)a=r[e],  window [a]||(   window [a
]=t());   tracker.init     ( "【プロジェクトのAPIキー】
" );}).call(    this  ); </ script  >
```

FIG.21

| ID | Page specifying information | User specifying information | Page alteration information | | Processing defining information | | |
|---|---|---|---|---|---|---|---|
| | | | Target | Content | Another-user specifying information | Processing identifier | ON/OFF |
| 1 | URL a | User type identifier=1 | - | - | * | Acquire currently-visiting-user information | ON |
| | | | | | - | Statistical processing | OFF |
| | | User type identifier=2 | - | - | - | Statistical processing | ON |
| | | User type identifier=0A | <Comment section> | Inputtable | - | - | - |
| | | User type identifier=0B | <Comment section> | Not inputtable | - | - | - |
| 2 | URL b | User type identifier=U03 | * | 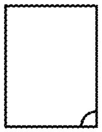 | User type identifier =0A | Transmit message | OFF |
| ⋮ | ⋮ | ⋮ | ⋮ | | ⋮ | ⋮ | ⋮ |

FIG.34

| User identifier | Name | E-mail address | Static attribute value | | | | | | Dynamic attribute value | | | | | | | | | |
|---|---|---|---|---|---|---|---|---|---|---|---|---|---|---|---|---|---|---|
| | | | | | | | | | Real-time dynamic attribute value | | | Historical-information-using dynamic attribute value | | | | | | |
| | | | Gender | Age | Unmarried /married | Place of birth | User type identifier | ··· | Time spent (sec) | Number of pages viewed | ··· | Number of visits | Number of purchases | Purchase total (yen) | Average number of PVs | Score | ··· |
| P001 | A-o Yamada | ya@x.jp | M | 27 | Unmarried | Aomori | 0 | ··· | 128 | 3 | ··· | 21 | 5 | 23,000 | 10 | 99 | ··· |
| P002 | B-o Ota | ob@y.com | M | 25 | Married | Chiba | 0 | ··· | 321 | 8 | ··· | 19 | 7 | 127,500 | 7 | 42 | ··· |
| P003 | C-suke Tanaka | tc@z.co.jp | M | 48 | Married | Tokyo | 0 | ··· | 57 | 2 | ··· | 8 | 3 | 81,300 | 11 | 99 | ··· |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| U01 | D-ko Inoue | id@a.jp | F | 30 | Unmarried | Tokyo | 1 | ··· | ··························· | | | | | | | | |
| U02 | E-o Kato | ke@b.jp | M | 40 | Unmarried | Tokyo | 1 | ··· | ··························· | | | | | | | | |
| W01 | F-ko Yamamoto | yf@c.com | F | 28 | Unmarried | Tokyo | 2 | ··· | ··························· | | | | | | | | |
| W02 | G-o Aomoto | ag@d..jp | M | 42 | Married | Tokyo | 2 | ··· | ··························· | | | | | | | | |
| ⋮ | ⋮ | ⋮ | ⋮ | ⋮ | ⋮ | ⋮ | ⋮ | ⋮ | ⋮ | | | | | | | | |

FIG.35

| ID | Page specifying information | User specifying information | Executable processing defining information | |
|---|---|---|---|---|
| | | | Target | Operation |
| 1 | URL a | User type identifier = 1 | Management information management table | Add, alter, delete, set ON/OFF |
| | | | Page.<comment section> | Edit |
| | | | User type management table | Edit |
| | | User type identifier = 2 | Management information management table | Set ON/OFF |
| | | | Page.<comment section> | - |
| | | | User type management table | Edit |
| 2 | URL b | User type identifier = U03 | Management information | Add, alter, delete |
| | | ⋮ | ⋮ | ⋮ |
| ⋮ | ⋮ | ⋮ | ⋮ | ⋮ |

FIG.36

| ID | User type name | User type identifier | User type condition |
|---|---|---|---|
| 1 | Power user | 0A | Score >= 80 |
| 2 | User | 0B | Score < 80 |

FIG.37

INFORMATION PROCESSING APPARATUS, TERMINAL APPARATUS, INFORMATION PROCESSING METHOD, AND RECORDING MEDIUM

CROSS-REFERENCE OF RELATED APPLICATIONS

This application is the U.S. National Phase under 35 U.S.C. § 371 of International Patent Application No. PCT/JP2020/046503, filed on Dec. 14, 2020, which in turn claims the benefit of Japanese Patent Application No. 2019-231531, filed on Dec. 23, 2019, the entire disclosures of which Applications are incorporated by reference herein.

TECHNICAL FIELD

The present invention relates to, for example, an information processing apparatus and the like for, when outputting a page such as a web page, outputting a processing result of the page, confirming the processing result, and then altering the page.

BACKGROUND ART

Conventionally, there has been a technique with which the status of visitors to a website can be seen in real-time (see Patent Document 1). This technique relates to a server apparatus including: a user information storage unit in which two or more pieces of user information are stored, the user information being information on a user and having one or more attribute values; an operation information receiving unit that receives, from a user terminal of a user who is a visitor to a website, operation information on an operation performed on the website by the user; an attribute value acquiring unit that acquires one or more attribute values of the user who is visiting the website, using the operation information; and an attribute value output unit that outputs the one or more attribute values acquired by the attribute value acquiring unit.

Furthermore, conventionally, there has been a system that transmits questionnaires, advertisements, and the like to a user terminal of a general user when the general user accesses a web page (see Patent Document 2).

CITATION LIST

Patent Documents

Patent Document 1: JP 2018-190008A
Patent Document 2: JP 2002-183155A

SUMMARY OF INVENTION

Technical Problem

However, in conventional techniques, when a terminal apparatus accesses a page, it is not possible to execute processing regarding the page and the like, acquire a result of the processing, and then alter the page.

Solution to Problem

A first aspect of the present invention is directed to an information processing apparatus, including: a management information storage unit in which one or more pieces of management information each having user specifying information for specifying a user and page specifying information for specifying a page are stored; an access information receiving unit that receives access information having a user identifier and a page identifier for identifying a page that a user identified with the user identifier accessed; a management information determining unit that determines management information corresponding to the user identifier and the page identifier contained in the access information; an executing unit that acquires a processing result obtained by executing processing corresponding to the management information determined by the management information determining unit; a processing result transmitting unit that transmits the processing result acquired by the executing unit; an alteration instruction receiving unit that, after transmission of the processing result, receives an alteration instruction to alter a page identified with the page identifier, the alteration instruction being input to a terminal apparatus of a user identified with the user identifier; and a page alteration processing unit that performs page alteration processing for altering the page corresponding to the alteration instruction.

With this configuration, when a terminal apparatus accesses a page, it is possible to execute processing regarding the page and the like, acquire a result of the processing, and then alter the page from the terminal apparatus.

Furthermore, a second aspect of the present invention is directed to the information processing apparatus according to the first aspect, further including: a user information storage unit in which one or more pieces of user information each having a user identifier for identifying a user and a user type identifier for specifying a type of the user are stored, wherein the user specifying information contains the user type identifier of the user, the management information determining unit determines management information corresponding to a user type identifier that is paired with the user identifier contained in the access information and the page identifier contained in the access information.

With this configuration, it is possible to allow only a specific type of user to alter the page.

Furthermore, a third aspect of the present invention is directed to the information processing apparatus according to the first or second aspect, wherein the page alteration processing includes one or at least two of addition processing for adding information to the page, deletion processing for deleting information from the page, and alteration processing for altering information in the page.

With this configuration, when a terminal apparatus accesses a page, it is possible to execute processing regarding the page and the like, acquire a result of the processing, and then delete part of information in the page or alter part of information in the page.

Furthermore, a fourth aspect of the present invention is directed to the information processing apparatus according to any one of the first to third aspects, wherein the page alteration instruction has a user type identifier, and the page alteration processing unit performs the page alteration processing in association with the user type identifier contained in the page alteration instruction.

With this configuration, when a terminal apparatus accesses a page, it is possible to execute processing regarding the page and the like, acquire a result of the processing, and then alter the page according to the user type.

Furthermore, a fifth aspect of the present invention is directed to the information processing apparatus according to any one of the first to fourth aspects, further including: an alteration management information storage unit in which one or more pieces of alteration management information each having page alteration information and page specifying information are stored, the page alteration information being information corresponding to the page alteration processing and being information for altering the content of the page, wherein the page alteration processing unit configures page alteration information corresponding to the page alteration instruction, and accumulates alteration management information having the page alteration information and the page specifying information for specifying a page, in the alteration management information storage unit, and the executing unit includes a page alteration information acquiring part that acquires a processing result that is page alteration information that is paired with the page specifying information corresponding to the page identifier contained in the access information received by the access information receiving unit.

With this configuration, it is easy to cancel an alteration in the page and the like, which increases the customizability for altering pages.

Furthermore, a sixth aspect of the present invention is directed to the information processing apparatus according to the fifth aspect, wherein the alteration management information further has a user type identifier, and the page alteration information acquiring part acquires a processing result that is page alteration information that is paired with the page specifying information corresponding to the page identifier contained in the access information received by the access information receiving unit and the user type identifier corresponding to the user identifier contained in the access information received by the access information receiving unit.

With this configuration, when a terminal apparatus accesses a page, it is possible to execute processing regarding the page and the like, acquire a result of the processing, and then alter the page according to the user type.

Furthermore, a seventh aspect of the present invention is directed to the information processing apparatus according to any one of the first to sixth aspects, wherein the user type identifier contains administrator flag information indicating that the user is an administrator.

With this configuration, when a terminal apparatus of an administrator accesses a page, it is possible to execute processing regarding the page and the like, acquire a result of the processing, and then allow the administrator to alter the page.

Furthermore, an eighth aspect of the present invention is directed to the information processing apparatus according to any one of the first to sixth aspects, wherein the user type identifier contains level information for identifying a level of a general user.

With this configuration, when a terminal apparatus of a general user classified as a specific level accesses a page, it is possible to execute processing regarding the page and the like, acquire a result of the processing, and then allow the general user to alter the page.

Furthermore, a ninth aspect of the present invention is directed to an information processing apparatus including: a management information storage unit in which one or more pieces of management information each having user specifying information for specifying a user and page specifying information for specifying a page are stored; an access information receiving unit that receives access information having a user identifier and a page identifier for identifying a page that a user identified with the user identifier accessed; a management information determining unit that determines management information corresponding to the user identifier and the page identifier contained in the access information; an executing unit that acquires a processing result obtained by executing processing corresponding to the management information determined by the management information determining unit; a processing result transmitting unit that transmits the processing result acquired by the executing unit; a management information alteration instruction receiving unit that receives a management information alteration instruction, which is an instruction to alter management information in the management information storage unit and is an instruction having a page identifier; and a management information alteration unit that alters the management information corresponding to the page identifier contained in the management information alteration instruction according to the management information alteration instruction.

With this configuration, when a terminal apparatus accesses a page, it is possible to execute processing regarding the page and the like, acquire a result of the processing, and then alter management information corresponding to the page from the terminal apparatus.

Furthermore, a tenth aspect of the present invention is directed to an information processing apparatus including: a management information storage unit in which one or more pieces of management information each having user specifying information for specifying a user and page specifying information for specifying a page are stored, the user specifying information containing a user type identifier for specifying a type of the user; an access information receiving unit that receives access information having a user identifier and a page identifier for identifying a page that a user identified with the user identifier accessed; a management information determining unit that determines management information corresponding to the user identifier and the page identifier contained in the access information; an executing unit that acquires a processing result obtained by executing processing corresponding to the management information determined by the management information determining unit; and a processing result transmitting unit that transmits the processing result acquired by the executing unit; wherein the executing unit includes a page alteration information acquiring part that acquires a processing result that is page alteration information for performing deletion processing for deleting information from the page identified with the page identifier contained in the access information received by the access information receiving unit or alteration processing for altering information in the page.

With this configuration, when a terminal apparatus accesses a page, it is possible to output the page that has undergone processing regarding the page and the like, the processing being deletion processing for deleting information from the page or alteration processing for altering information in the page.

Furthermore, an eleventh aspect of the present invention is directed to a terminal apparatus according to any one of the first to ninth aspects, including: a terminal storage unit in which a user identifier is stored; a terminal accepting unit that accepts a page identifier; a page acquiring unit that acquires a page using the page identifier accepted by the terminal accepting unit; a terminal access information acquiring unit that acquires access information having the user identifier in the terminal storage unit and the page identifier accepted by the terminal accepting unit, in response to the page acquiring unit acquiring a page; a terminal transmitting unit that transmits the access information acquired by the terminal access information acquiring unit to the information processing apparatus according to any one of claims 1 to 9; a terminal receiving unit that receives a processing result from the information processing apparatus, in response to the terminal transmitting unit transmitting access information; and a terminal output unit that outputs the processing result received by the terminal receiving unit and the page acquired by the page acquiring unit, wherein the terminal accepting unit accepts a page alteration instruction, and the terminal transmitting unit transmits the page alteration instruction to the information processing apparatus.

With this configuration, when the terminal apparatus accesses a page, it is possible to receive a processing result regarding the page and the like, and output the processing result and the page.

Furthermore, a twelfth aspect of the present invention is directed to the terminal apparatus according to claim 10, according to any one of the first to tenth aspects, wherein embedded information for accessing the information processing apparatus is embedded in the page acquired by the page acquiring unit, the terminal access information acquiring unit acquires the embedded information from the page, and the terminal transmitting unit transmits the access information acquired by the terminal access information acquiring unit to the information processing apparatus, using the embedded information.

With this configuration, when the terminal apparatus accesses a page, it is possible to receive a processing result regarding the page and the like, and output the processing result and the page.

Furthermore, an aspect of the present invention is directed to an information processing apparatus including: a management information storage unit in which one or more pieces of management information each having user specifying information for specifying a user and page specifying information for specifying a page are stored; an access information receiving unit that receives access information having a user identifier and a page identifier for identifying a page that a user identified with the user identifier accessed; a management information determining unit that determines management information corresponding to the user identifier and the page identifier contained in the access information; an executing unit that executes processing corresponding to the management information determined by the management information determining unit, thereby acquiring a processing result; and a processing result transmitting unit that transmits the processing result acquired by the executing unit.

With this configuration, when a terminal apparatus accesses a page, it is possible to execute processing regarding the page and the like, and provide a result of the processing to the terminal apparatus.

Furthermore, an aspect of the present invention is directed to the information processing apparatus according to the above-described aspect, wherein the management information has another-user specifying information for specifying another user identifier other than the user identifier contained in the management information, and the executing unit executes processing corresponding to the management information determined by the management information determining unit, thereby acquiring a processing result that is information on a user identified with the user identifier specified with the another-user specifying information contained in the management information determined by the management information determining unit.

With this configuration, when a terminal apparatus accesses a page, it is possible to execute processing regarding the page and the like, the processing being for acquiring information corresponding to another user specified with the managed another-user specifying information, and provide a result of the processing to the terminal apparatus.

Furthermore, an aspect of the present invention is directed to the information processing apparatus according to the above-described aspect, wherein the management information has a processing identifier for identifying processing, and the executing unit executes processing identified with the processing identifier contained in the management information determined by the management information determining unit.

With this configuration, when a terminal apparatus accesses a page, it is possible to execute processing regarding the page and the like, the processing being identified with the managed processing identifier, and provide a result of the processing to the terminal apparatus.

Furthermore, an aspect of the present invention is directed to the information processing apparatus according to the above-described aspect, further including: a user information storage unit in which one or more pieces of user information each having a user identifier and one or more user attribute values are stored, the user attribute values being attribute values of a user identified with the user identifier; a currently-visiting-user information storage unit in which one or more pieces of currently-visiting-user information each having a page identifier for identifying a page and a user identifier for identifying a user who is currently visiting the page are stored; and a currently-visiting-user information accumulating unit that accumulates currently-visiting-user information having the user identifier and the page identifier contained in the access information received by the access information receiving unit, in the currently-visiting-user information storage unit, wherein the executing unit includes: a currently-visiting-user specifying part that acquires, from the currently-visiting-user information storage unit, one or more user identifiers that are paired with the page identifier for identifying the page specified with the page specifying information contained in the management information determined by the management information determining unit; and a currently-visiting-user attribute value acquiring part that acquires, for each of the one or more user identifiers acquired by the currently-visiting-user specifying part, user attribute values that are paired with the user identifier, from the user information storage unit, and acquires a processing result having the user attribute values for each user identifier.

With this configuration, when a terminal apparatus accesses a page, it is possible to acquire information on a user who is currently visiting the page and the like, and provide the information to the terminal apparatus.

Furthermore, an aspect of the present invention is directed to the information processing apparatus according to the above-described aspect, further including: a currently-visiting-user information storage unit in which one or more pieces of currently-visiting-user information each having a page identifier for identifying a page and a user identifier for identifying a user who is currently visiting the page are stored; and a currently-visiting-user information accumulating unit that accumulates currently-visiting-user information having the user identifier and the page identifier contained in the access information received by the access information receiving unit, in the currently-visiting-user information storage unit, wherein the executing unit includes: a currently-visiting-user specifying part that acquires, from the currently-visiting-user information storage unit, one or more user identifiers that are paired with the page identifier for identifying the page specified with the page specifying information contained in the management information determined by the management information determining unit; and a message transmitting/receiving part that receives a message input by a user from a terminal apparatus and configures information for transmitting the message to terminal apparatuses of users respectively identified with the one or more user identifiers acquired by the currently-visiting-user specifying part.

With this configuration, it is possible to receive information transmitted from a terminal apparatus that accessed a page, and transmit the received information to a terminal apparatus of a user who is currently visiting the page and the like.

Furthermore, an aspect of the present invention is directed to the information processing apparatus according to the above-described aspect, further including: an operation information storage unit in which one or more pieces of operation information each having a user identifier, operation specifying information for specifying an operation performed on a page by a user identified with the user identifier, and a page identifier of the page are stored; an operation information receiving unit that receives operation information having a user identifier, a page identifier, and operation specifying information; and an operation information accumulating unit that accumulates the operation information received by the operation information receiving unit in the operation information storage unit, wherein the executing unit includes a statistical processing part that acquires, from the operation information storage unit, one or more pieces of operation specifying information that are paired with the page identifier for identifying the page specified with the page specifying information contained in the management information determined by the management information determining unit, and performs statistical processing on the one or more pieces of operation specifying information, thereby acquiring a processing result.

With this configuration, when a terminal apparatus accesses a page, it is possible to perform statistical processing on operation specifying information for specifying an operation performed on the page and the like by a user, thereby acquiring a statistical processing result, and provide the statistical processing result to the terminal apparatus.

Furthermore, an aspect of the present invention is directed to the information processing apparatus according to the above-described aspect, wherein the executing unit includes a page alteration information acquiring part that acquires a processing result that is page alteration information for altering the content of the page identified with the page identifier contained in the access information received by the access information receiving unit.

With this configuration, when a terminal apparatus accesses a page, it is possible to perform processing for altering the content of the page, and provide page alteration information that is a processing result to the terminal apparatus.

Furthermore, an aspect of the present invention is directed to the information processing apparatus according to the above-described aspect, wherein the processing result transmitted by the processing result transmitting unit is output to the terminal apparatus together with the page identified with the page identifier contained in the access information received by the access information receiving unit.

With this configuration, when a terminal apparatus accesses a page, it is possible to execute processing regarding the page and the like, and provide a result of the processing to the terminal apparatus.

Furthermore, an aspect of the present invention is directed to the information processing apparatus according to the above-described aspect, wherein the executing unit includes a page configuring part that executes processing corresponding to the management information determined by the management information determining unit, thereby acquiring a processing result, acquires a page identified with the page identifier contained in the access information received by the access information receiving unit, and configures a page containing the page and the processing result, wherein the processing result transmitting unit transmits the page configured by the page configuring part.

With this configuration, when a terminal apparatus accesses a page, it is possible to execute processing regarding the page and the like, configure a new page containing a result of the processing and the page, and provide the new page to the terminal apparatus.

Furthermore, an aspect of the present invention is directed to the terminal apparatus according to the above-described aspect, including: a terminal storage unit in which a user identifier is stored; a terminal accepting unit that accepts a page identifier for identifying a page; a page acquiring unit that acquires a page using the page identifier accepted by the terminal accepting unit; a terminal access information acquiring unit that acquires access information having the user identifier in the terminal storage unit and the page identifier accepted by the terminal accepting unit, in response to the page acquiring unit acquiring a page; a terminal transmitting unit that transmits the access information acquired by the terminal access information acquiring unit to the information processing apparatus; a terminal receiving unit that receives a processing result from the information processing apparatus, in response to the terminal transmitting unit transmitting access information; and a terminal output unit that outputs the processing result received by the terminal receiving unit and the page acquired by the page acquiring unit.

With this configuration, when the terminal apparatus accesses a page, it is possible to receive a processing result regarding the page and the like, and output it together with the page.

Furthermore, an aspect of the present invention is directed to the terminal apparatus according to claim 10, according to the above-described aspect, wherein embedded information for accessing the information processing apparatus is embedded in the page acquired by the page acquiring unit, the terminal access information acquiring unit acquires the embedded information from the page, and the terminal transmitting unit transmits the access information acquired by the terminal access information acquiring unit to the information processing apparatus, using the embedded information.

With this configuration, when the terminal apparatus accesses a page, it is possible to receive a processing result regarding the page and the like, and output it together with the page.

Advantageous Effects of Invention

With the information processing apparatus according to the present invention, when a terminal apparatus accesses a page, it is possible to execute processing regarding the page and the like, acquire a result of the processing, and then alter the page.

BRIEF DESCRIPTION OF DRAWINGS

FIG. 12 is a diagram showing a user information management table in the embodiment.

FIG. 13 is a diagram showing a currently-visiting-user information management table in the embodiment.

FIG. 14 is a diagram showing an operation information management table in the embodiment.

FIG. 21 is a diagram showing an example of embedded information in the embodiment.

FIG. 34 is a diagram showing a management information management table in the embodiment.

FIG. 35 is a diagram showing a user information management table in the embodiment.

FIG. 36 is a diagram showing a user-executable processing management table in the embodiment.

FIG. 37 is a diagram showing a user type management table in the embodiment.

DESCRIPTION OF EMBODIMENT

Figure 1:
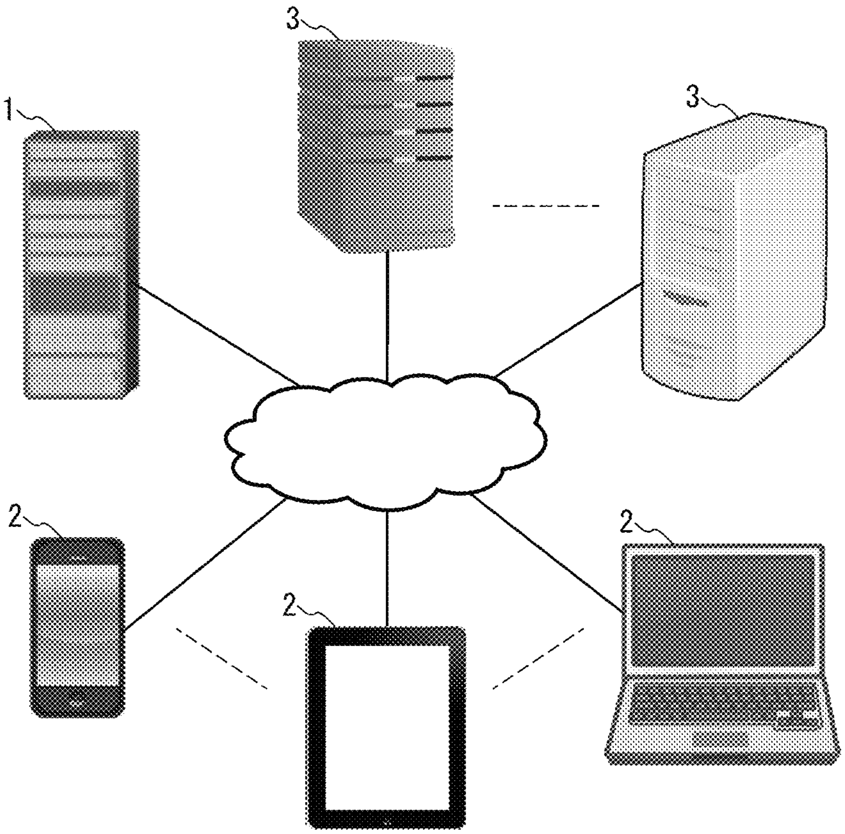
FIG. 1 is a conceptual diagram of an information system A in Embodiment 1.

Hereinafter, embodiments of an information processing apparatus and the like will be described with reference to the drawings. It should be noted that constituent elements denoted by the same reference numerals in the embodiments perform similar operations, and thus a description thereof may not be repeated.

Embodiment 1

In this embodiment, a description will be given of an information system including an information processing apparatus in which management information is stored, the management information containing user specifying information (e.g., a user identifier or a user attribute value) for specifying a user and page specifying information (e.g., a URL, a site identifier, an app identifier, etc.) for specifying a page, and, in the case in which a user identifier and a page identifier (e.g., a URL or a screen ID) are received from a user's terminal apparatus and there is management information corresponding to the received user identifier and page identifier, processing regarding a page identified with the page identifier is executed and a result of the processing is transmitted to the user's terminal apparatus.

Furthermore, in this embodiment, a description will be given of an information system including an information processing apparatus in which the management information contains another-user specifying information for specifying another user identifier, and the executing unit acquires a processing result of information corresponding only to a user specified with the another-user specifying information.

Furthermore, in this embodiment, a description will be given of an information system including an information processing apparatus in which the management information contains a processing identifier, and processing identified with the processing identifier is executed.

Furthermore, in this embodiment, for example, the executing unit performs processing for acquiring user information on a user who is currently visiting the page. For example, the executing unit performs acquisition processing for receiving information from a terminal apparatus of a user, and transmitting the information to the currently visiting user. For example, processing for acquiring and transmitting a statistical processing result is performed. For example, processing for altering the content of a web page is performed.

Furthermore, in this embodiment, a case will be described in which a page that is to be output by a terminal apparatus is configured by the terminal apparatus.

Moreover, in this embodiment, a tag method, a plug-in method, and a proxy method will be described as methods in which a terminal apparatus accesses an information processing apparatus.

FIG. 1 is a conceptual diagram of an information system A in this embodiment. The information system A includes an information processing apparatus 1, one or at least two terminal apparatuses 2, and one or at least two server apparatuses 3. The information processing apparatus 1 and the server apparatuses 3 are typically so-called servers, and, for example, cloud servers, ASP servers, or the like. The server apparatuses 3 are typically web servers in which web pages are stored, but may also be application servers in which applications are stored. There is no limitation on the type of information processing apparatus 1 and server apparatuses 3. The terminal apparatuses 2 are, for example, so-called personal computers, tablet devices, smartphones, or the like, and there is no limitation on the type thereof. The information processing apparatus 1 and the terminal apparatuses 2, and the terminal apparatuses 2 and the server apparatuses 3 are capable of communicating with each other via a network such as the Internet. The information processing apparatus 1 and the server apparatuses 3 may also be capable of communicating with each other via a network such as the Internet.

Figure 2:
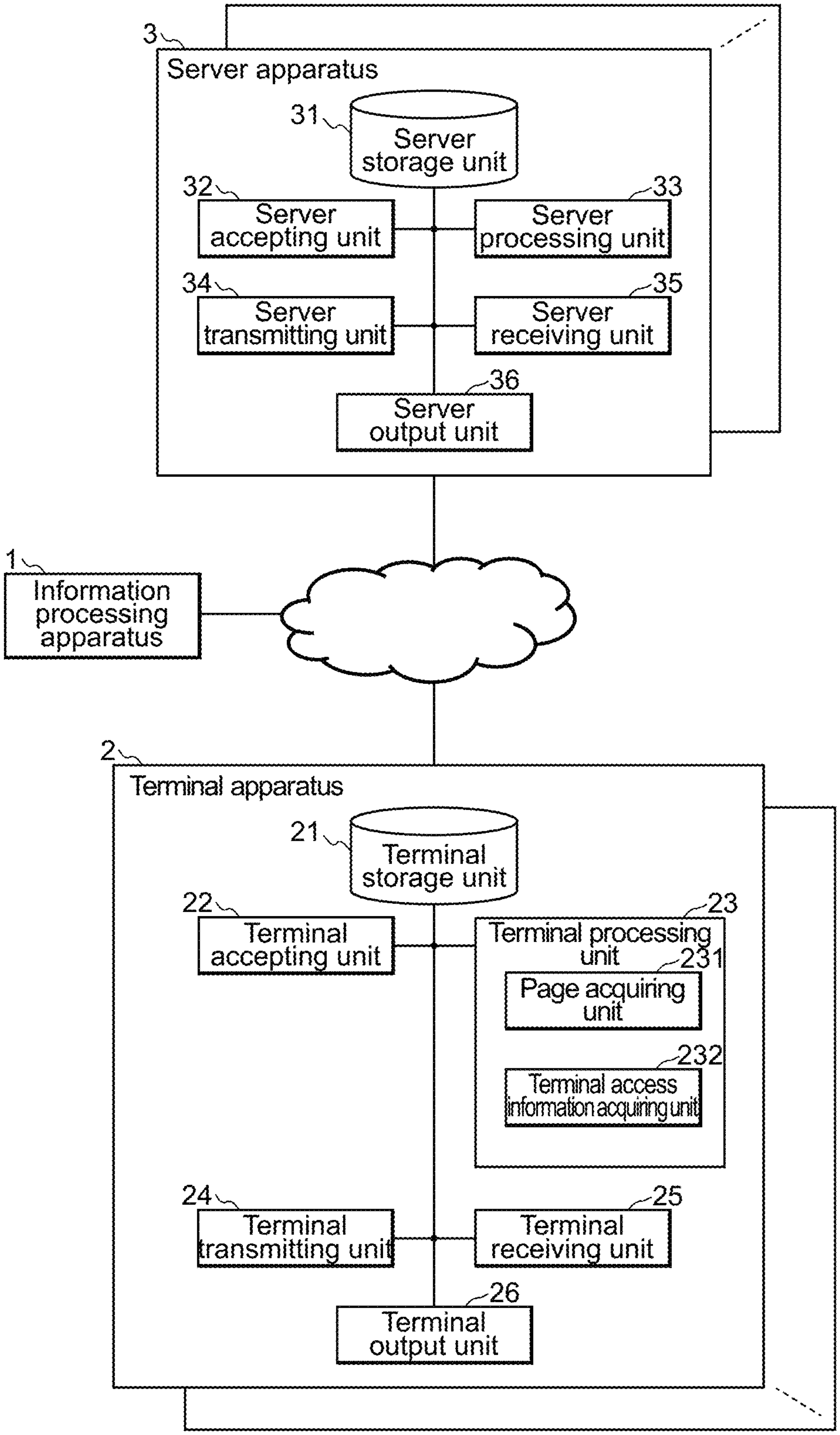
FIG. 2 is a block diagram of the information system A in the embodiment.
Figure 3:
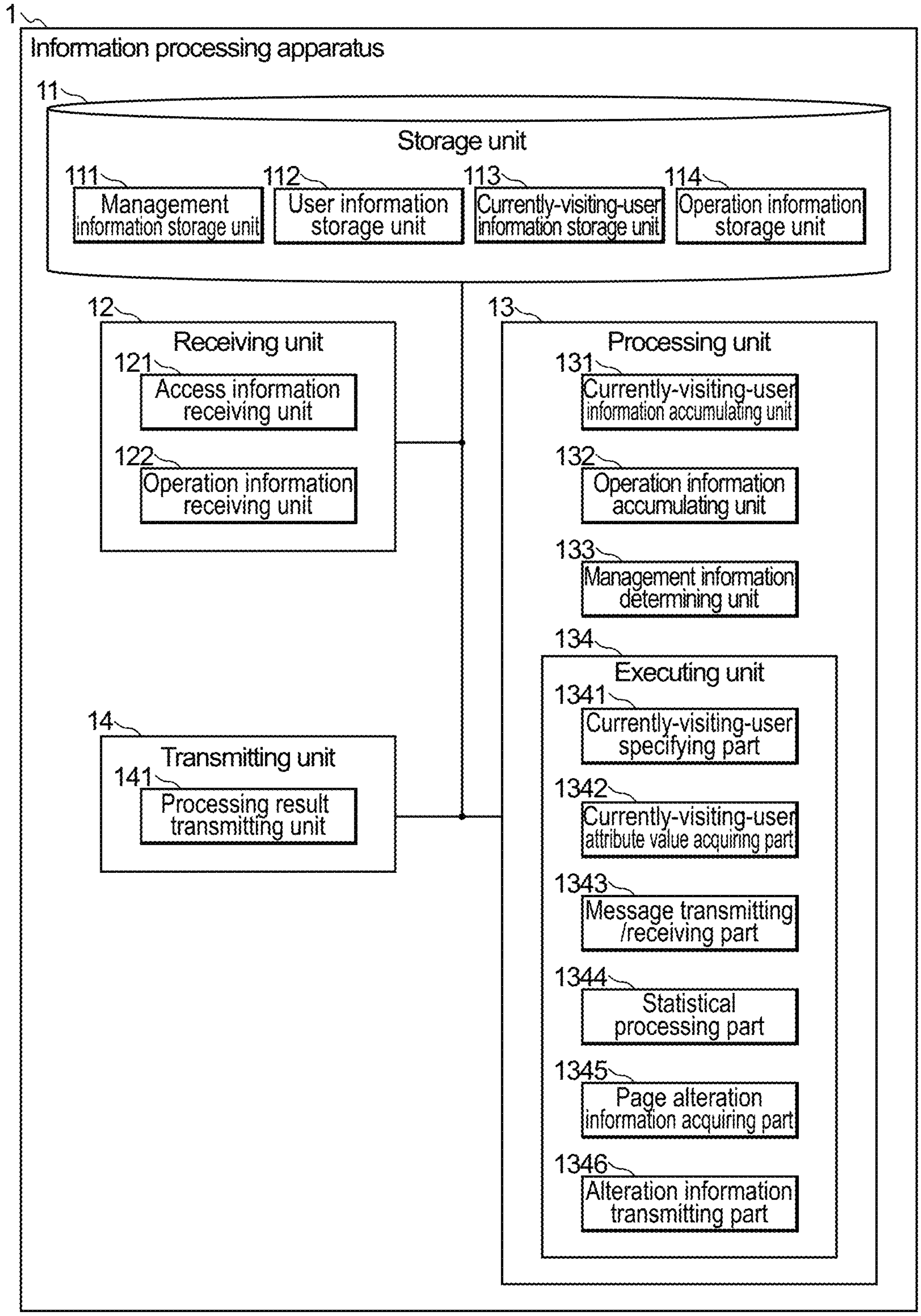
FIG. 3 is a block diagram of an information processing apparatus 1 in the embodiment.

FIG. 2 is a block diagram of the information system A in this embodiment. FIG. 3 is a block diagram of the information processing apparatus 1 constituting the information system A.

The information processing apparatus 1 includes a storage unit 11, a receiving unit 12, a processing unit 13, and a transmitting unit 14. The storage unit 11 includes a management information storage unit 111, a user information storage unit 112, a currently-visiting-user information storage unit 113, and an operation information storage unit 114. The receiving unit 12 includes an access information receiving unit 121 and an operation information receiving unit 122. The processing unit 13 includes, for example, a currently-visiting-user information accumulating unit 131, an operation information accumulating unit 132, a management information determining unit 133, and an executing unit 134. The executing unit 134 includes, for example, a currently-visiting-user specifying part 1341, a currently-visiting-user attribute value acquiring part 1342, a message transmitting/receiving part 1343, a statistical processing part 1344, and a page alteration information acquiring part 1345. The transmitting unit 14 includes a processing result transmitting unit 141.

Each terminal apparatus 2 includes a terminal storage unit 21, a terminal accepting unit 22, a terminal processing unit 23, a terminal transmitting unit 24, a terminal receiving unit 25, and a terminal output unit 26. The terminal processing unit 23 includes a page acquiring unit 231 and a terminal access information acquiring unit 232.

Each server apparatus 3 includes a server storage unit 31, a server accepting unit 32, a server processing unit 33, a server transmitting unit 34, a server receiving unit 35, and a server output unit 36.

Various types of information are stored in the storage unit 11 constituting the information processing apparatus 1. The various types of information are, for example, later-described management information, later-described user information, later-described currently-visiting-user information, later-described operation information, a later-described program, and the like.

One or more pieces of management information are stored in the management information storage unit 111. The management information has user specifying information and page specifying information. The management information may further have another-user specifying information. The management information may further have a processing identifier. The user specifying information is information for specifying a user. The user specifying information is, for example, one or at least two user identifiers, a user attribute value (e.g., a flag indicating that the user is an administrator), a condition using a user attribute value, or the like. The user specifying information may be any information with which a user can be specified. The user identifier is information for identifying a user, and is, for example, an ID. The user identifier may be a telephone number, a credit card number, an e-mail address, or the like. The user identifier may be a terminal identifier for identifying a terminal apparatus 2. The terminal identifier is, for example, a cookie ID, a session identifier, an IP address, a MAC address, or the like. The page specifying information is information for specifying a page. The page specifying information is, for example, a URI, a URL, or a pair of a program identifier and a screen identifier. The page is typically a web page. Note that the page may be an object that performs display, such as a screen or a window. The program identifier is information for identifying a program, and is, for example, an ID, a program name, a function name, a method name, an execution module name, or the like. The screen identifier is information for identifying a screen, and is, for example, an ID, a screen name, or the like. The another-user specifying information is information for specifying another user identifier other than the user identifier contained in the management information. The another-user specifying information may be information that is similar to the user specifying information contained in the management information, information indicating all users (e.g., "*"), or the like. The processing identifier is information for identifying processing. The processing identifier is, for example, an ID, a program name, a function name, a method name, an execution module name, or the like. The processing identifier may be information that is similar to the program identifier.

One or at least two pieces of user information are stored in the user information storage unit 112. The user information is information on a user. The user information has user identifier and one or more user attribute values.

The user attribute values are attribute values of a user identified with the user identifier. The one or more user attribute values may be static attribute values or dynamic attribute values. The static attribute values are typically attribute values that do not change, but may be considered as being attribute values that do not change from time to time. The static attribute values are, for example, a name, an age, an address, a telephone number, a flag specifying whether or not the user is an administrator, a user-specific image, a credit card number, an e-mail address, a terminal apparatus identifier, a user identifier, a password, or the like. The terminal apparatus identifier is information for identifying a terminal apparatus 2, and is, for example, a cookie ID, a session identifier, an IP address, a MAC address, or the like. The user identifier is, for example, an ID. The user identifier may be a telephone number, a credit card number, an e-mail address, or the like. The dynamic attribute values are attribute values that can dynamically change according to user operations or the like. The dynamic attribute values are, for example, a real-time dynamic attribute value or a historical-information-using dynamic attribute value. The real-time dynamic attribute value is an attribute value that changes in real-time from time to time. The real-time dynamic attribute value is, for example, the time a currently-visiting-user spent on a web page, the number of web pages viewed during the current visit, or the like. The historical-information-using dynamic attribute value is a dynamic attribute value acquired also using a history of operation information during previous visits. The historical-information-using dynamic attribute value is, for example, the number of purchases, a purchase price, a purchase total, an average time spent, the average number of PVs, the number of visits, a later-described score, or the like.

One or more pieces of currently-visiting-user information are stored in the currently-visiting-user information storage unit 113. The currently-visiting-user information is information on a user who is visiting a page. The user who is visiting a page is a user of a terminal apparatus 2 that is outputting the page. The currently-visiting-user information has a page identifier for identifying a page and a user identifier for identifying a user who is currently visiting the page.

One or more pieces of operation information are stored in the operation information storage unit 114. The operation information is information on an operation that has been performed by a user on a page. The operation information has a user identifier, a page identifier, and operation specifying information. The page identifier is information for identifying a page that is being output to a terminal apparatus 2 of a user identified with the user identifier, that is, a page that is to be subjected to an operation. The operation specifying information is information for specifying an operation performed on a page by a user identified with the user identifier.

The operation specifying information is, for example, information indicating that a page was accessed, information indicating that a button in a page was pressed, information indicating that an anchor was given, information on an operation to jump to another page, information input to a field, or the like. The operation specifying information is, for example, "rightButtonON" (indicating that a right mouse button was clicked), "drug object A" (indicating that an object A was dragged), "<purchased product ID>123<quantity>3" (indicating that three products identified with 123 were purchased), "jump http://www.xxx.co.jp" (indicating that a web page specified with URL "http://www.xxx.co.jp" was accessed), or the like. The operation specifying information in this case is, for example, information on a primitive operation, but it is preferably information with which the meaning or implication of the operation can be determined. That is to say, there is no limitation on the data structure, the information granularity, and the like of the operation specifying information. The operation specifying information is typically information for specifying an operation performed by a user, but may include information on processing performed by the information processing apparatus 1 as a result of an operation by a user. The operation information received by the receiving unit 12 may be different from the operation information stored in the operation information storage unit 114. The operation information received by the receiving unit 12 and the operation information accumulated in the operation information storage unit 114 may be different from each other, for example, in data structure or the like. For example, the operation specifying information contained in the operation information received by the receiving unit 12 may be information on a primitive operation (e.g., "rightButtonON"), and the operation specifying information accumulated in the operation information storage unit 114 may be information (e.g., "Page OO is displayed") with which the meaning or implication of the operation can be determined. In this case, the processing unit 13 configures operation specifying information that is to be stored in the operation information storage unit 114, using the received operation specifying information. In this case, for example, the processing unit 13 acquires operation specifying information that is paired with the received primitive operation specifying information, from the storage unit 11.

The receiving unit 12 receives various types of information, instructions, and the like. The various types of information, instructions, and the like are, for example, later-described access information, operation information, or the like.

The access information receiving unit 121 receives access information. For example, the access information receiving unit 121 receives access information from the terminal apparatus 2. Note that the access information receiving unit 121 may receive access information from the server apparatus 3.

The access information is information for specifying an access of the terminal apparatus 2 to a page. The access information has a user identifier and a page identifier. The page identifier constituting the access information is information for identifying a page that a user identified with the user identifier accessed, the user identifier being paired with the page identifier. The access information may further have information specific to the terminal apparatus 2, such as the coordinate information (x, y) of the mouse pointer in the terminal apparatus 2.

The operation information receiving unit 122 receives operation information. For example, the operation information receiving unit 122 receives operation information from the terminal apparatus 2. Note that the operation information receiving unit 122 may receive operation information from the server apparatus 3. The operation information has a user identifier, a page identifier, and operation specifying information.

The processing unit 13 performs various types of processing. The various types of processing are, for example, processing that is performed by the currently-visiting-user information accumulating unit 131, the operation information accumulating unit 132, the management information determining unit 133, the executing unit 134, the currently-visiting-user specifying part 1341, the currently-visiting-user attribute value acquiring part 1342, the message transmitting/receiving part 1343, the statistical processing part 1344, the page alteration information acquiring part 1345, or an alteration information transmitting part 1346.

For example, the processing unit 13 may analyze the operation information in the operation information storage unit 114, thereby acquiring a dynamic attribute value of each user. For example, the processing unit 13 updates a dynamic attribute value of a user based on the received operation information. For example, if the received operation information is an instruction to transmit a website, the processing unit 13 measures the time spent on the website, which is the time until an instruction to move to another website or an instruction to logout is received, and accumulates the time spent in the user information storage unit 112. For example, the processing unit 13 increments the number of visits to the website or web page of the server apparatus 3 based on received login instructions or received website transmission instructions, and accumulates the obtained value in the user information storage unit 112. For example, the processing unit 13 increments the number of purchases based on received product purchase instructions, and accumulates the obtained value in the user information storage unit 112. For example, the processing unit 13 substitutes, as parameters, one or more of the time spent on a website or a web page, the number of purchases, a purchase price, a purchase total, the number of PVs, an average time spent, and the number of visits for a score calculation formula, thereby calculating a score of each user. The score calculation formula is stored in the storage unit 11. The score calculation formula is information on a formula for calculating a score of a user. For example, the higher the score of a user, the more important the user is considered to be. The score calculation formula is, for example, an increasing function whose parameters are one or more of the time spent on a website or a web page, the number of purchases, a purchase price, a purchase total, the number of PVs, an average time spent, and the number of visits.

The currently-visiting-user information accumulating unit 131 accumulates currently-visiting-user information having the user identifier and the page identifier contained in the access information received by the access information receiving unit 121, in the currently-visiting-user information storage unit 113.

The currently-visiting-user information accumulating unit 131 acquires the user identifier and the page identifier contained in the access information received by the access information receiving unit 121, configures currently-visiting-user information having the user identifier and the page identifier, and accumulates the currently-visiting-user information in the currently-visiting-user information storage unit 113. It is assumed that, for example, if the operation information receiving unit 122 receives operation information having the user identifier and the page identifier and indicating that a user identified with the user identifier has stopped viewing a page identified with the page identifier, the processing unit 13 deletes currently-visiting-user information corresponding to the user identifier and the page identifier from the currently-visiting-user information storage unit 113. The deletion processing is preferably processing for adding a deletion flag. Adding a deletion flag is preferable because the currently-visiting-user information can be used as information of a history of past visits.

The operation information accumulating unit 132 accumulates the operation information received by the operation information receiving unit 122, in the operation information storage unit 114. In this case, the operation information accumulating unit 132 accumulates operation information that is the same as or has the same meaning as the operation information received by the operation information receiving unit 122. That is to say, the operation information received by the operation information receiving unit 122 and the operation information accumulated by the operation information accumulating unit 132 may be different from each other in data structure or the like. For example, if the operation specifying information contained in the operation information received by the operation information receiving unit 122 is information on a primitive operation (e.g., "rightButtonON"), for example, the operation information accumulating unit 132 may change the operation specifying information into information (e.g., "Page OO is displayed") with which the meaning or implication of the operation can be determined, and accumulate the changed operation specifying information in the operation information storage unit 114. In this case, it is assumed that the correspondence between the information on a primitive operation and the information with which the meaning or implication of the operation can be determined is managed in the storage unit 11.

The management information determining unit 133 determines management information corresponding to the user identifier and the page identifier contained in the access information.

The management information determining unit 133 determines management information having user specifying information corresponding to the user identifier contained in the received access information and page specifying information corresponding to the page identifier contained in the received access information, from the management information storage unit 111.

The executing unit 134 executes processing corresponding to the management information determined by the management information determining unit 133, thereby acquiring a processing result. The processing corresponding to the management information is predetermined, for example. If the processing is predetermined, the processing corresponding to the management information is, for example, common to all pieces of management information. The processing corresponding to the management information is, for example, processing identified with the processing identifier contained in the management information.

For example, the executing unit 134 executes processing corresponding to the management information determined by the management information determining unit 133, thereby acquiring a processing result that is information on a user identified with the user identifier specified with the another-user specifying information contained in the management information determined by the management information determining unit 133.

For example, the executing unit 134 executes processing identified with the processing identifier contained in the management information determined by the management information determining unit 133.

For example, the executing unit 134 acquires user information on a user who is currently visiting a page identified with the page identifier contained in the access information. For example, the executing unit 134 receives information (e.g., a message, an advertisement, etc.) from the terminal apparatus 2 of the user, and configures information for transmitting the information to the user who is currently visiting the page identified with the page identifier contained in the access information. For example, the executing unit 134 performs statistical processing on previous operation specifying information for the page identified with the page identifier contained in the access information, thereby acquiring a processing result. For example, the executing unit 134 acquires page alteration information for altering the page identified with the page identifier contained in the access information.

The currently-visiting-user specifying part 1341 acquires, from the currently-visiting-user information storage unit 113, one or more user identifiers that are paired with a page identifier for identifying a page specified with the page specifying information contained in the management information determined by the management information determining unit 133.

The currently-visiting-user attribute value acquiring part 1342 acquires, for each of the one or more user identifiers acquired by the currently-visiting-user specifying part 1341, one or more user attribute values that are paired with the user identifier, from the user information storage unit 112, and acquires a processing result having one or more user attribute values for each user identifier.

The message transmitting/receiving part 1343 receives a message input by a user from the terminal apparatus 2, and configures information for transmitting the message to the terminal apparatuses 2 of users respectively identified with the one or more user identifiers acquired by the currently-visiting-user specifying part 1341. The message is, for example, text, but it may also be a still image, video, audio, or the like, and there is no limitation on the data type or data structure thereof. The message may also be information of two or more data types.

The message transmitting/receiving part 1343 receives a message input by a user from the terminal apparatus 2, and configures a processing result containing the message. Then, the message transmitting/receiving part 1343 acquires information (e.g., IP address, etc.) for transmitting the information to the terminal apparatuses 2 of users respectively identified with the one or more user identifiers acquired by the currently-visiting-user specifying part 1341. The processing result and the information for transmission are passed to the processing result transmitting unit 141, and the processing result transmitting unit 141 transmits the processing result to the terminal apparatus 2 specified with the information for transmission.

The statistical processing part 1344 acquires, from the operation information storage unit 114, one or more pieces of operation specifying information that are paired with a page identifier for identifying a page specified with the page specifying information contained in the management information determined by the management information determining unit 133, and performs statistical processing on the one or more pieces of operation specifying information, thereby acquiring a processing result. The processing result is, for example, a set of daily access counts to the page identified with the page identifier. The processing result is, for example, the total time spent in viewing the page identified by the page identifier, or the time spent per day in viewing the page identified by the page identifier. There is no limitation on the content of the statistical processing.

The statistical processing part 1344 may perform statistical processing on one or more pieces of access information containing a page identifier for identifying a page specified with the page specifying information contained in the management information determined by the management information determining unit 133, thereby acquiring a processing result. The processing result is, for example, the total number of visitors to the page identified with the page identifier, or the daily number of visitors to the page identified with the page identifier. There is no limitation on the content of the statistical processing.

The page alteration information acquiring part 1345 acquires a processing result that is page alteration information, which is information for altering the content of the page identified with the page identifier contained in the access information received by the access information receiving unit 121, from the management information storage unit 111. The page alteration information is, for example, stored in the management information storage unit 111 in association with the management information.

The transmitting unit 14 transmits various types of information. The various types of information are, for example, a processing result. The processing result is, for example, user information on a user who is currently visiting the page, a result obtained by performing statistical processing on previous operation specifying information of the page such as a message or an advertisement received from a terminal apparatus 2 of a user, page alteration information for altering the page, or the like.

The processing result transmitting unit 141 transmits the processing result acquired by the executing unit 134. The transmission destination of the processing result is, for example, a terminal apparatus 2 that accessed a page. The transmission destination of the processing result is, for example, a terminal apparatus 2 of a user who is currently visiting a page.

Various types of information are stored in the terminal storage unit 21 constituting the terminal apparatus 2. The various types of information are, for example, a user identifier.

The terminal accepting unit 22 accepts input of instructions, information, and the like from a user. The instructions, information, and the like are, for example, a page identifier for identifying a page, or an access instruction. The access instruction is an instruction to access a page such as a web page and has a page identifier. The accepting is a concept that encompasses accepting information input from an input device such as a keyboard, a mouse, or a touch panel, receiving information transmitted via a wired or wireless communication line, accepting information read from a recording medium such as an optical disk, a magnetic disk, or a semiconductor memory, and the like.

The instructions, information, and the like may be input by any device such as a touch panel, a keyboard, a mouse, or a menu screen. The terminal accepting unit 22 may be realized by a device driver for an input device such as a touch panel or a keyboard, control software for a menu screen, or the like.

The terminal processing unit 23 performs various types of processing. The various types of processing are, for example, processing for changing the instructions, information, and the like accepted by the terminal accepting unit 22 into instructions, information, and the like with a structure for transmission, processing for changing the information received by the terminal receiving unit 25 into information with a structure for output, or the like.

The page acquiring unit 231 constituting the terminal processing unit 23 acquires a page, using the page identifier accepted by the terminal accepting unit 22. For example, the page acquiring unit 231 accesses the server apparatus 3 identified with the page identifier accepted by the terminal accepting unit 22, and receives a page.

The terminal access information acquiring unit 232 acquires access information having the user identifier in the terminal storage unit 21 and the page identifier accepted by the terminal accepting unit 22, in response to the page acquiring unit 231 acquiring a page. The access information may further have information on the coordinate position (x, y) of the mouse pointer.

For example, the terminal access information acquiring unit 232 acquires access information having the user identifier in the terminal storage unit 21 and the page identifier accepted by the terminal accepting unit 22, in response to the page acquiring unit 231 acquiring a page, and acquires embedded information embedded in the received page. The embedded information is information for accessing the information processing apparatus 1. The embedded information is, for example, a tag (see FIG. 21) that is later-described embedded information. The embedded information is, for example, information for specifying a program for accessing the information processing apparatus 1.

The terminal transmitting unit 24 transmits the access information acquired by the terminal access information acquiring unit 232, to the information processing apparatus 1.

For example, the terminal transmitting unit 24 transmits the access information acquired by the terminal access information acquiring unit 232, to the information processing apparatus 1, using the embedded information.

For example, the terminal transmitting unit 24 transmits the access information acquired by the terminal access information acquiring unit 232, to the information processing apparatus 1, using any one of the following methods.

(1) Tag Method

For example, the terminal transmitting unit 24 executes function in a tag (see FIG. 21) that is embedded information, thereby acquiring transmission destination information of the information processing apparatus 1, and transmits the access information to the information processing apparatus 1 specified with the transmission destination information.

(2) Plug-In Method

For example, the terminal transmitting unit 24 executes a program plugged into a browser displaying a web page, thereby transmitting the access information to the information processing apparatus 1.

(3) Proxy Method

For example, the terminal transmitting unit 24 executes a program on a URL dispensed using the page identifier, thereby transmitting the access information to the information processing apparatus 1.

The terminal receiving unit 25 receives various types of information. In response to the terminal transmitting unit 24 transmitting access information, for example, the terminal receiving unit 25 receives a processing result from the information processing apparatus 1.

The terminal output unit 26 outputs the processing result received by the terminal receiving unit 25 and the page acquired by the page acquiring unit 231. The output is typically display on a display screen, but may be a concept that encompasses projection using a projector, printing by a printer, output of a sound, transmission to an external apparatus, accumulation in a recording medium, delivery of a processing result to another processing apparatus or another program, and the like.

The server apparatus 3 is a server that, in response to a request from the terminal apparatus 2, transmits a page stored therein to the terminal apparatus 2.

Various types of information are stored in the server storage unit 31 constituting the server apparatus 3. The various types of information are, for example, one or more web pages.

The server accepting unit 32 accepts various types of instructions and information. The various types of instructions and information are, for example, an instruction to access a web page.

The server processing unit 33 performs various types of processing. The various types of processing are, for example, processing for acquiring a web page corresponding to an access instruction, from the server storage unit 31.

The server transmitting unit 34 transmits various types of information. For example, the server transmitting unit 34 transmits the web page acquired by the server processing unit 33, to the terminal apparatus 2 from which the access instruction was transmitted.

The server receiving unit 35 receives various types of instructions and information. For example, the server receiving unit 35 receives access instruction from the terminal apparatus 2.

The server output unit 36 outputs various types of information.

The storage unit 11, the management information storage unit 111, the user information storage unit 112, the currently-visiting-user information storage unit 113, the operation information storage unit 114, the terminal storage unit 21, and the server storage unit 31 are preferably non-volatile recording media, but can also be realized by volatile recording media.

There is no limitation on the procedure in which information is stored in the storage unit 11 and the like. For example, information may be stored in the storage unit 11 and the like via a recording medium, information transmitted via a communication line or the like may be stored in the storage unit 11 and the like, or information input via an input device may be stored in the storage unit 11 and the like.

The receiving unit 12, the access information receiving unit 121, the operation information receiving unit 122, the message transmitting/receiving part 1343, the terminal receiving unit 25, and the server receiving unit 35 are typically realized by wired or wireless communication parts, but may also be realized by broadcast receiving parts.

The processing unit 13, the currently-visiting-user information accumulating unit 131, the operation information accumulating unit 132, the management information determining unit 133, the executing unit 134, the currently-visiting-user specifying part 1341, the currently-visiting-user attribute value acquiring part 1342, the message transmitting/receiving part 1343, the statistical processing part 1344, the page alteration information acquiring part 1345, the alteration information transmitting part 1346, the terminal processing unit 23, the terminal access information acquiring unit 232, and the server processing unit 33 may be typically realized by MPUs, memories, or the like. Typically, the processing procedure of the processing unit 13 and the like is realized by software, and the software is stored in a storage medium such as a ROM. Note that the processing procedure may be realized by hardware (dedicated circuits).

The transmitting unit 14, the processing result transmitting unit 141, the terminal transmitting unit 24, and the server transmitting unit 34 are typically realized by wired or wireless communication parts, but may also be realized by broadcasting parts.

The page acquiring unit 231 may be realized by a transmitting/receiving part.

The terminal output unit 26 and the server output unit 36 may be considered to include or to not include an output device such as a display screen or a speaker. The terminal output unit 26 and the like may be realized by driver software for an output device, a combination of driver software for an output device and the output device, or the like.

Next, an operation of the information system A will be described. First, an operation example of the information processing apparatus 1 will be described with reference to the flowchart in FIG. 4.

(Step S401) The access information receiving unit 121 determines whether or not it has received access information. If it has received access information, the procedure advances to step S402, or otherwise the procedure advances to step S405.

(Step S402) The currently-visiting-user information accumulating unit 131 acquires a user identifier and a page identifier contained in the access information received in step S401. Then, the currently-visiting-user information accumulating unit 131 configures currently-visiting-user information having the acquired user identifier and page identifier.

(Step S403) The currently-visiting-user information accumulating unit 131 accumulates the currently-visiting-user information configured in step S402, in the currently-visiting-user information storage unit 113.

(Step S404) The processing unit 13 performs processing result acquisition/transmission processing. The procedure returns to step S401. An example of the processing result acquisition/transmission processing will be described with reference to the flowchart in FIG. 5. The processing result acquisition/transmission processing is processing for acquiring and transmitting a processing result.

(Step S405) The operation information receiving unit 122 determines whether or not it has received operation information. If it has received operation information, the procedure advances to step S406, or otherwise the procedure returns to step S401.

(Step 8406) The operation information accumulating unit 132 acquires, from the storage unit 11, information that is paired with operation specifying information contained in the operation information received in step S405, the information being information with which the meaning or implication of the operation can be determined. Thus acquired information is also operation specifying information. Then, the operation information accumulating unit 132 configures operation information having the acquired operation specifying information, and the user identifier and the page identifier contained in the received operation information. In this case, the operation information accumulating unit 132 may acquire the operation information received in step S405, as is, as operation information that is to be accumulated.

(Step S407) The operation information accumulating unit 132 accumulates the operation information configured in step S406, in the operation information storage unit 114.

(Step S408) The processing unit 13 determines whether or not the operation information received in step S406 means that viewing of the page that the user was viewing immediately before has been stopped. If it means that the viewing has been stopped, the procedure advances to step S409, or otherwise the procedure returns to step S401. The case in which it means that the viewing has been stopped is, for example, a case in which the operation information is information for stopping viewing of a web page (e.g., information of pressing a button to close the page, information of logout from the web page, etc.), a case in which the operation information is information on operation to start viewing of a next web page, or the like.

(Step S409) The processing unit 13 deletes, from the currently-visiting-user information storage unit 113, the currently-visiting-user information containing the user identifier contained in the operation information received in step S406 but not containing a page identifier of a page whose viewing was started immediately before. The procedure returns to step S401.

Figure 4:
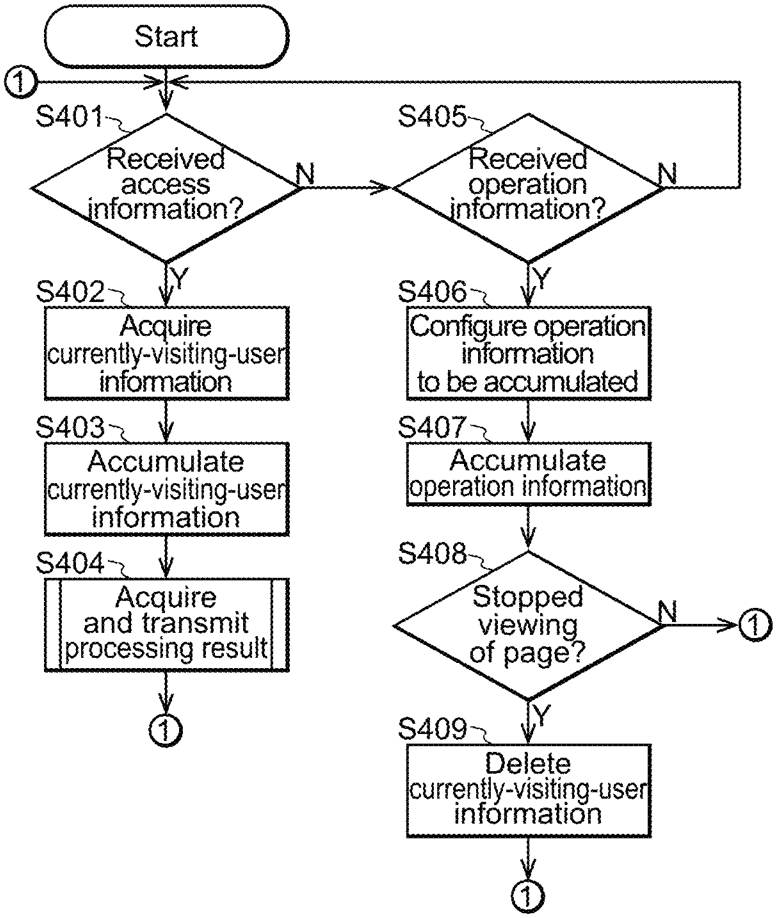
FIG. 4 is a flowchart illustrating an operation example of the information processing apparatus 1 in the embodiment.

In the flowchart in FIG. 4, the processing ends at power off or at an interruption of termination processing.

Figure 5:
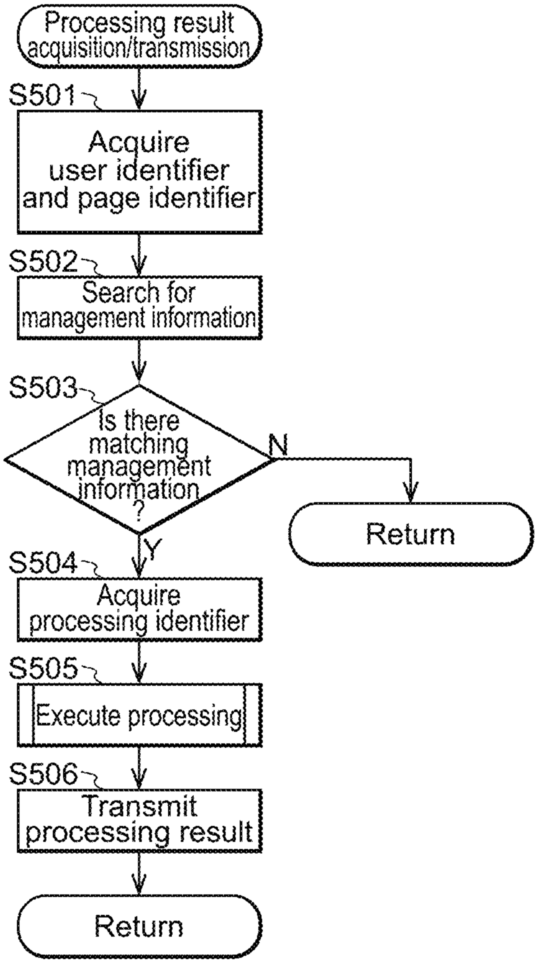
FIG. 5 is a flowchart illustrating an example of processing result acquisition/transmission processing in the embodiment.

Next, an example of the processing result acquisition/transmission processing in step S404 will be described with reference to the flowchart in FIG. 5.

(Step S501) The management information determining unit 133 acquires the user identifier and the page identifier contained in the received access information.

(Step S502) The management information determining unit 133 searches the management information storage unit 111 for management information corresponding to the user identifier and the page identifier acquired in step S501. Note that there may be cases in which no management information is retrieved.

(Step S503) The management information determining unit 133 determines whether or not management information has been retrieved in step S502. If management information has been retrieved, the procedure advances to step S504, or otherwise the procedure returns to the upper-level processing.

(Step S504) The executing unit 134 acquires a processing identifier corresponding to the retrieved management information.

(Step S505) The executing unit 134 executes processing identified with the processing identifier acquired in step S504, thereby acquiring a processing result. In this case, the executing unit 134 acquires one or more pieces of transmission destination information for specifying a transmission destination of the processing result. An example of the processing execution processing will be described with reference to the flowcharts in FIGS. 6 to 9.

(Step S506) The processing result transmitting unit 141 transmits the processing result acquired in step S505 to the one or more terminal apparatuses 2 respectively specified with the one or more pieces of transmission destination information acquired in step S505. The procedure returns to the upper-level processing.

Figure 6:
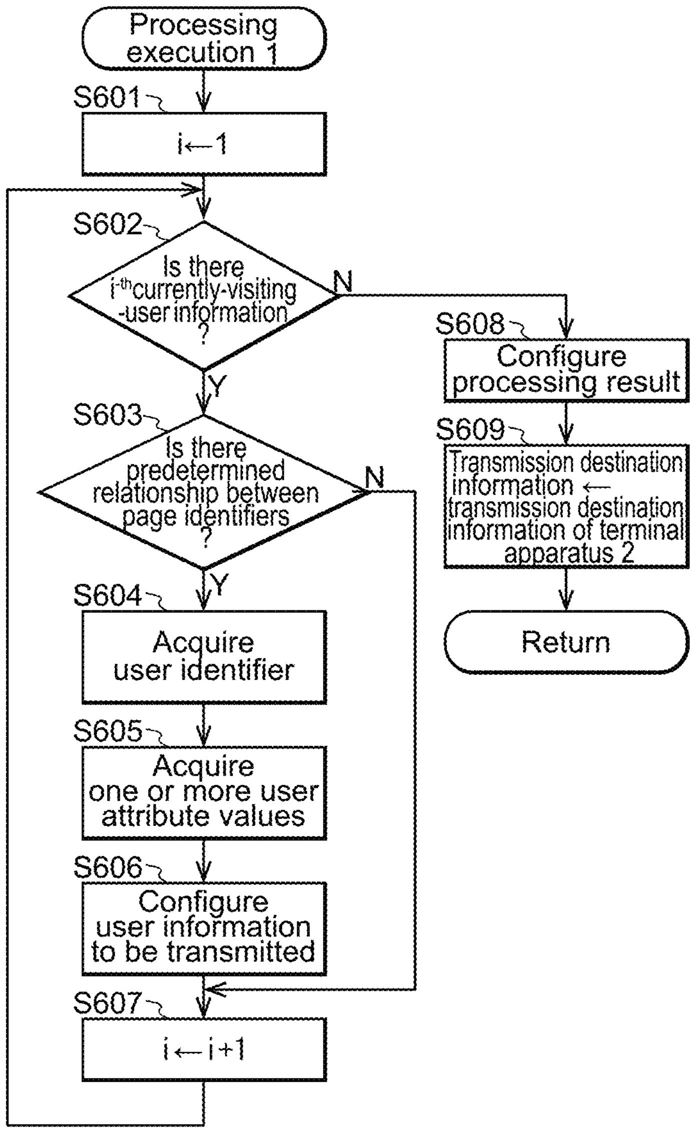
FIG. 6 is a flowchart illustrating a first example of processing execution processing in the embodiment.

Next, a first example of the processing execution processing in step S505 will be described with reference to the flowchart in FIG. 6. The first example of the processing execution processing is processing identified with the processing identifier "acquire currently-visiting-user information". The first example of the processing execution processing is processing for acquiring user information on a user who is currently visiting a page identified with the page identifier contained in the access information.

(Step S601) The executing unit 134 substitutes 1 for a counter i.

(Step S602) The executing unit 134 determines whether or not there is an $i^{-th}$ piece of currently-visiting-user information in the currently-visiting-user information storage unit 113. If there is an $i^{-th}$ piece of currently-visiting-user information, the procedure advances to step S603, or otherwise the procedure advances to step S608.

(Step S603) The currently-visiting-user specifying part 1341 determines whether or not there is a predetermined relationship between the received page identifier and the page identifier contained in the $i^{-th}$ piece of currently-visiting-user information. If there is a predetermined relationship therebetween, the procedure advances to step S604, or otherwise the procedure advances to step S607. The predetermined relationship is typically matching. The predetermined relationship is, for example, that the page identifier contained in the $i^{-th}$ piece of currently-visiting-user information is the page identifier of the page in the same site as the received page identifier. The page identifier of the page in the same site is, for example, that they match each other up to a predetermined path of the page identifier that is a URL.

(Step S604) The currently-visiting-user specifying part 1341 acquires a user identifier contained in the $i^{-th}$ piece of currently-visiting-user information.

(Step S605) The currently-visiting-user attribute value acquiring part 1342 acquires, from the user information storage unit 112, one or more user attribute values that are paired with the user identifier acquired in step S604 and are one or more predetermined user attribute values. The one or more user attribute values may further have the coordinate information of the mouse pointer of the terminal apparatus 2.

(Step S606) The currently-visiting-user attribute value acquiring part 1342 configures user information, which is information having the one or more user attribute values acquired in step S605 and is information that is to be transmitted. The user information is typically part of the user information stored in the user information storage unit 112.

(Step S607) The executing unit 134 increments the counter i by 1. The procedure returns to step S602.

(Step S608) The currently-visiting-user attribute value acquiring part 1342 configures a processing result that is to be transmitted, using the one or more pieces of user information acquired in step S606.

(Step S609) The executing unit 134 substitutes transmission destination information of a terminal apparatus 2 from which the access information was transmitted (e.g., the IP address of the terminal apparatus 2) for the variable "transmission destination information". The procedure returns to the upper-level processing.

Next, a second example of the processing execution processing in step S505 will be described with reference to the flowchart in FIG. 7. The second example of the processing execution processing is processing identified with the processing identifier "transmit message". The second example of the processing execution processing is processing for receiving a message from the terminal apparatus 2 of the user, and configuring information for transmitting the message to the user who is currently visiting the page identified with the page identifier contained in the access information. The message may also be simply said to be information.

(Step S701) The message transmitting/receiving part 1343 determines whether or not it has received information from the terminal apparatus 2. If it has received information, the procedure advances to step S702, or otherwise the procedure returns to step S701.

(Step S702) The message transmitting/receiving part 1343 temporarily stores the information received in step S701, in an unshown buffer.

(Step S703) The message transmitting/receiving part 1343 substitutes 1 for a counter i.

(Step S704) The message transmitting/receiving part 1343 determines whether or not there is an $i^{-th}$ piece of currently-visiting-user information in the currently-visiting-user information storage unit 113. If there is an $i^{-th}$ piece of currently-visiting-user information, the procedure advances to step S705, or otherwise the procedure advances to step S709.

(Step S705) The message transmitting/receiving part 1343 determines whether or not there is a predetermined relationship between the received page identifier and the page identifier contained in the $i^{-th}$ piece of currently-visiting-user information. If there is a predetermined relationship therebetween, the procedure advances to step S706, or otherwise the procedure advances to step S708.

(Step S706) The message transmitting/receiving part 1343 acquires a user identifier contained in the $i^{-th}$ piece of currently-visiting-user information.

(Step S707) The message transmitting/receiving part 1343 temporarily stores the transmission destination information that is paired with the user identifier acquired in step S706, in an unshown buffer.

(Step S708) The executing unit 134 increments the counter i by 1. The procedure returns to step S704.

(Step S709) The message transmitting/receiving part 1343 reads the information temporarily stored in step S702, and configures a processing result that is to be transmitted, the processing result containing the information.

(Step S710) The message transmitting/receiving part 1343 substitutes the one or more pieces of transmission destination information temporarily stored in step S707 for the variable "transmission destination information". This processing is processing for acquiring transmission destination information using which the processing result is to be transmitted. The procedure returns to the upper-level processing.

Figure 7:
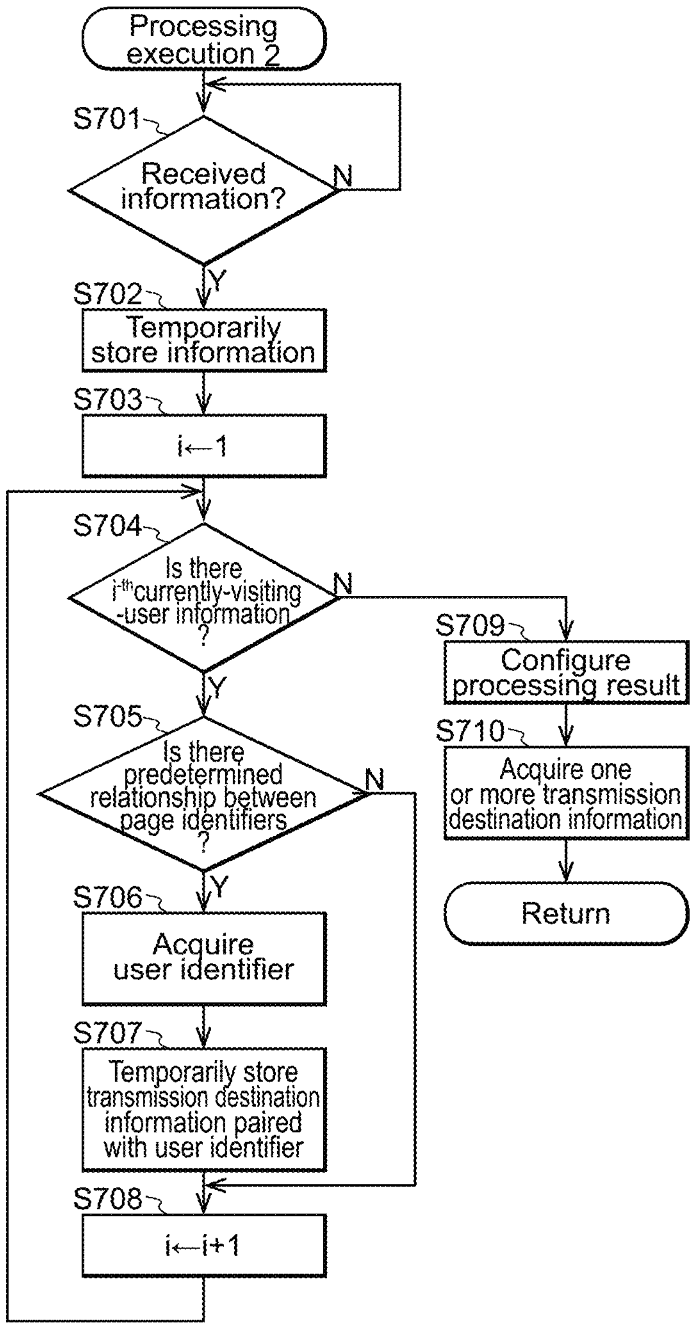
FIG. 7 is a flowchart illustrating a second example of processing execution processing in the embodiment.

In the flowchart in FIG. 7, step S702 and subsequent steps may be executed through an interruption or the like immediately after information is received from the terminal apparatus 2, and the processing may be put into a wait state or other processing execution processing may be performed until information is received from the terminal apparatus 2.

Figure 8:
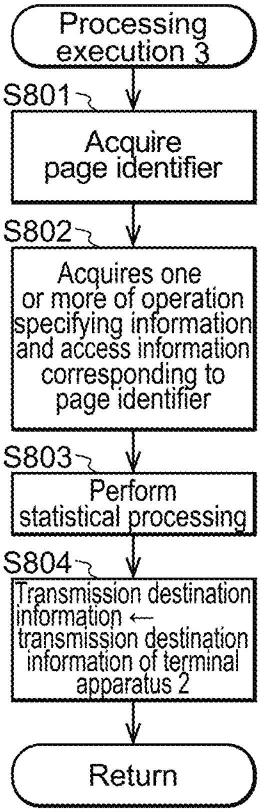
FIG. 8 is a flowchart illustrating a third example of processing execution processing in the embodiment.

Next, a third example of the processing execution processing in step S505 will be described with reference to the flowchart in FIG. 8. The third example of the processing execution processing is processing identified with the processing identifier "statistical processing". The third example of the processing execution processing is processing for performing statistical processing on previous operation specifying information for the page identified with the page identifier contained in the access information, thereby acquiring a processing result.

(Step S801) The statistical processing part 1344 acquires the page identifier contained in the received access information.

(Step S802) The statistical processing part 1344 acquires one or more of the operation specifying information and the access information corresponding to the page identifier acquired in step S801. The operation specifying information and the access information corresponding to the page identifier are typically operation specifying information that is paired with the page identifier that matches the page identifier, and access information containing the page identifier that matches the page identifier. Note that the operation specifying information and the access information corresponding to the page identifier may be operation specifying information that is paired with the page identifier of the page in the same site as the page identified with the page identifier, and access information containing the page identifier of the page in the same site as the page identified with the page identifier. The statistical processing part 1344 preferably uses, as access information that is to be subjected to statistical processing, currently-visiting-user information (including information to which the deletion flag is added) stored in the currently-visiting-user information storage unit 113.

(Step S803) The statistical processing part 1344 performs statistical processing on one or more of the operation specifying information and the access information acquired in step S802, thereby acquiring a processing result.

(Step S804) The statistical processing part 1344 substitutes transmission destination information of a terminal apparatus 2 from which the access information was transmitted (e.g., the IP address of the terminal apparatus 2) for the variable "transmission destination information". The procedure returns to the upper-level processing.

Figure 9:
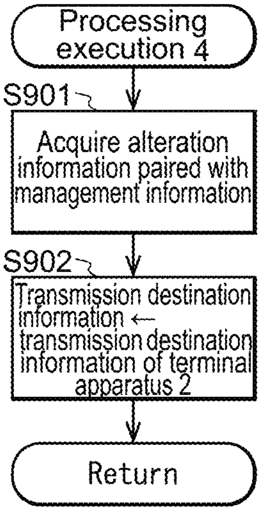
FIG. 9 is a flowchart illustrating a fourth example of processing execution processing in the embodiment.

Next, a fourth example of the processing execution processing in step S505 will be described with reference to the flowchart in FIG. 9. The fourth example of the processing execution processing is processing identified with the processing identifier "transmit alteration information". The fourth example of the processing execution processing is processing for acquiring page alteration information for altering the page identified with the page identifier contained in the access information.

(Step S901) The page alteration information acquiring part 1345 acquires page alteration information that is paired with retrieved management information.

(Step S902) The page alteration information acquiring part 1345 substitutes transmission destination information of a terminal apparatus 2 from which the access information was transmitted (e.g., the IP address of the terminal apparatus 2) for the variable "transmission destination information". The procedure returns to the upper-level processing.

Next, an operation example of the terminal apparatus 2 will be described with reference to the flowchart in FIG. 10.

(Step S1001) The terminal accepting unit 22 determines whether or not it has accepted an access instruction. If it has accepted an access instruction, the procedure advances to step S1002, or otherwise the procedure returns to step S1001.

(Step S1002) The page acquiring unit 231 acquires a page identifier contained in the access instruction accepted in step S1001.

(Step S1003) The page acquiring unit 231 acquires a page from the server apparatus 3, using the page identifier acquired in step S1002.

(Step S1004) The terminal access information acquiring unit 232 configures access information, using the page identifier acquired in step S1002 and the user identifier stored in the terminal storage unit 21.

(Step S1005) The terminal transmitting unit 24 transmits the access information configured in step S1004, to the information processing apparatus 1.

(Step S1006) The terminal receiving unit 25 determines whether or not it has received a processing result. If it has received a processing result, the procedure advances to step S1007, or otherwise the procedure advances to step S1008.

(Step S1007) The terminal output unit 26 outputs the page acquired in step S1003 and the processing result received in step S1006. The procedure returns to step S1001.

(Step S1008) The terminal processing unit 23 determines whether or not a timeout has occurred. If a timeout has occurred, the procedure advances to step S1009, or otherwise the procedure returns to step S1006. There is no limitation on the time taken until it is determined that a timeout has occurred.

(Step S1009) The terminal output unit 26 outputs the page acquired in step S1003. The procedure returns to step S1001.

Figure 10:
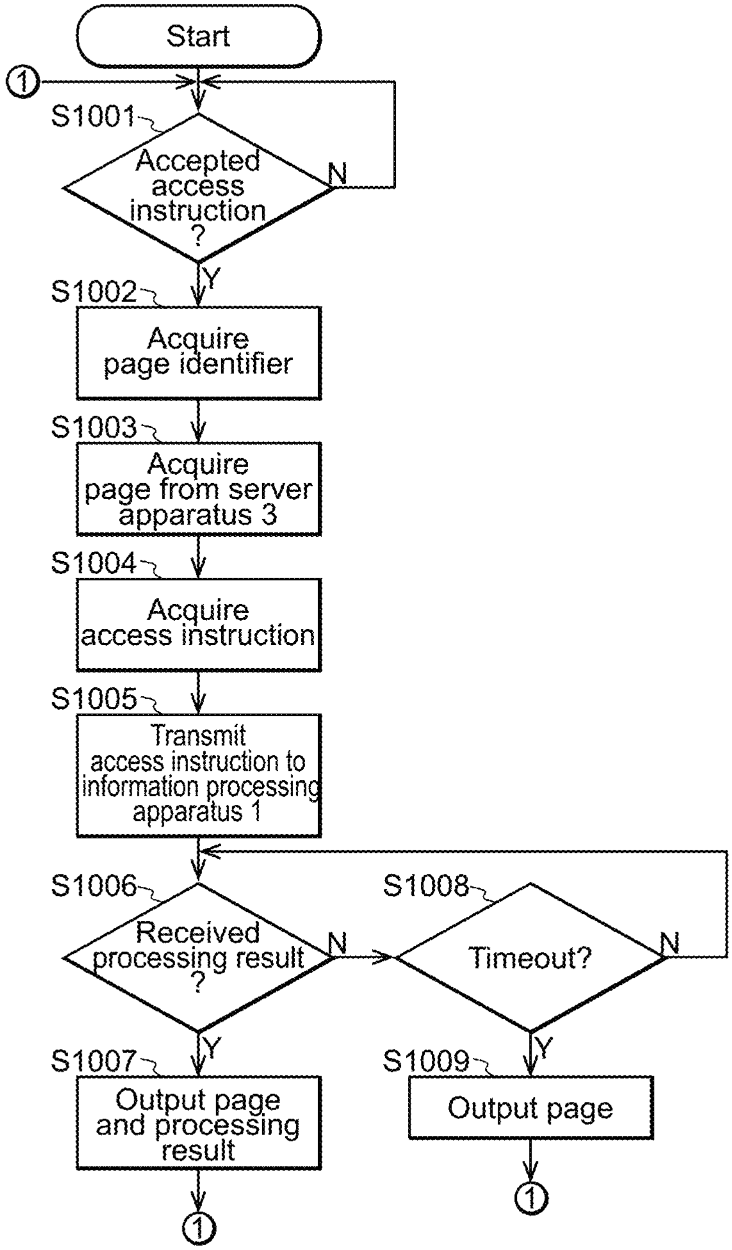
FIG. 10 is a flowchart illustrating an operation example of a terminal apparatus 2 in the embodiment.

In the flowchart in FIG. 10, the processing ends at power off or at an interruption of termination processing.

Next, an operation example of the server apparatus 3 will be described. The server receiving unit 35 of the server apparatus 3 receives an instruction to acquire a page, from the terminal apparatus 2. Then, the server processing unit 33 reads the page corresponding to the acquisition instruction, from the server storage unit 31. Next, the server transmitting unit 34 transmits the page to the terminal apparatus 2.

Hereinafter, a specific operation of the information system A in this embodiment will be described. FIG. 1 is a conceptual diagram of the information system A.

Figure 11:
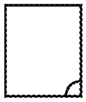
FIG. 11 is a diagram showing a management information management table in the embodiment.

It is assumed that a management information management table shown in FIG. 11 is stored in the management information storage unit 111 of the information processing apparatus 1. The management information management table is a table for managing one or more pieces of management information. One or more records each having "ID", "user specifying information", "page specifying information", "another-user specifying information", "processing identifier", and "alteration information" are stored in the management information management table. Note that the attribute value "-" means "NULL". Also, "*" of "another-user specifying information" means all other users.

In FIG. 11, the record with "ID=1" indicates that, when a user with the user identifier "U01" accesses a web page identified with the page identifier "URL1", user information on all other users who are visiting the web page identified with the page identifier "URL1" is acquired.

In FIG. 11, the record with "ID=2" indicates that, when a user with the user identifier "U02" accesses a web page identified with the page identifier "URL2", a message that was transmitted from the user with the user identifier "U02" is transmitted to terminal apparatuses 2 of users who satisfy the user attribute value "score>=50" and are visiting the web page identified with the page identifier "URL2".

In FIG. 11, the record with "ID=3" indicates that, when a user corresponding to an administrator (the administrator flag=1) accesses a web page identified with the page identifier "URL3", a result obtained by performing statistical processing on information (access information or operation information) on accesses to the page is acquired and transmitted to the terminal apparatus 2 of the administrator.

In FIG. 11, the record with "ID=4" indicates that, when a user corresponding to an administrator (the administrator flag=1) accesses a web page identified with the page identifier "URL4", managed page alteration information is acquired and transmitted to the terminal apparatus 2 of the administrator. The page alteration information is information for altering the web page identified with the page identifier "URL4".

Furthermore, a user information management table shown in FIG. 12 is stored in the user information storage unit 112. Records each having "user identifier", "name", "e-mail address", "static attribute value", and "dynamic attribute value" are stored in the user information management table.

"Static attribute value" is information received from the terminal apparatus 2 and accumulated by the information processing apparatus 1. "Static attribute value" in this example has "gender", "age", "unmarried/married", "place of birth", "administrator flag", and the like. "Unmarried/married" is information indicating whether the user is unmarried or married. "Administrator flag" is information indicating whether or not the user of the information processing apparatus 1 is an administrator. In this example, a user corresponding to the value "1" of the administrator flag is an administrator, and a user corresponding to the value "0" of the administrator flag is not an administrator.

"Dynamic attribute value" is information acquired by the processing unit 13 described above through analysis of the operation information in the operation information storage unit 114. "Dynamic attribute value" in this example has "real-time dynamic attribute value" and "historical-information-using dynamic attribute value". "Real-time dynamic attribute value" in this example has "time spent" and "number of pages viewed". "Time spent" is the time spent on the site during the current visit. "Number of pages viewed" is the number of pages viewed on the site during the current visit. "Historical-information-using dynamic attribute value" in this example has "number of visits", "number of purchases", "purchase total", "average number of PVs", "score", and the like. "Number of visits" is the number of times the user visited this e-commerce site (e.g., the site including the pages identified with URL1 and URL2) so far. "Number of purchases" is the number of times the user purchased products on the e-commerce site so far. "Purchase total" is the total amount of money the user spent on products on the e-commerce site so far. "Average number of PVs" is an average number of pages viewed per visit of the user. "Score" is a score of the user. In this example, it is assumed that an operation expression for calculating a score using an increasing function whose parameters are one or more of the attribute values "number of visits", "number of purchases", "purchase total", and "average number of PVs" is stored in the storage unit 11. Then, the processing unit 13 acquires one or more of the attribute values "number of visits", "number of purchases", "purchase total", and "average number of PVs" of each user, and substitutes the one or more attribute values for the increasing function, thereby calculating a score of the user. This operation expression is preferably an operation expression for calculating a score using one or more pieces of information of the static attribute values. The operation expression may be, for example, an operation expression for performing calculation so as to increase the score value for a member "1". For example, the operation expression preferably multiplies the score value by 1.1 for a member "1", and does not change the score value for a member "0".

Furthermore, a currently-visiting-user information management table shown in FIG. 13 is stored in the currently-visiting-user information storage unit 113. One or more records each having "ID", "page identifier", "user identifier", "time information", and "deletion flag" are stored in the currently-visiting-user information management table. "Time information" is information indicating the time when the user started the visit to the page, and is information indicating the time when the access information receiving unit 121 received access information. If the value of "deletion flag" is "0", it indicates that the user is currently viewing the page. If viewing of the page is stopped, the value of "deletion flag" is set to "1".

Moreover, an operation information management table shown in FIG. 14 is stored in the operation information storage unit 114. One or more records each having "ID", "user identifier", "date/time", "page identifier", and "operation specifying information" are stored in operation information management table. "Operation specifying information" is information obtained by the processing unit 13 converting the received primitive operation specifying information into information with which the meaning or implication of the operation can be determined by a user (e.g., the administrator of the information processing apparatus 1). The processing for configuring, from information on a primitive operation, operation information with which the meaning or implication of the operation can be determined is a known technique, and thus a detailed description thereof has been omitted.

In this situation, the following four specific examples will be described.

Specific Example 1

Figure 15:
FIG. 15 is a diagram showing an example of a web page in the embodiment.

It is assumed that a web page that is accessible with the page identifier "URL1" is stored in the server apparatus 3. FIG. 15 shows such a web page.

Then, it is assumed that a user identified with the user identifier "U01" has input an access instruction containing the page identifier "URL1" to the terminal apparatus 2. Accordingly, the terminal accepting unit 22 of the terminal apparatus 2 accepts the access instruction. Next, the page acquiring unit 231 acquires the page identifier "URL1" contained in the access instruction. Then, the page acquiring unit 231 receives the web page in FIG. 15 from the server apparatus 3, using the page identifier "URL1". Next, the terminal access information acquiring unit 232 configures access information "U01, URL1", using the acquired page identifier "URL1" and the user identifier "U01" stored in the terminal storage unit 21. Then, the terminal transmitting unit 24 transmits the access information "U01, URL1" to the information processing apparatus 1.

Next, the access information receiving unit 121 of the information processing apparatus 1 receives the access information "U01, URL1".

Then, the currently-visiting-user information accumulating unit 131 acquires the user identifier "U01" and the page identifier "URL1" contained in the access information, and configures currently-visiting-user information having the acquired user identifier and page identifier. Then, the currently-visiting-user information accumulating unit 131 accumulates the configured currently-visiting-user information in the currently-visiting-user information management table in FIG. 13.

Next, the processing unit 13 performs processing result acquisition/transmission processing as follows. First, the management information determining unit 133 acquires the user identifier "U01" and the page identifier "URL1" contained in the received access information. Then, the management information determining unit 133 searches the management information management table in FIG. 11 for management information corresponding to the acquired user identifier and page identifier. That is to say, the management information determining unit 133 searches for the record with "ID=1" in FIG. 11.

Next, the executing unit 134 acquires a processing identifier "acquire currently-visiting-user information" that is paired with the retrieved management information.

Next, the executing unit 134 executes processing identified with the acquired processing identifier "acquire currently-visiting-user information", thereby acquiring a processing result. That is to say, the executing unit 134 executes the processing described with reference to the flowchart in FIG. 6. As a result, the executing unit 134 acquires user information on a large number of users who are visiting the web page identified with the page identifier "URL1".

Next, the processing result transmitting unit 141 transmits the acquired processing result (the user information on the large number of users) to the terminal apparatus 2 from which the access information was transmitted.

Next, the terminal receiving unit 25 of the terminal apparatus 2 receives the processing result from the information processing apparatus 1.

Figure 16:
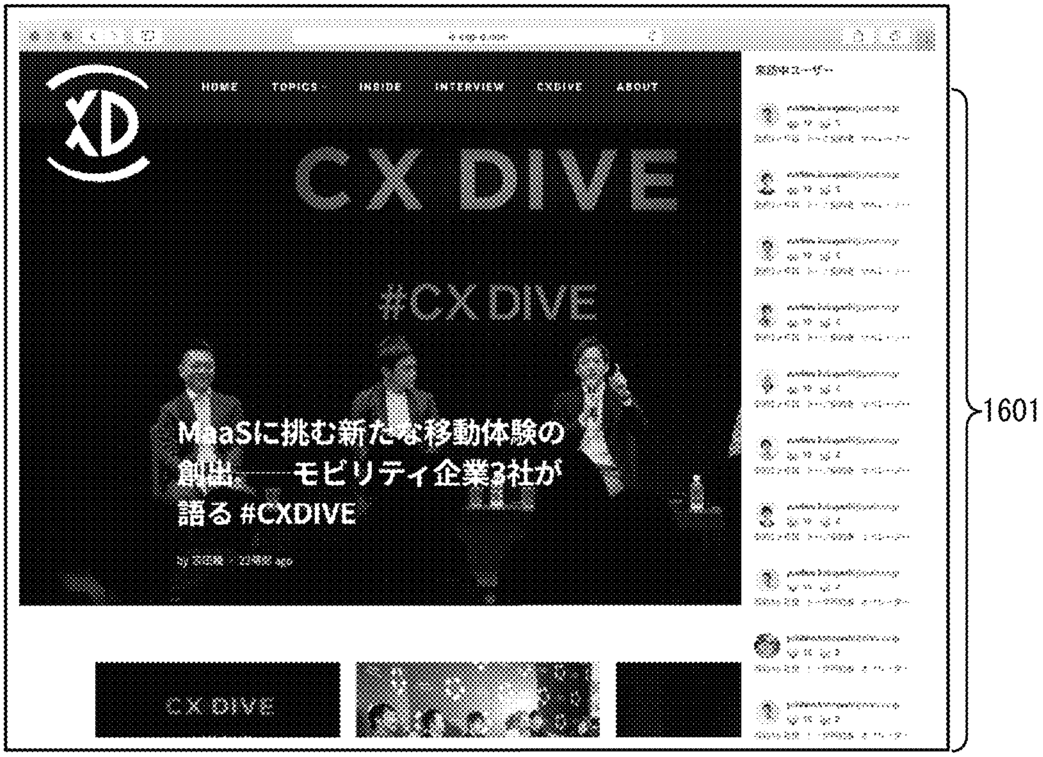
FIG. 16 is a diagram showing an output example in the embodiment.

Then, the terminal output unit 26 outputs the received web page and the received processing result. FIG. 16 shows an output example in this case. In FIG. 16, 1601 denotes user information on a large number of other users who are viewing a displayed web page.

Figure 17:
FIG. 17 is a diagram showing an output example in the embodiment.

The output web page and processing result may be as shown in FIG. 17. In FIG. 17, 1701 and 1702 indicate the positions at which mouse pointers are present on a web page screen that the corresponding users are viewing. In this case, the user information contained in the received processing result contains the coordinate information (x, y) of the mouse pointer of the terminal apparatus 2. The terminal output unit 26 outputs the whole or part of the user information to the position on the screen corresponding to this coordinate information (x, y).

Through this processing, a user who is an administrator of a page can view not only the page that the administrator is viewing but also information on other users who are currently visiting the page, as a result of which, for example, the administrator can easily take an action to other users who are visiting the page.

Specific Example 2

It is assumed that a web page that is accessible with the page identifier "URL2" is stored in the server apparatus 3. FIG. 15 shows such a web page.

Then, it is assumed that a user identified with the user identifier "U02" has input an access instruction containing the page identifier "URL2" to the terminal apparatus 2. Accordingly, the terminal accepting unit 22 of the terminal apparatus 2 accepts the access instruction. Next, the page acquiring unit 231 acquires the page identifier "URL2" contained in the access instruction. Then, the page acquiring unit 231 receives the web page in FIG. 15 from the server apparatus 3, using the page identifier "URL2". Next, the terminal access information acquiring unit 232 configures access information "U02, URL2", using the acquired page identifier "URL2" and the user identifier "U02" stored in the terminal storage unit 21. Then, the terminal transmitting unit 24 transmits the access information "U02, URL2" to the information processing apparatus 1.

Next, the access information receiving unit 121 of the information processing apparatus 1 receives the access information "U02, URL2".

Then, the currently-visiting-user information accumulating unit 131 acquires the user identifier "U02" and the page identifier "URL2" contained in the access information, and configures currently-visiting-user information having the acquired user identifier and page identifier. Then, the currently-visiting-user information accumulating unit 131 accumulates the configured currently-visiting-user information in the currently-visiting-user information management table in FIG. 13.

Next, the processing unit 13 performs processing result acquisition/transmission processing as follows. First, the management information determining unit 133 acquires the user identifier "U02" and the page identifier "URL2" contained in the received access information. Then, the management information determining unit 133 searches the management information management table in FIG. 11 for management information corresponding to the acquired user identifier and page identifier. That is to say, the management information determining unit 133 searches for the record with "ID=2" in FIG. 11.

Next, the executing unit 134 acquires a processing identifier "transmit message" that is paired with the retrieved management information.

Next, the executing unit 134 executes processing identified with the acquired processing identifier "transmit message", thereby acquiring a processing result. That is to say, the executing unit 134 executes processing described with reference to the flowchart in FIG. 7. As a result, the executing unit 134 receives a message "Thank you for visiting our store. I am Koba, the store manager. This item just arrived this morning! I thought you might like it . . . " and an image from the terminal apparatus 2. Then, the received message and image are transmitted to a terminal apparatus 2 of a user who is visiting the web page identified with the page identifier "URL2" and satisfies "score>=50".

Figure 18:
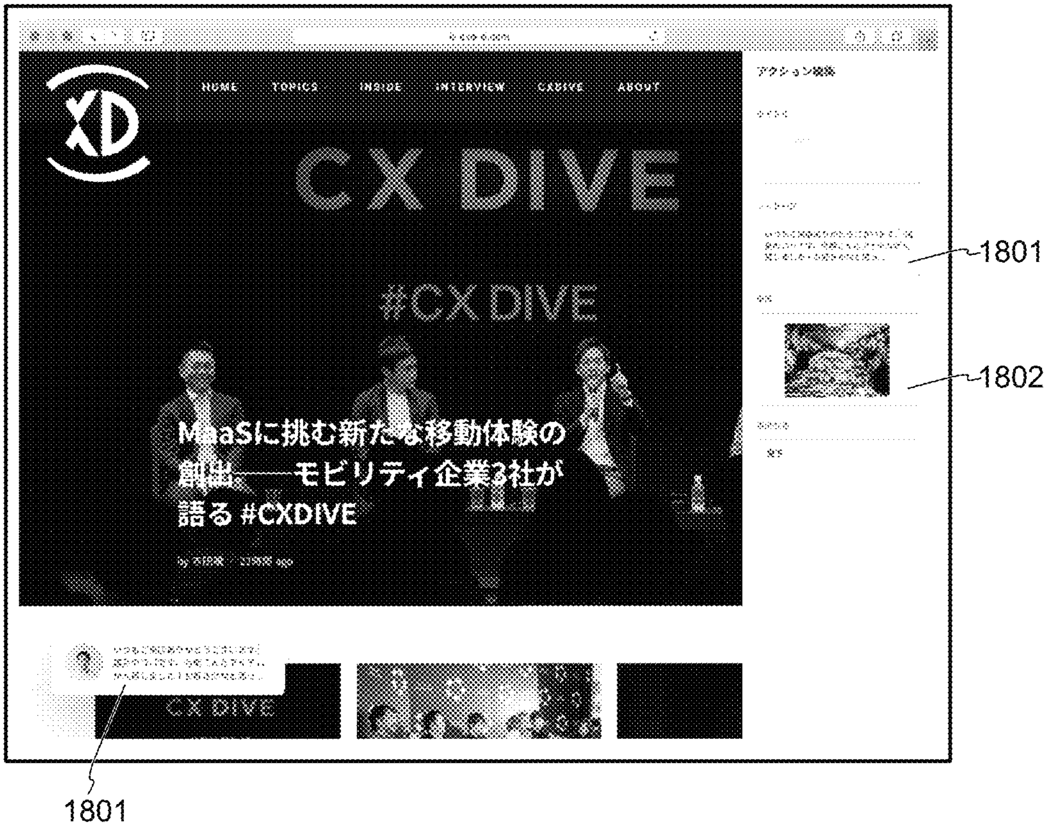
FIG. 18 is a diagram showing an output example in the embodiment.

Then, the terminal apparatus 2 of the user outputs the received message and image while the user is viewing the web page identified with the page identifier "URL2". FIG. 18 shows an output example. In FIG. 18, 1801 denotes a message, and 1802 denotes an image.

The above-described processing assumes that the user identified with the user identifier "U02" has input the message and the image to his or her terminal apparatus 2 and transmitted them to the information processing apparatus 1.

Through this processing, a user who is an administrator of a page can transmit information such as a message to terminal apparatuses 2 of other users who are currently visiting the page that the administrator is viewing.

Specific Example 3

It is assumed that a web page that is accessible with the page identifier "URL3" is stored in the server apparatus 3. FIG. 15 shows such a web page.

Then, it is assumed that a user identified with the user identifier "U01" has input an access instruction containing the page identifier "URL3" to the terminal apparatus 2. Accordingly, the terminal accepting unit 22 of the terminal apparatus 2 accepts the access instruction. Next, the page acquiring unit 231 acquires the page identifier "URL3" contained in the access instruction. Then, the page acquiring unit 231 receives the web page in FIG. 15 from the server apparatus 3, using the page identifier "URL3". Next, the terminal access information acquiring unit 232 configures access information "U01, URL3", using the acquired page identifier "URL3" and the user identifier "U01" stored in the terminal storage unit 21. Then, the terminal transmitting unit 24 transmits the access information "U01, URL3" to the information processing apparatus 1.

Next, the access information receiving unit 121 of the information processing apparatus 1 receives the access information "U01, URL3".

Then, the currently-visiting-user information accumulating unit 131 acquires the user identifier "U01" and the page identifier "URL3" contained in the access information, and configures currently-visiting-user information having the acquired user identifier and page identifier. Then, the currently-visiting-user information accumulating unit 131 accumulates the configured currently-visiting-user information in the currently-visiting-user information management table in FIG. 13.

Next, the processing unit 13 performs processing result acquisition/transmission processing as follows. First, the management information determining unit 133 acquires the user identifier "U01" and the page identifier "URL3" contained in the received access information. Then, the management information determining unit 133 acquires an administrator flag "1" that is paired with the acquired user identifier "U01" from the user information management table in FIG. 12, and searches the management information management table in FIG. 11 for management information corresponding to the administrator flag "1" and the page identifier "URL3". That is to say, the management information determining unit 133 searches for the record with "ID=3" in FIG. 11.

Next, the executing unit 134 acquires a processing identifier "statistical processing" that is paired with the retrieved management information.

Next, the executing unit 134 executes processing identified with the acquired processing identifier "statistical processing", thereby acquiring a processing result. That is to say, the executing unit 134 executes processing described with reference to the flowchart in FIG. 8. As a result, the executing unit 134 acquires, as a processing result, a result obtained by performing statistical processing on the operation information or the access information corresponding to the web page identified with the page identifier "URL3".

Next, the processing result transmitting unit 141 transmits the result of the statistical processing, which is the acquired processing result, to the terminal apparatus 2 from which the access information was transmitted.

Next, the terminal receiving unit 25 of the terminal apparatus 2 receives the processing result from the information processing apparatus 1.

Figure 19:
FIG. 19 is a diagram showing an output example in the embodiment.

Then, the terminal output unit 26 outputs the received web page and the received processing result. FIG. 19 shows an output example in this case. In FIG. 19, 1901 denotes a result of statistical processing.

Through this processing, a user who is an administrator of a page can view not only the page that the administrator is viewing but also a result of statistical processing regarding actions of users to the page or a site containing the page.

Specific Example 4

It is assumed that a web page that is accessible with the page identifier "URL4" is stored in the server apparatus 3. FIG. 15 shows such a web page.

Then, it is assumed that a user identified with the user identifier "U01" has input an access instruction containing the page identifier "URL4" to the terminal apparatus 2. Accordingly, the terminal accepting unit 22 of the terminal apparatus 2 accepts the access instruction. Next, the page acquiring unit 231 acquires the page identifier "URL4" contained in the access instruction. Then, the page acquiring unit 231 receives the web page in FIG. 15 from the server apparatus 3, using the page identifier "URL4". Next, the terminal access information acquiring unit 232 configures access information "U01, URL4", using the acquired page identifier "URL4" and the user identifier "U01" stored in the terminal storage unit 21. Then, the terminal transmitting unit 24 transmits the access information "U01, URL4" to the information processing apparatus 1.

Next, the access information receiving unit 121 of the information processing apparatus 1 receives the access information "U01, URL4".

Then, the currently-visiting-user information accumulating unit 131 acquires the user identifier "U01" and the page identifier "URL4" contained in the access information, and configures currently-visiting-user information having the acquired user identifier and page identifier. Then, the currently-visiting-user information accumulating unit 131 accumulates the configured currently-visiting-user information in the currently-visiting-user information management table in FIG. 13.

Next, the processing unit 13 performs processing result acquisition/transmission processing as follows. First, the management information determining unit 133 acquires the user identifier "U01" and the page identifier "URL4" contained in the received access information. Then, the management information determining unit 133 acquires an administrator flag "1" that is paired with the acquired user identifier "U01" from the user information management table in FIG. 12, and searches the management information management table in FIG. 11 for management information corresponding to the administrator flag "1" and the page identifier "URL4". That is to say, the management information determining unit 133 searches for the record with "ID=4" in FIG. 11.

Next, the executing unit 134 acquires a processing identifier "transmit alteration information" that is paired with the retrieved management information.

Next, the executing unit 134 executes processing identified with the acquired processing identifier "transmit alteration information", thereby acquiring a processing result. That is to say, the executing unit 134 executes processing described with reference to the flowchart in FIG. 9. As a result, the executing unit 134 acquires a processing result that is page alteration information for altering the web page identified with the page identifier "URL4".

Next, the processing result transmitting unit 141 transmits page alteration information that is the acquired processing result, to the terminal apparatus 2 from which the access information was transmitted.

Next, the terminal receiving unit 25 of the terminal apparatus 2 receives the page alteration information from the information processing apparatus 1.

Figure 20:
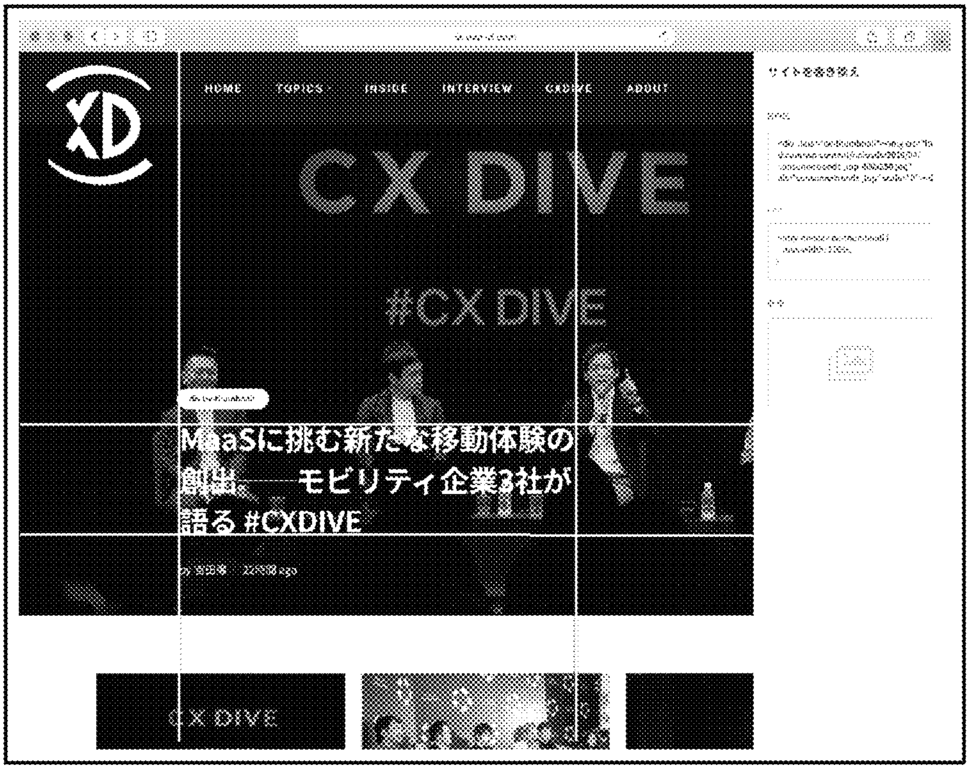
FIG. 20 is a diagram showing an output example in the embodiment.

Then, the terminal output unit 26 outputs the received web page and the received page alteration information, resulting in the output of a web page obtained by rewriting the page in FIG. 15. FIG. 20 shows an output example. FIG. 20 is different from FIG. 15 in that vertical and horizontal lines are added.

Through this processing, a user who is an administrator of a page can view a page obtained by modifying the page, without altering the description of the page.

As described above, according to this embodiment, when a terminal apparatus accesses a page, it is possible to execute processing regarding the page and the like, and provide a result of the processing to the terminal apparatus.

Furthermore, according to this embodiment, when a terminal apparatus accesses a page, it is possible to execute processing regarding the page and the like, the processing being for acquiring information corresponding to another user specified with the managed another-user specifying information, and provide a result of the processing to the terminal apparatus.

Furthermore, according to this embodiment, when a terminal apparatus accesses a page, it is possible to execute processing regarding the page and the like, the processing being identified with the managed processing identifier, and provide a result of the processing to the terminal apparatus.

Furthermore, according to this embodiment, when a terminal apparatus accesses a page, it is possible to acquire information on a user who is currently visiting the page and the like, and provide the information to the terminal apparatus.

Furthermore, according to this embodiment, it is possible to receive information transmitted from a terminal apparatus that accessed a page, and transmit the received information to a terminal apparatus of a user who is currently visiting the page and the like.

Furthermore, according to this embodiment, when a terminal apparatus accesses a page, it is possible to perform statistical processing on operation specifying information for specifying an operation performed on the page and the like by a user, thereby acquiring a statistical processing result, and provide the statistical processing result to the terminal apparatus.

Furthermore, according to this embodiment, when a terminal apparatus accesses a page, it is possible to perform processing for altering the content of the page, and provide page alteration information that is a processing result to the terminal apparatus.

Moreover, according to this embodiment, when a terminal apparatus accesses a page, it is possible to receive a processing result regarding the page and the like, and output it together with the page.

In this embodiment, for example, if embedded information that is a tag shown in FIG. 21 is embedded in the script of a web page to be viewed (e.g., the web page in FIG. 15), the terminal processing unit 23 of the terminal apparatus 2 acquires the embedded information and interprets the embedded information, and thus the terminal transmitting unit 24 can transmit the access information acquired by the terminal access information acquiring unit 232, to the information processing apparatus 1. Then, the terminal receiving unit 25 receives the processing result from the information processing apparatus 1. The terminal output unit 26 can output a web page and a processing result, for example, as shown in FIGS. 16 to 20.

The processing in this embodiment may be realized by software. The software may be distributed by software downloads or the like. Furthermore, the software may be distributed in a form where the software is stored in a storage medium such as a CD-ROM. The same applies to other embodiments in this specification. The software that realizes the information processing apparatus 1 in this embodiment is the following sort of program. Specifically, this program is a program for causing a computer capable of accessing a management information storage unit in which one or more pieces of management information each having user specifying information for specifying a user and page specifying information for specifying a page are stored, to function as: an access information receiving unit that receives access information having a user identifier and a page identifier for identifying a page that a user identified with the user identifier accessed; a management information determining unit that determines management information corresponding to the user identifier and the page identifier contained in the access information; an executing unit that executes processing corresponding to the management information determined by the management information determining unit, thereby acquiring a processing result; and a processing result transmitting unit that transmits the processing result acquired by the executing unit.

The software that realizes the terminal apparatus 2 in this embodiment is the following sort of program. Specifically, this program is a program for causing a computer capable of accessing a terminal storage unit in which a user identifier is stored, to function as: a terminal accepting unit that accepts a page identifier for identifying a page; a page acquiring unit that acquires a page using the page identifier accepted by the terminal accepting unit; a terminal access information acquiring unit that acquires access information having the user identifier in the terminal storage unit and the page identifier accepted by the terminal accepting unit, in response to the page acquiring unit acquiring a page; a terminal transmitting unit that transmits the access information acquired by the terminal access information acquiring unit, to the information processing apparatus 1; a terminal receiving unit that receives a processing result from the information processing apparatus, in response to the terminal transmitting unit transmitting access information; and a terminal output unit that outputs the processing result received by the terminal receiving unit and the page acquired by the page acquiring unit.

Embodiment 2

This embodiment is different from Embodiment 1 in that a page and a processing result that are output by a terminal apparatus are transmitted from an information processing apparatus to the terminal apparatus. In Embodiment 1, the terminal apparatus receives a page from a server apparatus and receives a processing result from an information processing apparatus.

A conceptual diagram of an information system B in this embodiment is similar to FIG. 1, which is a conceptual diagram of the information system A, except for differences in reference numerals. The information system B includes an information processing apparatus 4, one or at least two terminal apparatuses 5, and one or at least two server apparatuses 3. The information processing apparatus 4 and the server apparatuses 3 are typically so-called servers, and, for example, cloud servers, ASP servers, or the like. There is no limitation on the type of information processing apparatus 4 and server apparatuses 3. The terminal apparatuses 5 are, for example, so-called personal computers, tablet devices, smartphones, or the like, and there is no limitation on the type thereof. The information processing apparatus 4 and the terminal apparatuses 5, and the terminal apparatuses 5 and the server apparatuses 3 are capable of communicating with each other via a network such as the Internet. The information processing apparatus 4 and the server apparatuses 3 may also be capable of communicating with each other via a network such as the Internet.

Figure 22:
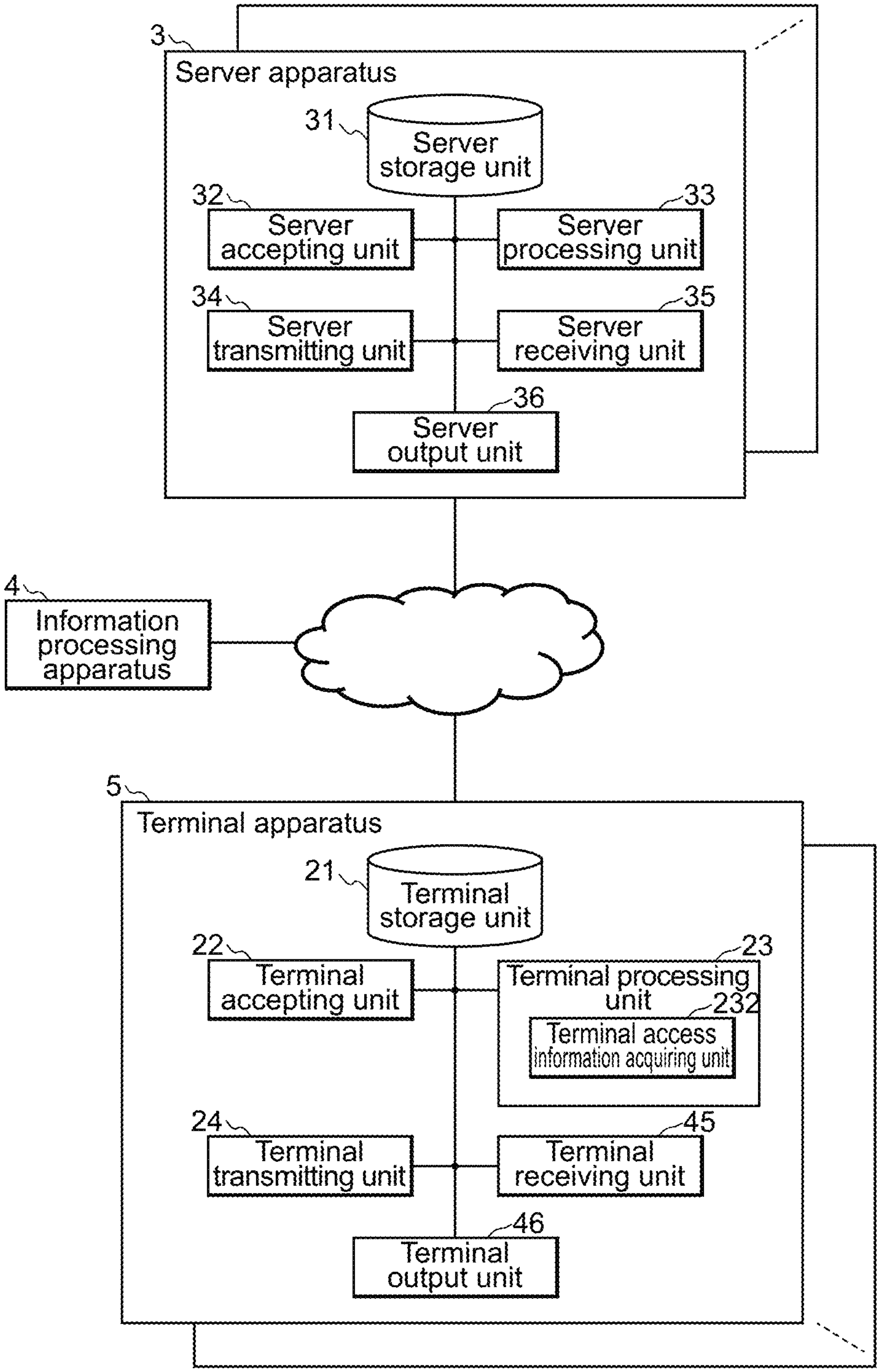
FIG. 22 is a block diagram of an information system B in Embodiment 2.
Figure 23:
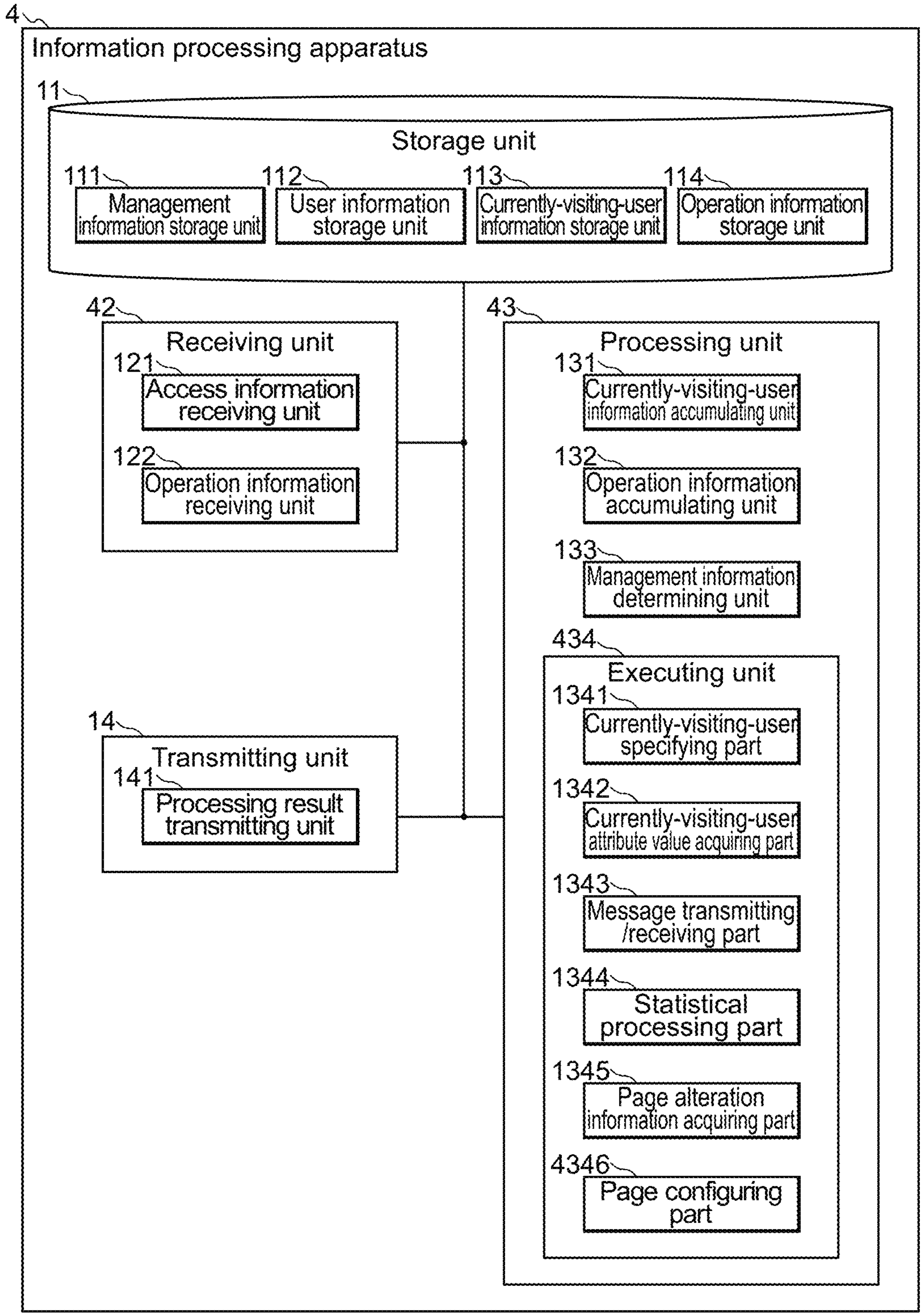
FIG. 23 is a block diagram of an information processing apparatus 4 in the embodiment.

FIG. 22 is a block diagram of the information system B in this embodiment. FIG. 23 is a block diagram of the information processing apparatus 4 constituting the information system B.

The information processing apparatus 4 constituting the information system B includes a storage unit 11, a receiving unit 42, a processing unit 43, and a transmitting unit 14. The receiving unit 42 includes an access information receiving unit 121 and an operation information receiving unit 122. The processing unit 43 includes a currently-visiting-user information accumulating unit 131, an operation information accumulating unit 132, a management information determining unit 133, and an executing unit 434. The executing unit 434 includes a currently-visiting-user specifying part 1341, a currently-visiting-user attribute value acquiring part 1342, a message transmitting/receiving part 1343, a statistical processing part 1344, a page alteration information acquiring part 1345, and a page configuring part 4346.

Each terminal apparatus 5 includes a terminal storage unit 21, a terminal accepting unit 22, a terminal processing unit 23, a terminal transmitting unit 24, a terminal receiving unit 45, and a terminal output unit 46. The terminal processing unit 23 includes a terminal access information acquiring unit 232.

The receiving unit 42 constituting the information processing apparatus 4 receives various types of information. The various types of information are, for example, access information, operation information, and a web page. For example, the receiving unit 42 receives a web page from the server apparatus 3.

The executing unit 434 constituting the processing unit 43 performs an operation similar to that of the executing unit 134. The executing unit 434 further executes processing that is performed by the page configuring part 4346.

The page configuring part 4346 executes processing corresponding to the management information determined by the management information determining unit 133, thereby acquiring a processing result, acquires a page identified with the page identifier contained in the access information received by the access information receiving unit 121, and configures a page containing the page and the processing result. The page containing the page and the processing result may be information having a data structure merely for transmission, and does not have to be in the form of a file.

The processing for executing processing corresponding to the management information determined by the management information determining unit 133, thereby acquiring a processing result is the same as that by the executing unit 134 described above, and thus a detailed description thereof has been omitted.

The page configuring part 4346 receives the page identified with the page identifier contained in the access information received by the access information receiving unit 121, from the server apparatus 3. Then, the page configuring part 4346 configures information of a page that is to be output by the terminal apparatus 5, using the acquired processing result and the received page. There is no limitation on how the page configuring part 4346 combines the acquired processing result and the received page to configure information of a page. For example, the page configuring part 4346 combines the acquired processing result into the received page (e.g., an HTML file), thereby configuring information of one page (e.g., an HTML file).

In response to the terminal transmitting unit 24 transmitting access information, the terminal receiving unit 45 constituting the terminal apparatus 5 receives the information of a page, from the information processing apparatus 4.

The terminal output unit 46 outputs the page containing the processing result, using the information of the page received by the terminal receiving unit 45.

The receiving unit 42 and the terminal receiving unit 45 are typically realized by wired or wireless communication parts, but may also be realized by broadcast receiving parts.

The processing unit 43, the executing unit 434, and the page configuring part 4346 may be typically realized by MPUs, memories, or the like. Typically, the processing procedure of the processing unit 43 and the like is realized by software, and the software is stored in a storage medium such as a ROM. Note that the processing procedure may be realized by hardware (dedicated circuits).

The terminal output unit 46 may be considered to include or to not include an output device such as a display screen or a speaker. The terminal output unit 46 may be realized by driver software for an output device, a combination of driver software for an output device and the output device, or the like.

Next, an operation of the information system B will be described. First, an operation example of the information processing apparatus 4 will be described with reference to the flowchart in FIG. 24. In the flowchart in FIG. 24, a description of the same steps as those in the flowchart in FIG. 4 has been omitted.

(Step S2401) The processing unit 43 performs processing result acquisition/transmission processing. The procedure returns to step S401. An example of the processing result acquisition/transmission processing will be described with reference to the flowchart in FIG. 25. The processing result acquisition/transmission processing is processing for acquiring a processing result, receiving a web page, configuring a page that is to be transmitted using the processing result and the web page, and transmitting the page.

Figure 24:
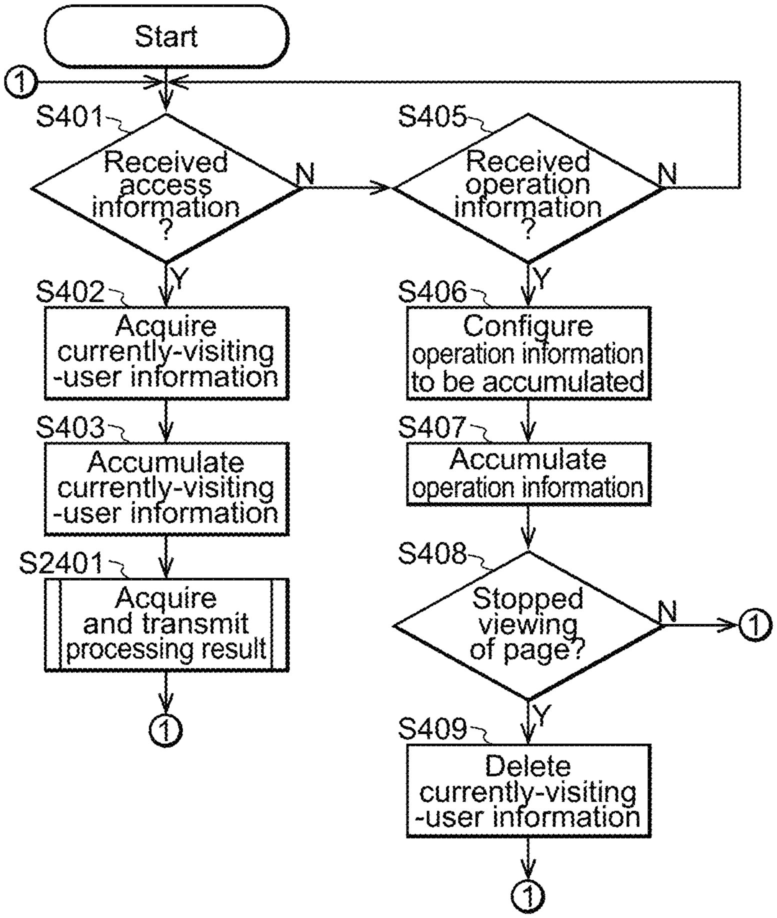
FIG. 24 is a flowchart illustrating an operation example of the information processing apparatus 4 in the embodiment.

In the flowchart in FIG. 24, the processing ends at power off or at an interruption of termination processing.

Figure 25:
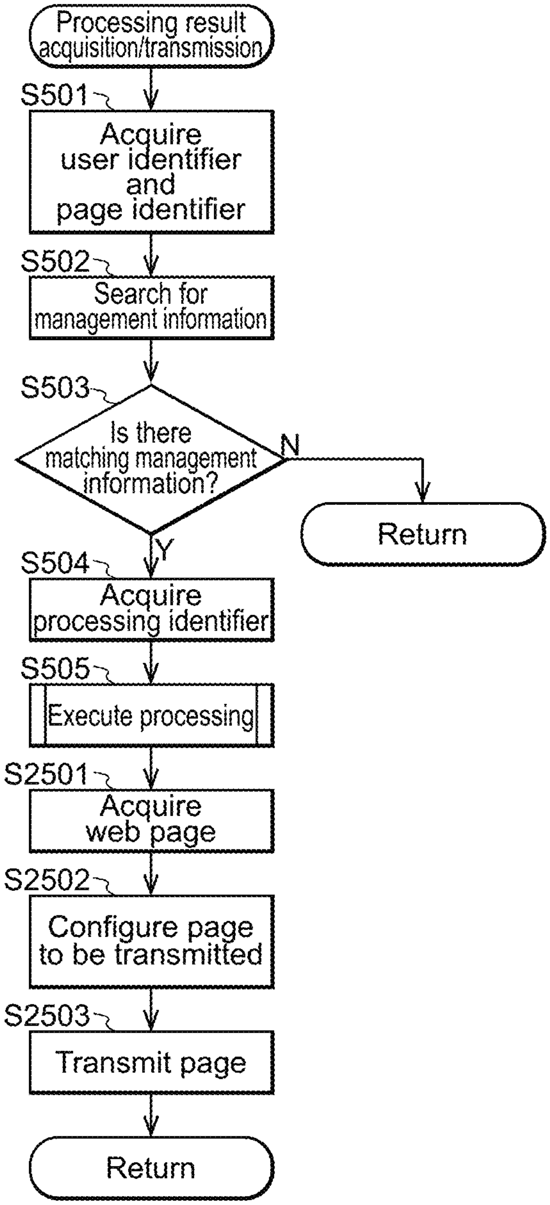
FIG. 25 is a flowchart illustrating an example of processing result acquisition/transmission processing in the embodiment.

Next, an example of the processing result acquisition/transmission processing in step S2401 will be described with reference to the flowchart in FIG. 25. In the flowchart in FIG. 25, a description of the same steps as those in the flowchart in FIG. 5 has been omitted.

(Step S2501) The page configuring part 4346 acquires the page identifier contained in the received access information. Next, the page configuring part 4346 accesses the server apparatus 3 using the acquired page identifier, and receives a web page identified with the page identifier.

(Step S2502) The page configuring part 4346 configures a page, using the processing result acquired in step S505 and the web page received in step S2501.

(Step S2503) The processing result transmitting unit 141 transmits the page configured in step S2502 and containing the processing result. The procedure returns to the upper-level processing. In this case, the processing result transmitting unit 141 typically transmits the page containing the processing result to the terminal apparatus 5.

Next, an operation example of the terminal apparatus 5 will be described with reference to the flowchart in FIG. 26. In the flowchart in FIG. 26, a description of the same steps as those in the flowchart in FIG. 10 has been omitted.

(Step S2601) The terminal receiving unit 45 determines whether or not it has received a page containing a processing result from the information processing apparatus 4. If it has received a page, the procedure advances to step S2602, or otherwise the procedure advances to step S1008.

(Step S2602) The terminal output unit 46 outputs the page containing the processing result received in step S2601. The procedure returns to step S1001.

Figure 26:
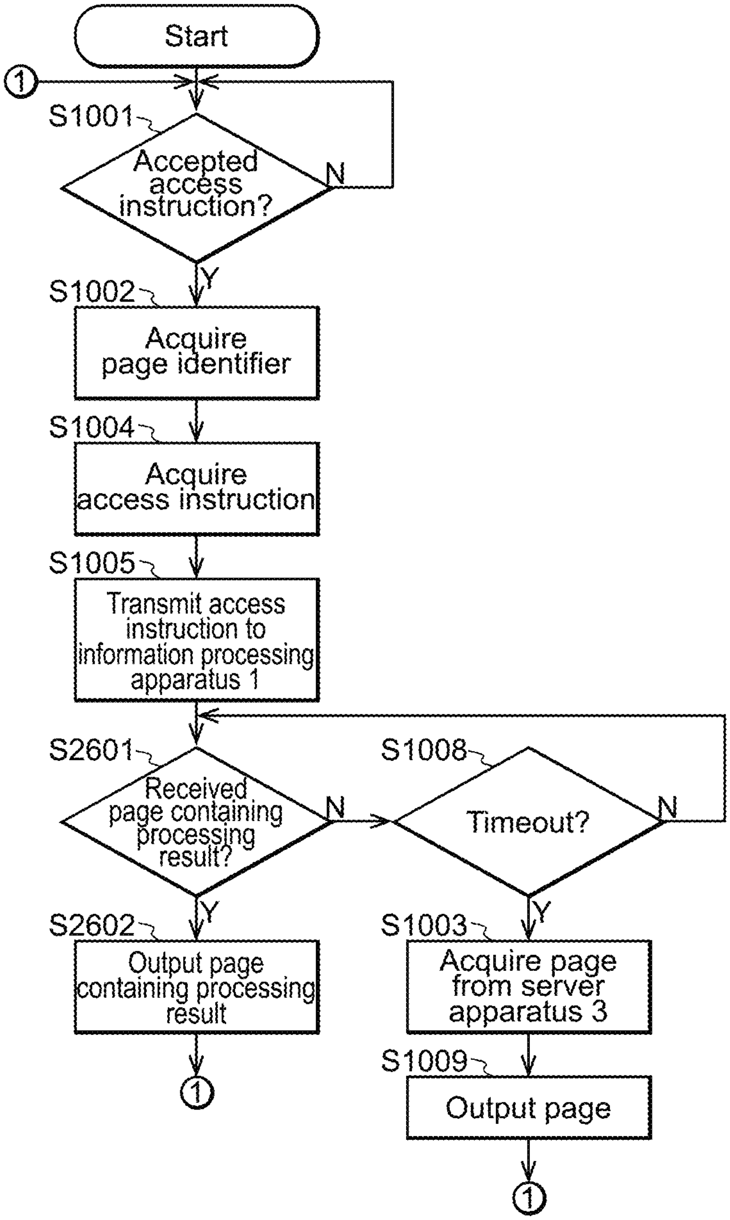
FIG. 26 is a flowchart illustrating an operation example of a terminal apparatus 5 in the embodiment.

In the flowchart in FIG. 26, the processing ends at power off or at an interruption of termination processing.

As described above, according to this embodiment, when a terminal apparatus accesses a page, it is possible to execute processing regarding the page and the like, and provide a result of the processing to the terminal apparatus.

Furthermore, according to this embodiment, when a terminal apparatus accesses a page, it is possible to execute processing regarding the page and the like, the processing being for acquiring information corresponding to another user specified with the managed another-user specifying information, and provide a result of the processing to the terminal apparatus.

Furthermore, according to this embodiment, when a terminal apparatus accesses a page, it is possible to execute processing regarding the page and the like, the processing being identified with the managed processing identifier, and provide a result of the processing to the terminal apparatus.

Furthermore, according to this embodiment, when a terminal apparatus accesses a page, it is possible to acquire information on a user who is currently visiting the page and the like, and provide the information to the terminal apparatus.

Furthermore, according to this embodiment, it is possible to receive information transmitted from a terminal apparatus that accessed a page, and transmit the received information to a terminal apparatus of a user who is currently visiting the page and the like.

Furthermore, according to this embodiment, when a terminal apparatus accesses a page, it is possible to perform statistical processing on operation specifying information for specifying an operation performed on the page and the like by a user, thereby acquiring a statistical processing result, and provide the statistical processing result to the terminal apparatus.

Furthermore, according to this embodiment, when a terminal apparatus accesses a page, it is possible to perform processing for altering the content of the page, and provide page alteration information that is a processing result to the terminal apparatus.

Furthermore, according to this embodiment, when a terminal apparatus is going to access a page, it is possible to execute processing regarding the page and the like, configure a new page containing a result of the processing and the page, and provide the new page to the terminal apparatus.

Moreover, according to this embodiment, when a terminal apparatus accesses a page, it is possible to receive a processing result regarding the page and the like, and output it together with the page.

The software that realizes the information processing apparatus 4 in this embodiment is the following sort of program. Specifically, this program is a program for causing a computer capable of accessing a management information storage unit in which one or more pieces of management information each having user specifying information for specifying a user and page specifying information for specifying a page are stored, to function as: an access information receiving unit that receives access information having a user identifier and a page identifier for identifying a page that a user identified with the user identifier accessed; a management information determining unit that determines management information corresponding to the user identifier and the page identifier contained in the access information; an executing unit that executes processing corresponding to the management information determined by the management information determining unit, thereby acquiring a processing result; and a processing result transmitting unit that transmits the processing result acquired by the executing unit.

Furthermore, it is preferable that the above-described program causes the computer to function such that the executing unit includes a page configuring part that executes processing corresponding to the management information determined by the management information determining unit, thereby acquiring a processing result, acquires a page identified with the page identifier contained in the access information received by the access information receiving unit, and configures a page containing the page and the processing result, and the processing result transmitting unit transmits the page configured by the page configuring part.

The software that realizes the terminal apparatus 5 in this embodiment is the following sort of program. Specifically, this program is a program for causing a computer capable of accessing a terminal storage unit in which a user identifier is stored, to function as: a terminal accepting unit that accepts a page identifier for identifying a page; a terminal access information acquiring unit that acquires access information having the user identifier in the terminal storage unit and the page identifier accepted by the terminal accepting unit; a terminal transmitting unit that transmits the access information acquired by the terminal access information acquiring unit to the information processing apparatus 4; a terminal receiving unit that receives a page containing a processing result from the information processing apparatus, in response to the terminal transmitting unit transmitting access information; and a terminal output unit that outputs the page received by the terminal receiving unit.

Embodiment 3

This embodiment is different from Embodiment 1 and the like in that, after a page and a processing result are output by a terminal apparatus, a user can edit the page from the terminal apparatus. This embodiment is different from Embodiment 1 and the like in that, after a page and a processing result are output by a terminal apparatus, a user can edit management information. Furthermore, this embodiment is different from Embodiment 1 and the like in that a specific user can view a page obtained by deleting part of information from an original page and a page obtained by altering part of information in an original page.

In this embodiment, a description will be given of an information system including an information processing apparatus in which one or more pieces of management information are stored, the management information each having user specifying information and page specifying information, and, in the case in which a user corresponding to the user specifying information accesses a page specified with the page specifying information, a processing result of processing corresponding to the management information is transmitted, a page alteration instruction from the user is received, and page alteration processing is performed. The page alteration processing includes, for example, one or at least two of processing for adding information to the page, processing for deleting information from the page, and processing for altering information.

Furthermore, in this embodiment, a description will be given of an information system including an information processing apparatus in which one or more pieces of management information are stored, the management information each having user specifying information containing a user type identifier for specifying a type of user and page specifying information, and, in the case in which a user corresponding to the user specifying information accesses a page specified with the page specifying information, a processing result of processing corresponding to the management information is transmitted, a page alteration instruction from the user is received, and page alteration processing is performed.

Furthermore, in this embodiment, a description will be given of an information system including an information processing apparatus capable of presenting a page that is different for each type of user identified with a user type identifier.

Furthermore, in this embodiment, a description will be given of an information system including an information processing apparatus in which page alteration information is managed independently of a page.

Furthermore, in this embodiment, a description will be given of an information system including an information processing apparatus that performs page alteration associated with a user type identifier. The user type identifier is, for example, administrator flag information or level information for specifying a level of a general user.

Furthermore, in this embodiment, a description will be given of an information system including an information processing apparatus capable of presenting, to a specific user, a page obtained by deleting part of the content of a page and a page obtained by altering part of the content of a page.

A conceptual diagram of an information system C in this embodiment is similar to FIG. 1, which is a conceptual diagram of the information system A, except for differences in reference numerals. The information system C includes an information processing apparatus 6, one or at least two terminal apparatuses 7, and one or at least two server apparatuses 3. The information processing apparatus 6 and the server apparatuses 3 are typically so-called servers, and, for example, cloud servers, ASP servers, or the like. There is no limitation on the type of information processing apparatus 6 and server apparatuses 3. The terminal apparatuses 7 are, for example, so-called personal computers, tablet devices, smartphones, or the like, and there is no limitation on the type thereof. The information processing apparatus 6 and the terminal apparatuses 7, and the terminal apparatuses 7 and the server apparatuses 3 are capable of communicating with each other via a network such as the Internet. The information processing apparatus 6 and the server apparatuses 3 may also be capable of communicating with each other via a network such as the Internet.

Figure 27:
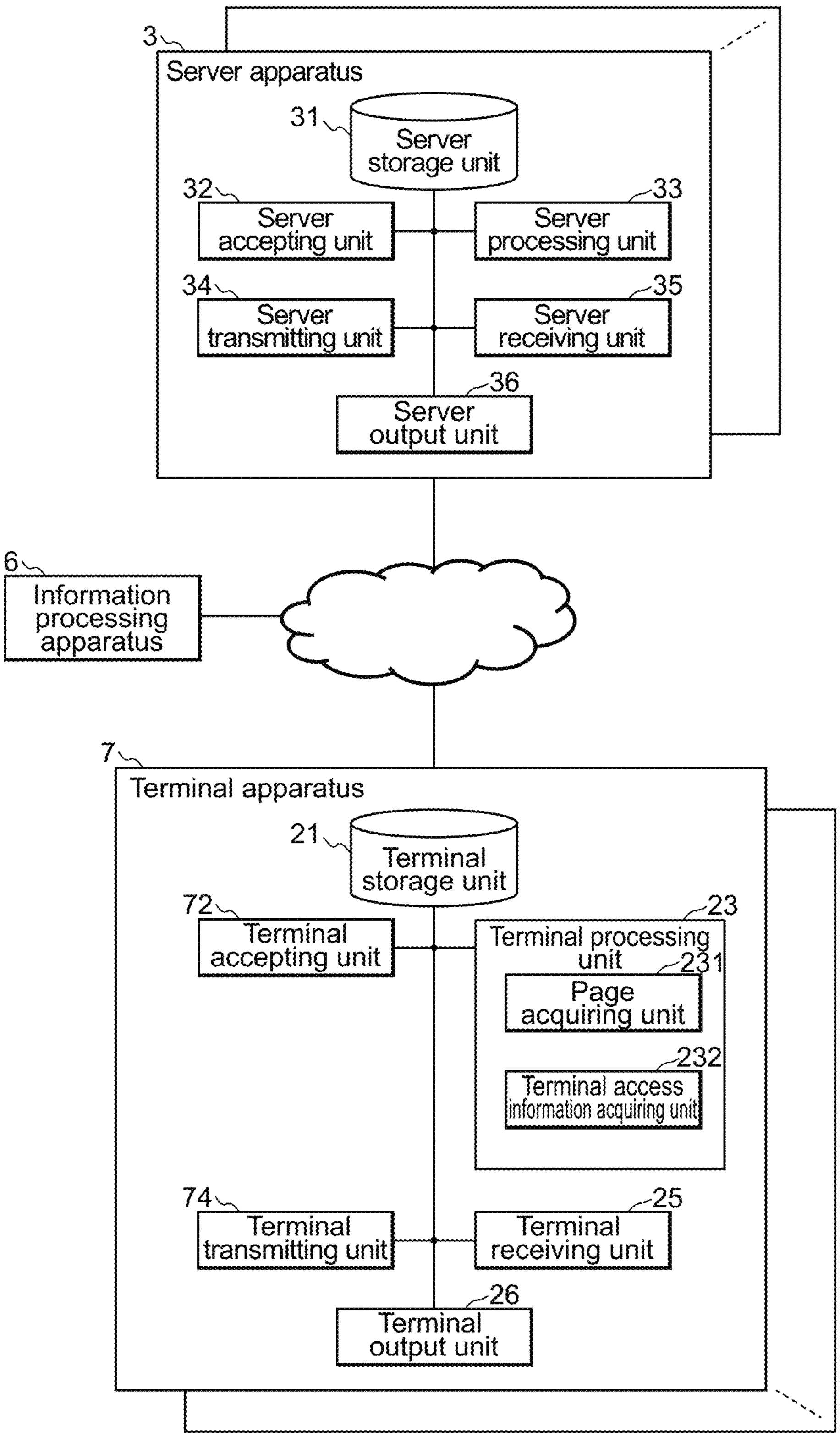
FIG. 27 is a block diagram of an information system C in Embodiment 3.
Figure 28:
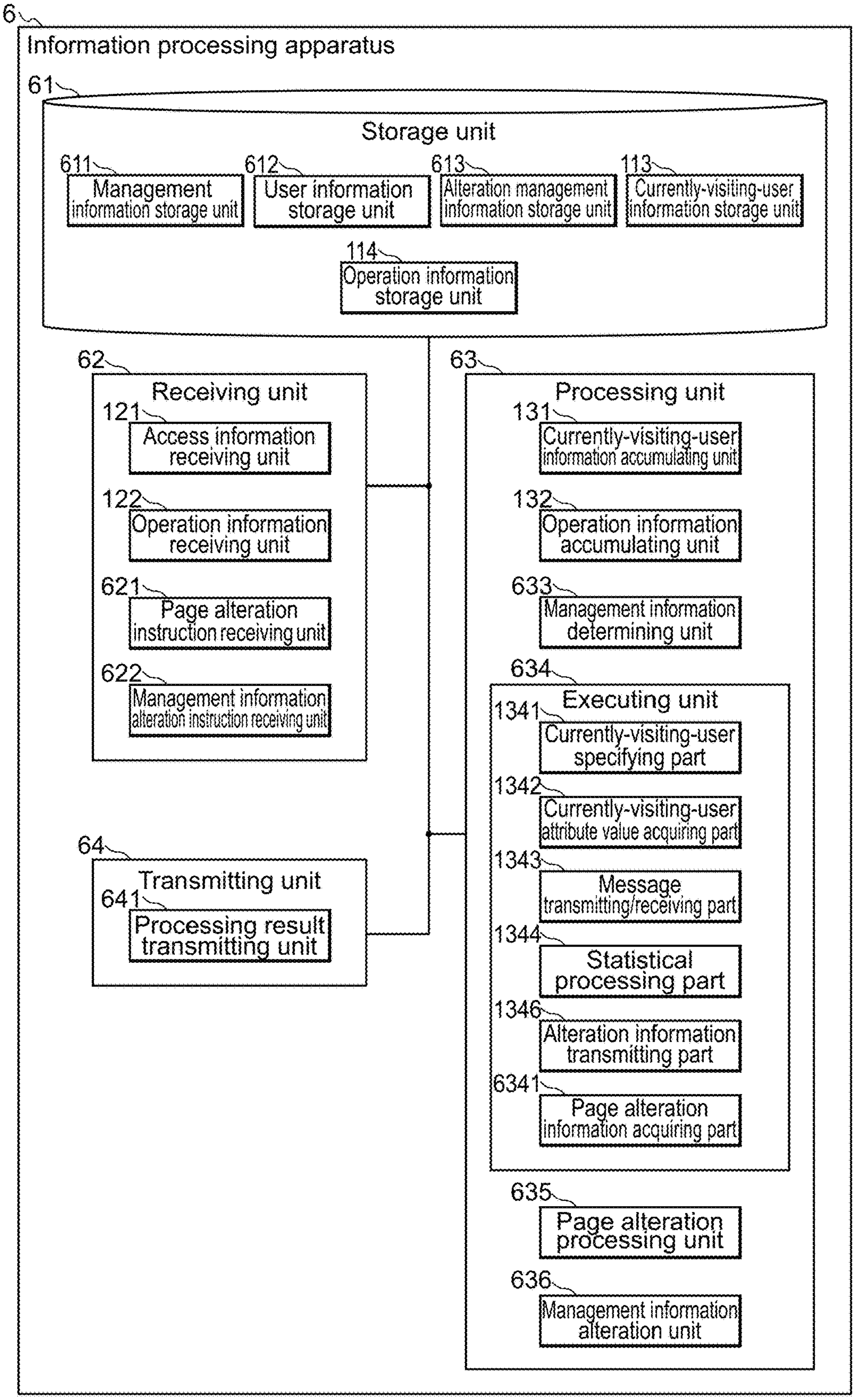
FIG. 28 is a block diagram of an information processing apparatus 6 constituting the information system C in the embodiment.

FIG. 27 is a block diagram of the information system C in this embodiment. FIG. 28 is a block diagram of the information processing apparatus 6 constituting the information system C.

The information processing apparatus 6 constituting the information system C includes a storage unit 61, a receiving unit 62, a processing unit 63, and a transmitting unit 64. The storage unit 61 includes a management information storage unit 611, a user information storage unit 612, an alteration management information storage unit 613, a currently-visiting-user information storage unit 113, and an operation information storage unit 114. The receiving unit 62 includes an access information receiving unit 121, an operation information receiving unit 122, a page alteration instruction receiving unit 621, and a management information alteration instruction receiving unit 622. The processing unit 63 includes a currently-visiting-user information accumulating unit 131, an operation information accumulating unit 132, a management information determining unit 633, an executing unit 634, a page alteration processing unit 635, and a management information alteration unit 636. The executing unit 634 includes a currently-visiting-user specifying part 1341, a currently-visiting-user attribute value acquiring part 1342, a message transmitting/receiving part 1343, a statistical processing part 1344, a page alteration information acquiring part 6341, and an alteration information transmitting part 1346. The transmitting unit 64 includes a processing result transmitting unit 641.

Each terminal apparatus 7 includes a terminal storage unit 21, a terminal accepting unit 72, a terminal processing unit 23, a terminal transmitting unit 74, a terminal receiving unit 25, and a terminal output unit 26. The terminal processing unit 23 includes a page acquiring unit 231 and a terminal access information acquiring unit 232.

Each server apparatus 3 includes a server storage unit 31, a server accepting unit 32, a server processing unit 33, a server transmitting unit 34, a server receiving unit 35, and a server output unit 36.

Various types of information are stored in the storage unit 61 constituting the information processing apparatus 6. The various types of information are, for example, management information, user information, later-described alteration management information, currently-visiting-user information, operation information, programs, executable processing defining information, and the like. The executable processing defining information is information for specifying a target that can be operated by a user or/and the content of an operation that can be executed.

One or at least two pieces of management information are stored in the management information storage unit 611. The management information is information for managing processing that is provided to a user who accessed a page. The management information has user specifying information and page specifying information. The management information may further have another-user specifying information. The management information may further have a processing identifier. The management information may further have a user type identifier. The user specifying information is information for specifying a user. The user specifying information is, for example, one or at least two user identifiers, a user type identifier, a user attribute value, or a condition using a user attribute value. The user specifying information may be any information with which a user can be specified. The user type identifier is information for specifying the type of user. The user type identifier may be considered as an example of the user specifying information. The user type identifier is, for example, administrator flag information indicating that a user is an administrator or level information for identifying a level of a general user. The user type identifier may be user specifying information.

The management information has, for example, processing defining information. The processing defining information is information for defining processing that is provided to a user who accessed a page. The processing defining information has a processing identifier. The processing defining information may further have another-user specifying information. The processing defining information may further have an ON/OFF flag. The ON/OFF flag is a flag indicating whether or not to perform processing identified with the processing identifier that is paired therewith.

The management information has, for example, page alteration information. The page alteration information is information of a page that can be altered. The page that can be altered may be part of a page that can be altered. The page alteration information has, for example, a target identifier. The target identifier is information for specifying part of a page. The page alteration information has, for example, content information. The content information is information for specifying the content of an alteration in a page. The content information is, for example, information for altering a page, or information for specifying the content of an alteration in an altered page (e.g., an HTML file). The page alteration information may be stored in the alteration management information storage unit 613, which will be described later.

It is preferable that one or more pieces of management information each having user specifying information containing a user type identifier and page specifying information are stored in the management information storage unit 611.

One or at least two pieces of user information are stored in the user information storage unit 612. The user information is information on a user. The user information has, for example, a user identifier and one or more user attribute values. The user information preferably further has a user type identifier. The one or more user attribute values are, for example, the above-described static attribute value or the above-described dynamic attribute value, but preferably have a user type identifier.

One or at least two pieces of alteration management information are stored in the alteration management information storage unit 613. The alteration management information preferably further has a user type identifier. The alteration management information is information corresponding to page alteration processing, which is processing for altering a page. The alteration management information has page alteration information and page specifying information. The page alteration information is information for altering the content of a page. The alteration management information may further have user specifying information. The page alteration processing includes, for example, one or at least two of addition processing for adding information to the page, deletion processing for deleting information from the page, and alteration processing for altering information in the page. The page alteration information typically contains data for altering the page. The page alteration information may be, for example, a command to alter the page, a script after alteration of the page (e.g., an HTML, an XML, etc.). The page alteration information may be an altered page itself. The altered page itself is a script of an altered page.

The page alteration information is, for example, a script for deleting an element (which may also be said to be “an object”) constituting a page as follows.

[Script for Deleting Element]

var x=document.getElementById(“myDIV”);

x.querySelector(“.example”).innerHTML=“ ”

This script is a script for deleting an element whose identifier (ID) matches “.example” of “myDIV”.

Furthermore, the page alteration information is, for example, a script for replacing an element constituting a page as follows.

[Script for Replacing Element]

var x=document.getElementById(“myDIV”);

x.querySelector(“.example”).innerHTML=“A New Text!”

This script is a script for replacing an element whose identifier (ID) matches “.example” of “myDIV” with “A New Text!”.

The receiving unit 62 receives various types of information, instructions, and the like. The various types of information, instructions, and the like are, for example, a later-described page alteration instruction, a later-described management information alteration instruction, access information, operation information, and the like.

The page alteration instruction receiving unit 621 receives a page alteration instruction. The page alteration instruction receiving unit 621 typically receives a page alteration instruction from the terminal apparatus 7. The page alteration instruction is an instruction to alter a page.

Typically, after a processing result is transmitted, the page alteration instruction receiving unit 621 receives a page alteration instruction to alter a page identified with the page identifier, the page alteration instruction being input to a terminal apparatus 7 of a user identified with the user identifier. “After a processing result is transmitted” typically means that a user edits a page while viewing the processing result.

The page alteration instruction has, for example, a user type identifier. The page alteration instruction has, for example, information necessary for page alteration processing.

The page alteration instruction has, for example, page alteration information. The page alteration instruction has, for example, information that is used to configure page alteration information.

The management information alteration instruction receiving unit 622 receives a management information alteration instruction. The management information alteration instruction receiving unit 622 typically receives a management information alteration instruction from the terminal apparatus 7. The management information alteration instruction is an instruction to alter the management information in the management information storage unit 611. The management information alteration instruction typically has information for specifying a page. The information for specifying a page is, for example, a page identifier. The management information alteration instruction typically has management information alteration information for specifying the content of an alteration in management information. The management information alteration information has, for example, altered management information. The management information alteration information has, for example, information for specifying information that is to be altered in management information, and information after alteration of the information. The management information alteration instruction is, for example, a command to update a record in a database in which management information is stored. The management information alteration instruction is constituted by, for example, an SQL, an API, or the like.

The processing unit 63 performs various types of processing. The various types of processing are, for example, processing that is performed by the currently-visiting-user information accumulating unit 131, the operation information accumulating unit 132, the management information determining unit 633, the executing unit 634, the page alteration processing unit 635, and the management information alteration unit 636.

The management information determining unit 633 determines management information corresponding to the user identifier and the page identifier contained in the access information.

For example, the management information determining unit 633 determines management information corresponding to a user type identifier that is paired with the user identifier contained in the access information and the page identifier contained in the access information. For example, the management information determining unit 633 acquires a user type identifier that is paired with the user identifier contained in the access information, from the user information management table 612, and acquires part or the whole of the management information having the user type identifier and the page identifier from the management information storage unit 611. The determining management information is acquiring management information, acquiring a point to management information, acquiring an ID of management information, or the like, that is, it may be acquiring a state in which management information can be acquired.

The executing unit 634 acquires a processing result obtained by executing processing corresponding to the management information the management information determining unit 633.

For example, the executing unit 634 executes processing corresponding to the management information determined by the management information determining unit 633, thereby acquiring a processing result.

The processing corresponding to the management information is predetermined, for example. If the processing is predetermined, the processing corresponding to the management information is, for example, common to all pieces of management information. The processing corresponding to the management information is, for example, processing identified with the processing identifier contained in the management information. The processing corresponding to the management information is, for example, processing corresponding to the page identifier, or processing corresponding to the page identifier and the user specifying information.

For example, the executing unit 634 executes processing corresponding to the management information determined by the management information determining unit 633, thereby acquiring a processing result that is information on a user identified with the user identifier specified with the another-user specifying information contained in the management information determined by the management information determining unit 633.

The executing unit 634 preferably executes processing after access information is received, but it is also sufficient that the processing has been performed in advance and a processing result is merely read.

For example, the executing unit 634 executes processing identified with the processing identifier contained in the management information determined by the management information determining unit 633.

For example, the executing unit 634 acquires user information on a user who is currently visiting a page identified with the page identifier contained in the access information. For example, the executing unit 634 performs statistical processing on previous operation specifying information for the page identified with the page identifier contained in the access information, thereby acquiring a processing result. For example, the executing unit 634 acquires page alteration information for altering the page identified with the page identifier contained in the access information.

The page alteration information acquiring part 6341 acquires a processing result that is page alteration information that is paired with the page specifying information corresponding to the page identifier contained in the access information received by the access information receiving unit 121.

For example, the page alteration information acquiring part 6341 acquires a processing result that is page alteration information that is paired with the page specifying information corresponding to the page identifier contained in the access information received by the access information receiving unit 121 and the user type identifier corresponding to the user identifier contained in the access information received by the access information receiving unit 121.

For example, the page alteration information acquiring part 6341 acquires a processing result that is page alteration information for performing deletion processing or alteration processing. The deletion processing is processing for deleting part of information in the page identified with the page identifier contained in the access information received by the access information receiving unit 121. The alteration processing is processing for altering part of information in the page identified with the page identifier contained in the access information received by the access information receiving unit 121.

The page alteration processing unit 635 performs page alteration processing for altering the page corresponding to the page alteration instruction.

For example, the page alteration processing unit 635 performs the page alteration processing in association with the user type identifier contained in the page alteration instruction.

For example, the page alteration processing unit 635 configures page alteration information corresponding to the page alteration instruction, and accumulates alteration management information having the page alteration information and the page specifying information for specifying a page, in the alteration management information storage unit 613.

The page alteration processing may be acquiring and accumulating information on a difference from an original page, or configuring and accumulating an altered page.

Through the page alteration processing, for example, when a user accesses a page, a page that has undergone alteration corresponding to a user type identifier of the user is output to the terminal apparatus 7 of the user. In this case, for example, a user with a different user type identifier can view a different page.

For example, the page alteration processing unit 635 may perform page alterability determination processing, and, if a result of the page alterability determination processing is "alterable", perform page alteration processing. The page alterability determination processing is processing for determining whether or not a page can be altered. The page alterability determination processing is, for example, is processing for determining whether or not a user identified with the user identifier contained in the page alteration instruction can perform page alteration processing on a page specified with the page specifying information contained in the page alteration instruction. The page alterability determination processing will be described in detail with reference to the flowchart in FIG. 30, which will be described later. The management information alteration unit 636 alters management information corresponding to the page identifier contained in the management information alteration instruction according to the received management information alteration instruction.

For example, the management information alteration unit 636 may perform management information alterability determination processing, and, if a result of the management information alterability determination processing is "alterable", alter management information. The management information alterability determination processing is processing for determining whether or not management information can be altered. The management information alterability determination processing is, for example, determining whether or not there is management information containing user specifying information corresponding to the user identifier contained in the management information alteration instruction and page specifying information contained in the management information alteration instruction, and whether or not the alteration content of the management information alteration instruction matches the management information alteration condition in the management information. The management information alterability determination processing will be described in detail with reference to the flowchart in FIG. 31, which will be described later.

The transmitting unit 64 transmits various types of information. The various types of information are, for example, a processing result. The processing result is, for example, user information on a user who is currently visiting the page, a result obtained by performing statistical processing on previous operation specifying information of the page, page alteration information for altering the page, or the like.

The processing result transmitting unit 641 transmits the processing result acquired by the executing unit 634. The transmission destination of the processing result is, for example, a terminal apparatus 7 that accessed a page. The transmission destination of the processing result is, for example, a terminal apparatus 7 of a user who is currently visiting a page.

The terminal accepting unit 72 constituting the terminal apparatus 7 accepts input of instructions, information, and the like from a user. The instructions, information, and the like are, for example, a page identifier, a page alteration instruction, a management information alteration instruction, or an instruction to end input of an instruction. The instruction to end input of an instruction is an instruction indicating that input of a page alteration instruction or a management information alteration instruction has been completed, or an instruction indicating that input of a page alteration instruction or a management information alteration instruction is not performed.

The accepting is a concept that encompasses accepting information input from an input device such as a keyboard, a mouse, or a touch panel, receiving information transmitted via a wired or wireless communication line, accepting information read from a recording medium such as an optical disk, a magnetic disk, or a semiconductor memory, and the like.

The instructions, information, and the like may be input by any device such as a numeric keypad, a keyboard, a mouse, or a menu screen. The terminal accepting unit 72 may be realized by a device driver for an input device such as a numeric keypad or a keyboard, control software for a menu screen, or the like.

The terminal transmitting unit 74 transmits various types of instructions, information, and the like to the information processing apparatus 6. The various types of instructions, information, and the like are, for example, a page alteration instruction or access information.

The storage unit 61, the management information storage unit 611, the user information storage unit 612, and the alteration management information storage unit 613 are preferably non-volatile recording media, but can also be realized by volatile recording media.

There is no limitation on the procedure in which information is stored in the storage unit 61 and the like. For example, information may be stored in the storage unit 61 and the like via a recording medium, information transmitted via a communication line or the like may be stored in the storage unit 61 and the like, or information input via an input device may be stored in the storage unit 61 and the like.

The receiving unit 62, the page alteration instruction receiving unit 621, and the management information alteration instruction receiving unit 622 are typically realized by wired or wireless communication parts, but may also be realized by broadcast receiving parts.

The processing unit 63, the currently-visiting-user information accumulating unit 131, the operation information accumulating unit 132, the management information determining unit 633, the executing unit 634, the page alteration processing unit 635, the management information alteration unit 636, and the page alteration information acquiring part 6341 may be typically realized by MPUs, memories, or the like. Typically, the processing procedure of the processing unit 63 and the like is realized by software, and the software is stored in a storage medium such as a ROM. Note that the processing procedure may be realized by hardware (dedicated circuits).

The transmitting unit 64, the processing result transmitting unit 641, and the terminal transmitting unit 74 are typically realized by wired or wireless communication parts, but may also be realized by broadcasting parts.

Next, an operation of the information system C will be described. First, an operation example of the information processing apparatus 6 will be described with reference to the flowchart in FIG. 29. In the flowchart in FIG. 29, a description of the same steps as those in the flowchart in FIG. 4 has been omitted.

(Step S2901) The page alteration instruction receiving unit 621 determines whether or not it has received a page alteration instruction. If it has received a page alteration instruction, the procedure advances to step S2902, or otherwise the procedure advances to step S2907.

(Step S2902) The page alteration processing unit 635 performs page alterability determination processing. The page alterability determination processing is processing for determining whether or not a page corresponding to the page alteration instruction can be altered. An example of the page alterability determination processing will be described with reference to the flowchart in FIG. 30.

(Step S2903) If a result of the determination in step S2902 is "alterable", the procedure advances to step S2904, or otherwise the procedure advances to step S2906.

(Step S2904) The page alteration processing unit 635 acquires page alteration information corresponding to the page alteration instruction.

(Step S2905) The page alteration processing unit 635 accumulates the page alteration information acquired in step S2904 in the alteration management information storage unit 613 in association with the page specifying information contained in the page alteration instruction received in step S2901. The procedure returns to step S2901.

(Step S2906) The transmitting unit 64 transmits an error message indicating that the page cannot be altered. The procedure returns to step S2901.

(Step S2907) The management information alteration instruction receiving unit 622 determines whether or not it has received a management information alteration instruction. If it has received a management information alteration instruction, the procedure advances to step S2908, or otherwise the procedure returns to step S2901.

(Step S2908) The management information alteration unit 636 performs management information alterability determination processing. The management information alterability determination processing is processing for determining whether or not management information corresponding to the management information alteration instruction can be altered. An example of the management information alterability determination processing will be described with reference to the flowchart in FIG. 31.

(Step S2909) If a result of the determination in step S2908 is "alterable", the procedure advances to step S2910, or otherwise the procedure advances to step S2911.

(Step S2910) The management information alteration unit 636 alters the management information in the management information storage unit 611 according to the management information alteration instruction. The procedure returns to step S2901.

(Step S2911) The transmitting unit 64 transmits an error message indicating that the management information cannot be altered. The procedure returns to step S2901.

Figure 29:
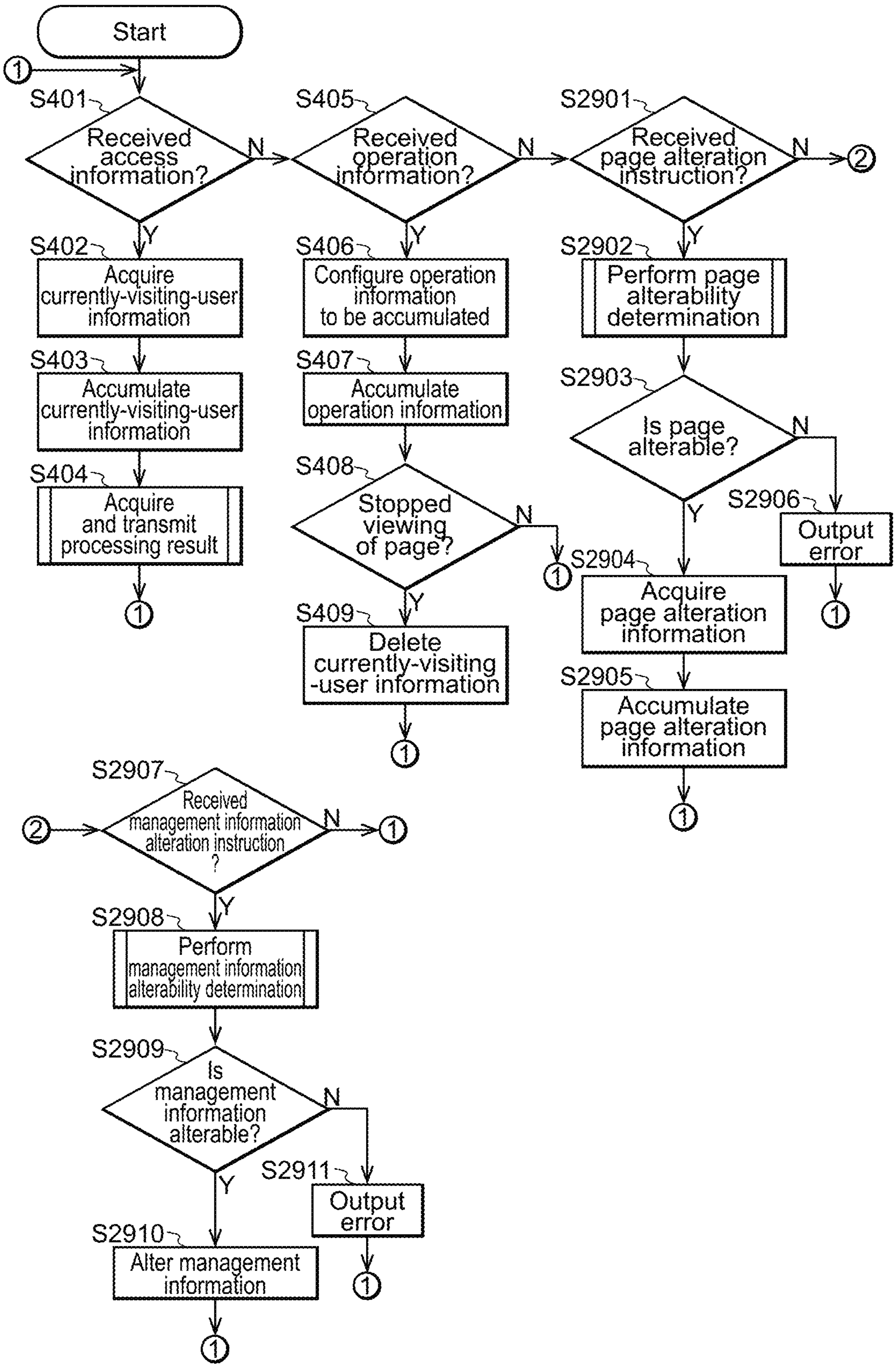
FIG. 29 is a flowchart illustrating an operation example of the information processing apparatus 6 in the embodiment.

In the flowchart in FIG. 29, the processing ends at power off or at an interruption of termination processing.

Figure 30:
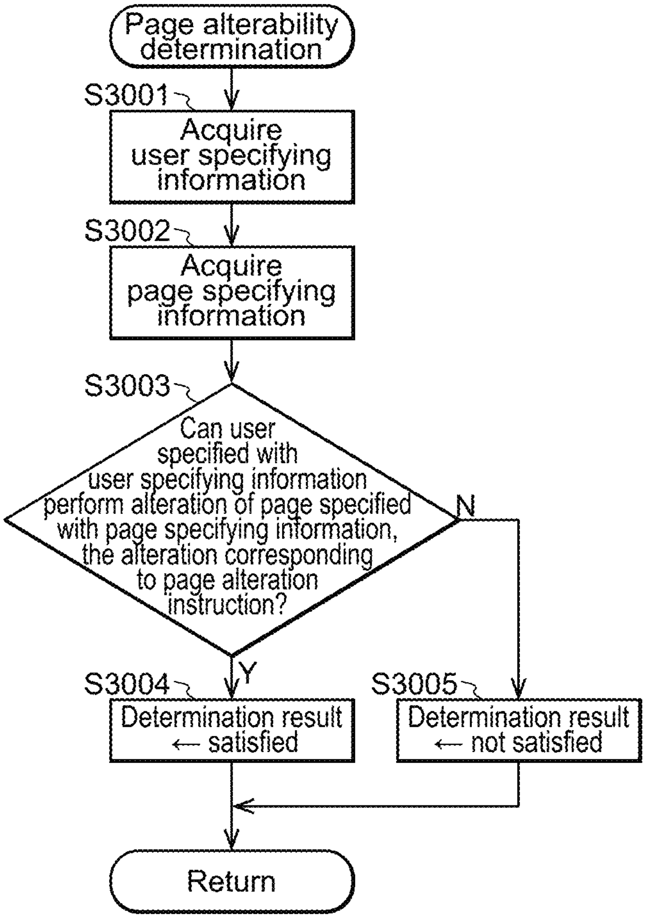
FIG. 30 is a flowchart illustrating an example of a page alterability determination processing in the embodiment.

Next, an example of the page alterability determination processing in step S2902 will be described with reference to the flowchart in FIG. 30.

(Step S3001) The page alteration processing unit 635 acquires user specifying information corresponding to the user identifier contained in the page alteration instruction. The user specifying information is, for example, a user type identifier that is paired with the user identifier contained in the page alteration instruction, or a user identifier contained in the page alteration instruction.

(Step S3002) The page alteration processing unit 635 acquires page specifying information contained in the page alteration instruction.

(Step S3003) The page alteration processing unit 635 determines whether or not a condition 1 (there is management information containing the user specifying information acquired in Step S3001 and the page specifying information acquired in step S3002) and a condition 2 (the alteration content of the page alteration instruction matches the page alteration condition in the management information) are satisfied. If the conditions 1 and 2 are satisfied, the procedure advances to step S3004, or otherwise the procedure advances to step S3005.

(Step S3004) The page alteration processing unit 635 substitutes "satisfied" for the variable "determination result".

(Step S3005) The page alteration processing unit 635 substitutes "not satisfied" for the variable "determination result".

Figure 31:
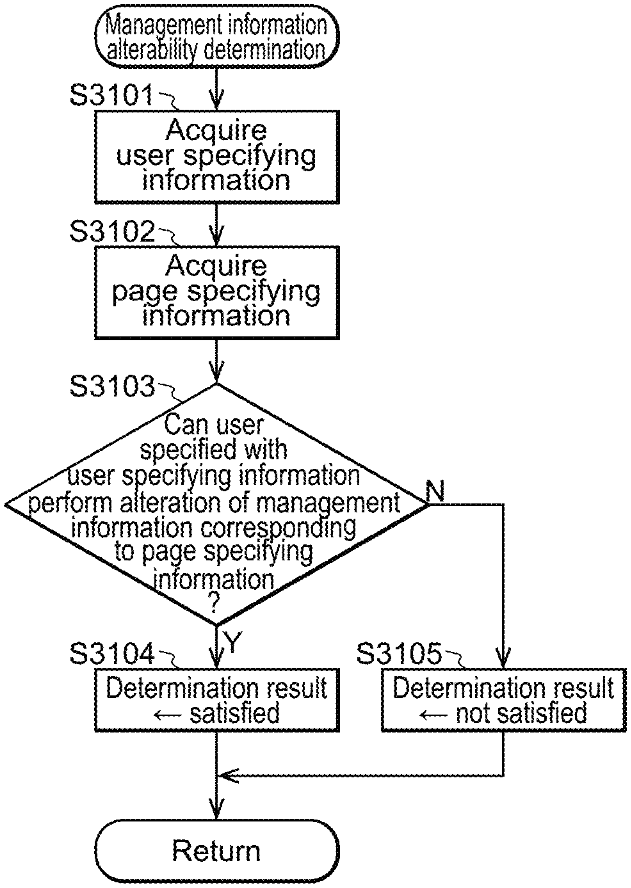
FIG. 31 is a flowchart illustrating an example of management information alterability determination processing in the embodiment.

Next, an example of the management information alterability determination processing in step S2908 will be described with reference to the flowchart in FIG. 31.

(Step S3101) The management information alteration unit 636 acquires user specifying information corresponding to the user identifier contained in the management information alteration instruction. The user specifying information is, for example, a user type identifier that is paired with the user identifier contained in the management information alteration instruction, or a user identifier contained in the management information alteration instruction.

(Step S3102) The management information alteration unit 636 acquires page specifying information contained in the management information alteration instruction.

(Step S3103) The management information alteration unit 636 determines whether or not a condition 1 (there is management information containing the user specifying information acquired in Step S3101 and the page specifying information acquired in step S3102) and a condition 2 (the alteration content of the management information alteration instruction matches the management information alteration condition in the management information) are satisfied. If the conditions 1 and 2 are satisfied, the procedure advances to step S3104, or otherwise the procedure advances to step S3105.

(Step S3104) The management information alteration unit 636 substitutes "satisfied" for the variable "determination result".

(Step S3105) The management information alteration unit 636 substitutes "not satisfied" for the variable "determination result".

Figure 32:
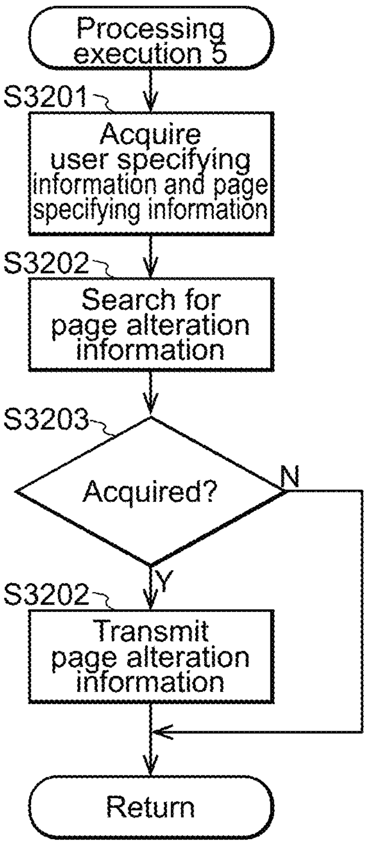
FIG. 32 is a flowchart illustrating a fifth example of processing execution processing in the embodiment.

Next, a fifth example of the processing execution processing in step S505 in the processing result acquisition/transmission processing in S404 of FIG. 29 will be described with reference to the flowchart in FIG. 32.

(Step S3201) The page alteration information acquiring part 1345 acquires user specifying information and page specifying information.

(Step S3202) The page alteration information acquiring part 1345 searches the alteration management information storage unit 613 using, as a key, the user specifying information and the page specifying information acquired in step S3201, thereby acquiring page alteration information.

(Step S3203) The page alteration information acquiring part 1345 determines whether or not it acquired page alteration information in step S3202. If it acquired page alteration information, the procedure advances to step S3204, or otherwise the procedure returns to the upper-level processing.

(Step S3204) The alteration information transmitting part 1346 transmits the page alteration information to the terminal apparatus 7. The procedure returns to the upper-level processing.

Next, an operation example of the terminal apparatus 7 will be described with reference to the flowchart in FIG. 33. In the flowchart in FIG. 33, a description of the same steps as those in the flowchart in FIG. 10 has been omitted.

(Step S3301) The terminal accepting unit 72 determines whether or not it has accepted a page alteration instruction. If it has accepted a page alteration instruction, the procedure advances to step S3302, or otherwise the procedure advances to step S3304.

(Step S3302) The terminal processing unit 23 configures a page alteration instruction that is to be transmitted. Then, the terminal transmitting unit 74 transmits the page alteration instruction to the information processing apparatus 6.

(Step S3303) The terminal output unit 26 outputs an altered page. The procedure returns to step S1001. The page that is output is typically a page edited by a user.

(Step S3304) The terminal accepting unit 72 determines whether or not it has accepted a management information alteration instruction. If it has accepted a management information alteration instruction, the procedure advances to step S3305, or otherwise the procedure advances to step S3307.

(Step S3305) The terminal processing unit 23 configures a management information alteration instruction that is to be transmitted. Then, the terminal transmitting unit 74 transmits the management information alteration instruction to the information processing apparatus 6.

(Step S3306) The terminal output unit 26 outputs altered management information. The procedure returns to step S1001. The management information that is output is typically management information edited by a user.

(Step S3307) The terminal accepting unit 72 determines whether or not it has accepted an instruction to end input of an instruction. If it has accepted an instruction to end input of an instruction, the procedure returns to step S1001, or otherwise the procedure returns to step 3301.

Figure 33:
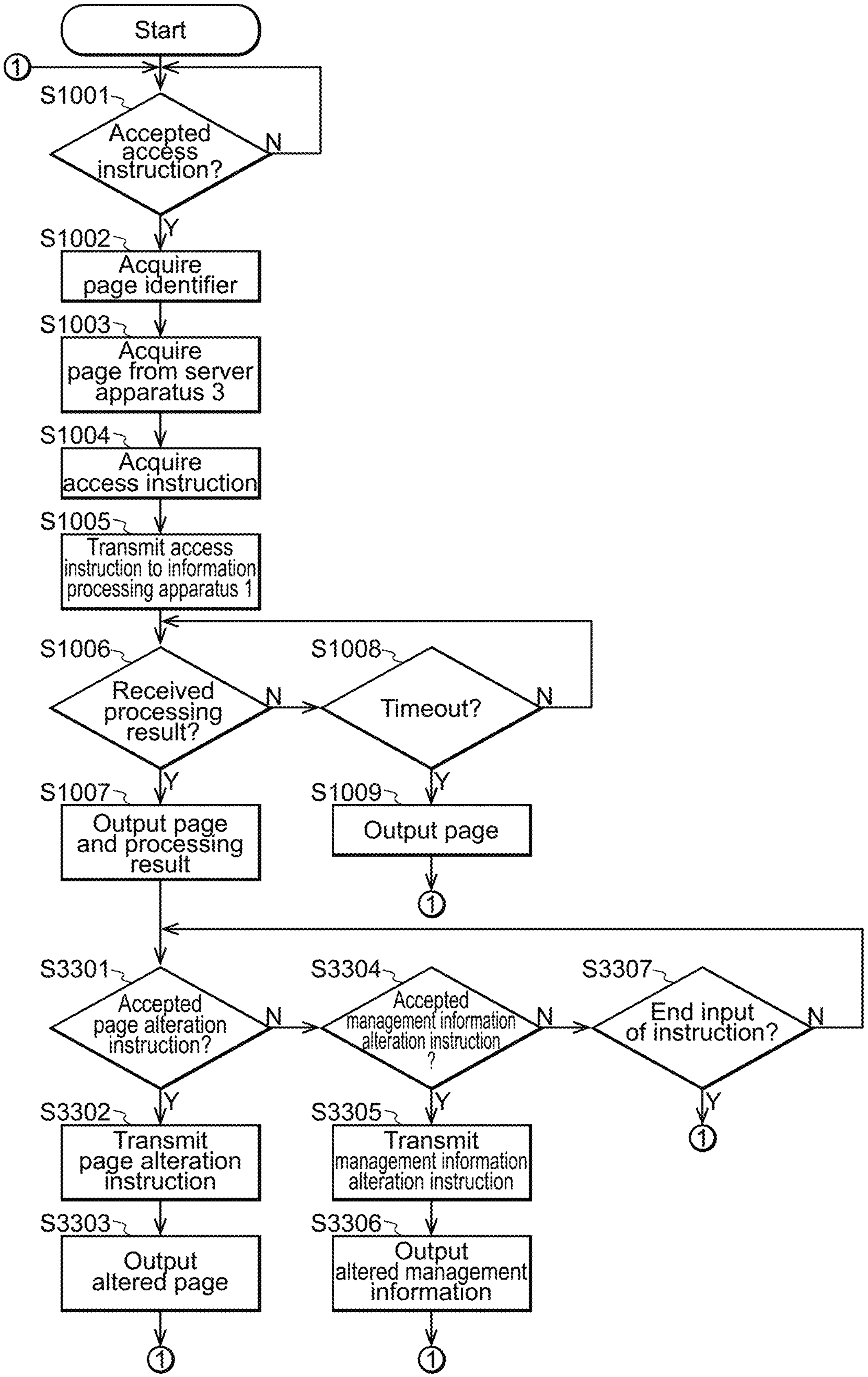
FIG. 33 is a flowchart illustrating an operation example of a terminal apparatus 7 in the embodiment.

In the flowchart in FIG. 33, the processing ends at power off or at an interruption of termination processing.

Hereinafter, a specific operation of the information system C in this embodiment will be described. FIG. 1 is a conceptual diagram of the information system C.

It is assumed that a management information management table shown in FIG. 34 is stored in the management information storage unit 611 of the information processing apparatus 6. The management information management table is a table for managing one or more pieces of management information. One or more records each having "ID", "page specifying information", "user specifying information", "page alteration information", and "processing defining information" are stored in the management information management table. "ID" is information for identifying a record. "Page alteration information" has "target" and "content". "Target" is information for specifying the whole or part of the page specified with the page specifying information, and is information for specifying a target that is to be altered. "Content" is information for specifying the alteration content. "Processing defining information" is information for defining processing that is performed when a user specified with the user specifying information accesses a page specified with the page specifying information. "Processing defining information" in this example has "another-user specifying information", "processing identifier", and "ON/OFF". "Another-user specifying information" and "processing identifier" are as described above. "ON/OFF" is a flag indicating whether or not to perform processing specified with "another-user specifying information" and "processing identifier".

In the management information management table shown in FIG. 34, for example, "target=<comment section>" and "content=inputtable" of "page alteration information" indicate that input is acceptable to a section (which may also be said to be a "field") specified with <comment section> in the page. That is to say, a user (a later-described power user) corresponding to "user type identifier=0A" can input comments to a section specified with <comment section> in the page. On the other hand, for example, "target=<comment section>" and "content=not inputtable" of "page alteration information" indicate that input is not acceptable to a section (which may also be said to be a "field") specified with <comment section> in the page. That is to say, a user (a later-described general user) corresponding to "user type identifier=0B" cannot input comments to a section specified with <comment section> in the page. Note that the user corresponding to “user type identifier=0B” also can view information of <comment section> in the page. The reason for this is that there is no description that limits viewing in the “content” in FIG. 34.

Furthermore, a user information management table shown in FIG. 35 is stored in the user information storage unit 112. Records each having “user identifier”, “name”, “e-mail address”, “static attribute value”, and “dynamic attribute value” are stored in the user information management table.

“Static attribute value” in this example has “gender”, “age”, “unmarried/married”, “place of birth”, “user type identifier”, and the like. The user type identifier “0” in this example refers to a user. The user type identifier “1” in this example refers to an administrator (e.g., a site administrator or a site developer). The user type identifier “2” in this example refers to, for example, a web marketer. The web marketer is a person who performs web marketing.

“Dynamic attribute value” is as described in Embodiment 1.

Furthermore, a user-executable processing management table shown in FIG. 36 is stored in the management information storage unit 611. The user-executable processing management table defines executable processing for each piece of page specifying information and for each piece of user specifying information. One or more records each having “ID”, “page specifying information”, “user specifying information”, and “executable processing defining information” are stored in the user-executable processing management table. “Executable processing defining information” has “target” and “operation”. “Target” is information for specifying a target that can be operated. The target “management information management table” refers to the management information management table in FIG. 34 as an operation target. The target “page.<comment section>” refers to a comment section in the page. The target “user type management table” refers to a user type management table in FIG. 37, which will be described later. “Operation” is information for specifying an operation that can be executed. The operation “add” is adding information (e.g., a record), “alter” is altering information, “delete” is deleting information, and “set ON/OFF” is adding or changing an attribute value “ON/OFF”. “Edit” is editing (adding, deleting, or altering) information.

Furthermore, a user type management table in FIG. 37 is stored in the storage unit 61. The user type management table is a table for defining the type of user. One or more records each having “ID”, “user type name”, “user type identifier”, and “user type condition” are stored in the user type management table. “User type name” is a name of the type of user. “User type name” may be regarded as a user type identifier. The user type condition is a condition for classifying a type as a type identified with a user type identifier that is paired therewith. The user type condition in this example is a condition based on a score of a user, but may be any condition based on one or more attribute values (e.g., a dynamic attribute value, a static attribute value, or their combination) of a user.

Furthermore, a currently-visiting-user information management table shown in FIG. 13 is stored in the currently-visiting-user information storage unit 113.

Moreover, an operation information management table shown in FIG. 14 is stored in the operation information storage unit 114.

In this situation, the following two specific examples will be described. Specific Example 1 shows a case in which a user alters a page. Specific Example 2 shows a case in which a user alters management information.

Specific Example 1

Figure 38:
FIG. 38 is a diagram showing an output example in the embodiment.

It is assumed that a web page that is accessible with the page identifier “URLa” is stored in the server apparatus 3. FIG. 38 shows such a web page. The page identifier “URLa” is, for example, “https://www.a.co.jp”.

Then, it is assumed that a user identified with the user identifier “U01” has input an access instruction containing the page identifier “URLa” to the terminal apparatus 7. Accordingly, the terminal accepting unit 72 of the terminal apparatus 7 accepts the access instruction. Next, the page acquiring unit 231 acquires the page identifier “URLa” contained in the access instruction. Then, the page acquiring unit 231 receives a web page in FIG. 38, using the page identifier “URLa”, from the server apparatus 3 corresponding to “URLa”.

Next, the terminal access information acquiring unit 232 configures access information “U01, URLa”, using the acquired page identifier “URLa” and the user identifier “U01” stored in the terminal storage unit 21. Then, the terminal transmitting unit 74 transmits the access information “U01, URLa” to the information processing apparatus 1.

Next, the access information receiving unit 121 of the information processing apparatus 1 receives the access information “U01, URLa”.

Then, the currently-visiting-user information accumulating unit 131 acquires the user identifier “U01” and the page identifier “URLa” contained in the access information, and configures currently-visiting-user information having the acquired user identifier and page identifier. Then, the currently-visiting-user information accumulating unit 131 accumulates the configured currently-visiting-user information in the currently-visiting-user information management table in FIG. 13.

Next, the processing unit 13 performs processing result acquisition/transmission processing as follows. First, the management information determining unit 633 acquires the user identifier “U01” and the page identifier “URLa” contained in the received access information. Next, the management information determining unit 633 acquires a user type identifier “1” that is paired with the user identifier “U01” from the user information management table in FIG. 35.

Next, the management information determining unit 133 acquires processing defining information that is paired with the acquired user type identifier “1” and page identifier “URLa” from the management information management table in FIG. 34. In this case, the management information determining unit 133 acquires “another-user specifying information=*, processing identifier=acquire currently-visiting-user information” from the management information management table in FIG. 34. The management information determining unit 133 does not acquire a processing identifier “statistical processing” that is paired with the user type identifier “1” and the page identifier “URLa” but has “ON/OFF=OFF”.

Next, the executing unit 634 acquires a processing identifier “acquire currently-visiting-user information” that is paired with the retrieved management information.

Next, the executing unit 634 executes processing identified with the acquired processing identifier “acquire currently-visiting-user information”, thereby acquiring a processing result. That is to say, the executing unit 634 executes the processing described with reference to the flowchart in FIG. 6. As a result, the executing unit 634 acquires user information on a large number of users who are visiting the web page identified with the page identifier "URLa".

Next, the processing result transmitting unit 641 transmits the acquired processing result (the user information on the large number of users) to the terminal apparatus 7 from which the access information was transmitted.

Next, the terminal receiving unit 25 of the terminal apparatus 7 receives the processing result from the information processing apparatus 6.

Figure 39:
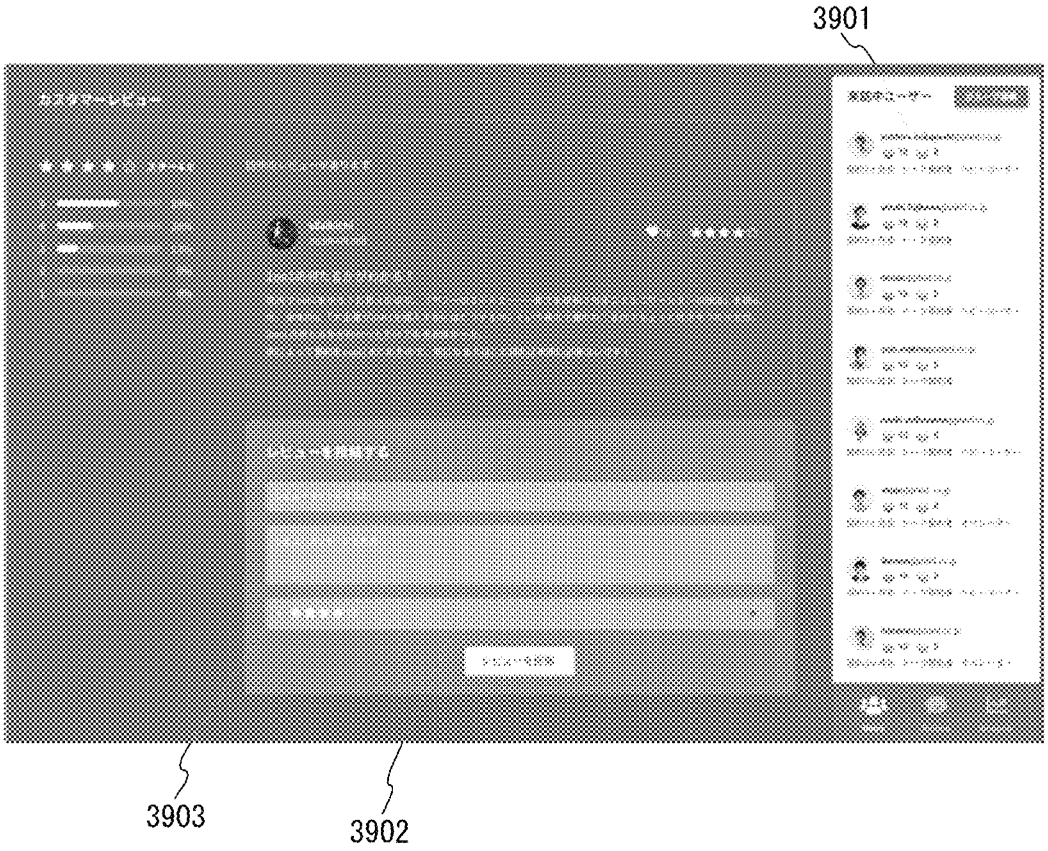
FIG. 39 is a diagram showing an output example in the embodiment.

Then, the terminal output unit 26 outputs the received web page and the received processing result. FIG. 39 shows an output example in this case. In FIG. 39, 3901 denotes user information on a large number of other users who are viewing a displayed web page.

Figure 40:
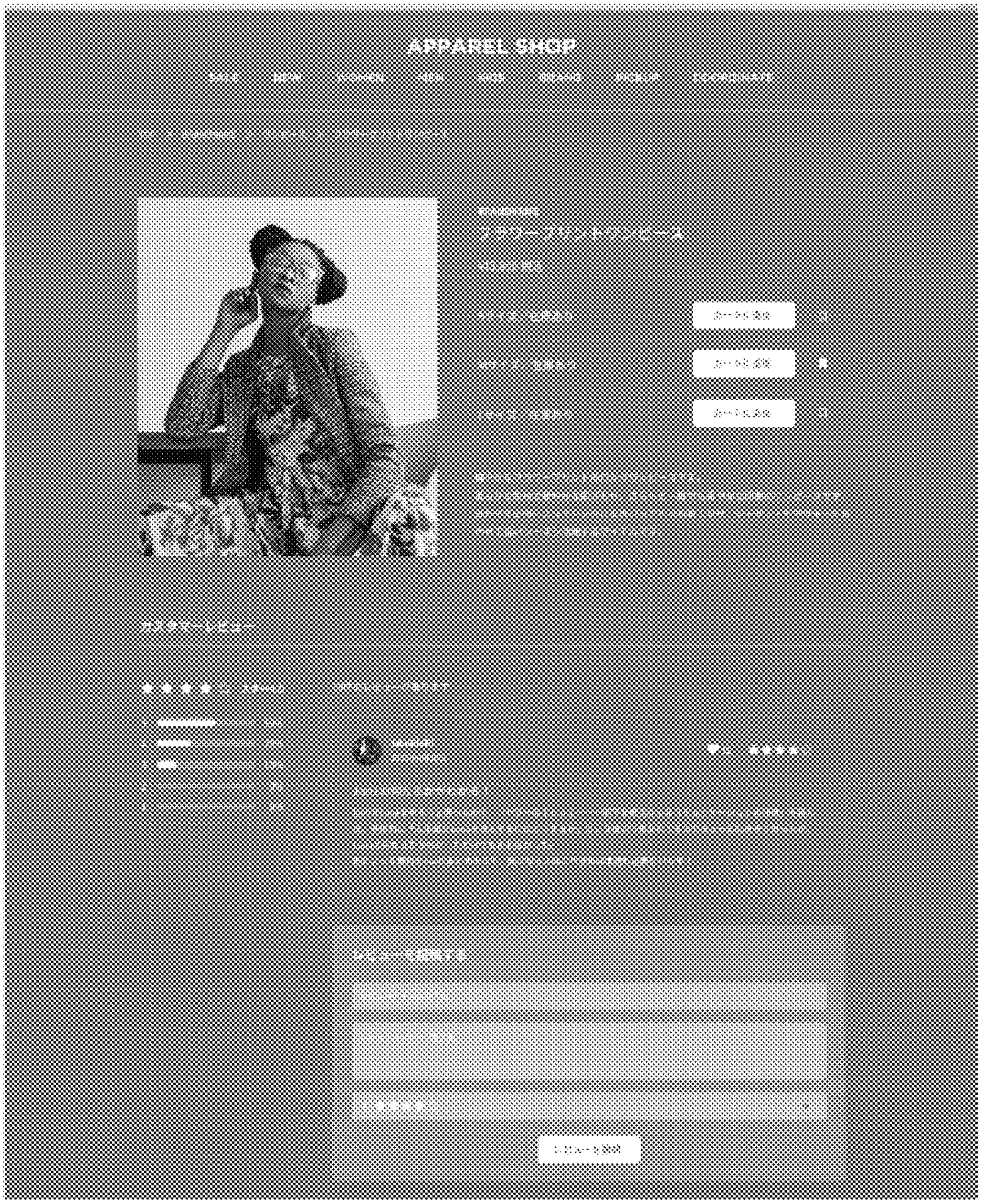
FIG. 40 is a diagram showing an output example in the embodiment.

Next, the user wants to increase the number of visitors, and edits the page while viewing FIG. 39. That is to say, the user inputs a page alteration instruction to a page (3902) in FIG. 39. In this example, it is assumed that, for example, the user edits the layout of the page such that the size of a comment section (3903) is reduced and a comment target and the comment section can be viewed in one screen. FIG. 40 shows the edited page.

Next, the terminal accepting unit 72 accepts this page alteration instruction. Then, the terminal processing unit 23 configures a page alteration instruction that is to be transmitted. Next, the terminal transmitting unit 74 transmits the page alteration instruction to the information processing apparatus 6.

Next, the page alteration instruction receiving unit 621 of the information processing apparatus 6 receives the page alteration instruction.

Next, the page alteration processing unit 635 performs the page alterability determination processing described with reference to the flowchart in FIG. 30. In this example, a determination result is "alterable". Next, the page alteration processing unit 635 acquires page alteration information corresponding to the page alteration instruction. It is assumed that the page alteration information is, for example, a script (e.g., an HTML) of a difference between FIGS. 38 and 40.

Next, the page alteration processing unit 635 accumulates the acquired page alteration information in the alteration management information management table in association with the page specifying information "URLa" contained in the received page alteration instruction.

As described above, according to this specific example, when the terminal apparatus 7 accesses a page, it is possible to execute processing regarding the page and the like, acquire a result of the processing, and then allow the user to alter the page from the terminal apparatus 7.

Specific Example 2

It is assumed that, immediately after the processing in Specific Example 1, the user identified with the user identifier "U01" who wants to alter management information corresponding to the page specifying information "URLa" accesses the management information and modifies the management information from the terminal apparatus 7. In this example, it is assumed that, for example, the user changes the value of the flag "ON/OFF" of "processing identifier=statistical processing" of the user corresponding to the page specifying information "URLa" and "user type identifier=2" from "ON" to "OFF".

Accordingly, the terminal apparatus 7 accepts this management information alteration instruction. In this example, it is assumed that the management information alteration instruction is, for example, "update management information management table. page specifying information "URLa". user type identifier "2" ON/OFF="OFF"". Next, the terminal apparatus 7 transmits this management information alteration instruction to the information processing apparatus 6.

Next, the management information alteration instruction receiving unit 622 of the information processing apparatus 6 receives the management information alteration instruction. Next, the management information alteration unit 636 performs the management information alterability determination processing described with reference to the flowchart in FIG. 31.

In this example, a determination result is "alterable". Next, the page alteration processing unit 635 acquires page alteration information corresponding to the page alteration instruction. It is assumed that the page alteration information is, for example, a script (e.g., an HTML) of a difference between FIGS. 38 and 40.

Next, the management information alteration unit 636 changes the attribute value of the attribute "ON/OFF" that is paired with the page specifying information "URLa" and the user specifying information "user type identifier=2" in the management information management table to "OFF", according to the management information alteration instruction "update management information management table. page specifying information "URLa". user type identifier "2" ON/OFF="OFF"".

As described above, according to this specific example, when the terminal apparatus 7 accesses a page, it is possible to execute processing regarding the page and the like, acquire a result of the processing, and then allow the user to alter the management information corresponding to the page from the terminal apparatus 7. As described above, according to this embodiment, when the terminal apparatus 7 accesses a page, it is possible to execute processing regarding the page and the like, acquire a result of the processing, and then alter the page from the terminal apparatus 7.

Furthermore, according to this embodiment, when the terminal apparatus 7 accesses a page, it is possible to execute processing regarding the page and the like, acquire a result of the processing, and then allow only a specific type of user to alter the page.

Furthermore, according to this embodiment, when the terminal apparatus 7 accesses a page, it is possible to execute processing regarding the page and the like, acquire a result of the processing, and then delete part of information in the page or alter part of information in the page.

Furthermore, according to this embodiment, when the terminal apparatus 7 accesses a page, it is possible to execute processing regarding the page and the like, acquire a result of the processing, and then alter the page according to the user type.

Furthermore, according to this embodiment, it is easy to cancel an alteration in the page and the like, which increases the customizability for altering pages.

Furthermore, according to this embodiment, when the terminal apparatus 7 of an administrator accesses a page, it is possible to execute processing regarding the page and the like, acquire a result of the processing, and then allow the administrator to alter the page.

Furthermore, according to this embodiment, when the terminal apparatus 7 of a general user classified as a specific level accesses a page, it is possible to execute processing regarding the page and the like, acquire a result of the processing, and then allow the general user to alter the page.

Furthermore, according to this embodiment, when the terminal apparatus 7 accesses a page, it is possible to execute processing regarding the page and the like, acquire a result of the processing, and then alter management information corresponding to the page from the terminal apparatus 7.

Furthermore, according to this embodiment, when the terminal apparatus 7 accesses a page, it is possible to output the page that has undergone processing regarding the page and the like, the processing being deletion processing for deleting information from the page or alteration processing for altering information in the page.

Moreover, according to this embodiment, when the terminal apparatus 7 accesses a page, it is possible to receive a processing result regarding the page and the like, and output the processing result and the page. In this embodiment, the terminal apparatus 7 receives a page from the server apparatus 3, and receives a processing result from the information processing apparatus 6. However, in this embodiment, it is also possible that, as in the information system B in Embodiment 2, a page and a processing result that are output by the terminal apparatus 7 are transmitted from the information processing apparatus 6 to the terminal apparatus.

The software that realizes the information processing apparatus 6 in this embodiment is the following sort of program. Specifically, this program is a program for causing a computer capable of accessing a management information storage unit in which one or more pieces of management information each having user specifying information for specifying a user and page specifying information for specifying a page are stored, to function as: an access information receiving unit that receives access information having a user identifier and a page identifier for identifying a page that a user identified with the user identifier accessed; a management information determining unit that determines management information corresponding to the user identifier and the page identifier contained in the access information; an executing unit that acquires a processing result obtained by executing processing corresponding to the management information determined by the management information determining unit; a processing result transmitting unit that transmits the processing result acquired by the executing unit; a page alteration instruction receiving unit that, after transmission of the processing result, receives a page alteration instruction to alter a page identified with the page identifier, the page alteration instruction being input to a terminal apparatus of a user identified with the user identifier; and a page alteration processing unit that performs page alteration processing for altering the page corresponding to the page alteration instruction.

Figure 41:
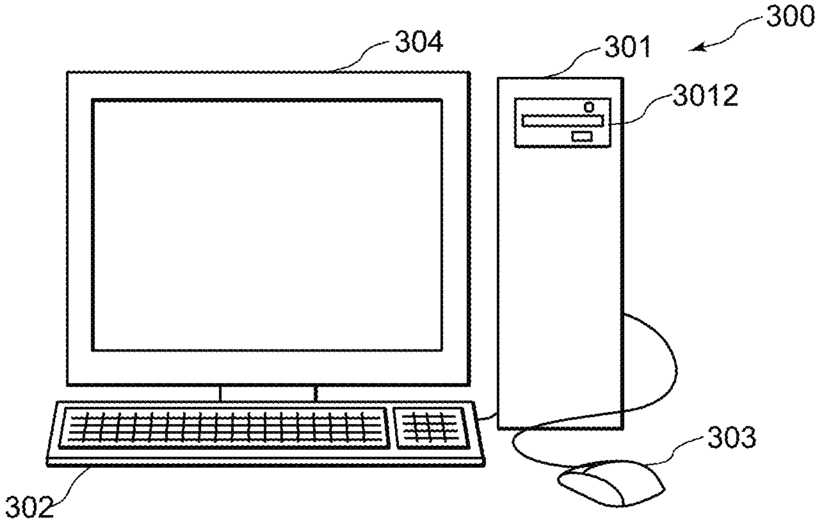
FIG. 41 is a schematic view of a computer system in the above-mentioned embodiments.
Figure 42:
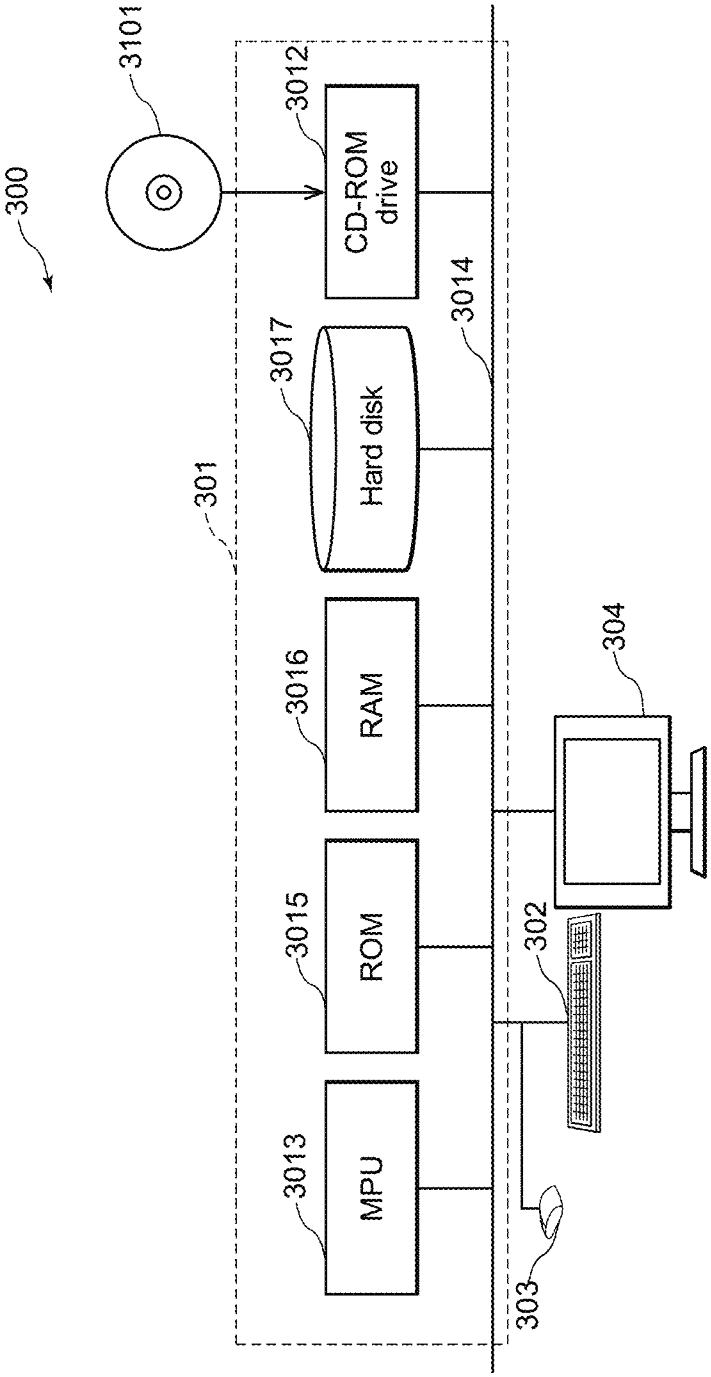
FIG. 42 is a block diagram of the computer system in the embodiments.

FIG. 41 shows the external appearance of a computer that executes the programs described in this specification to realize the information processing apparatus 1, the terminal apparatus 2, and the like in the foregoing various embodiments. The foregoing embodiments may be realized using computer hardware and a computer program executed thereon. FIG. 41 is a schematic view of a computer system 300. FIG. 42 is a block diagram of the system 300.

In FIG. 41, the computer system 300 includes a computer 301 including a CD-ROM drive 3012, a keyboard 302, a mouse 303, and a monitor 304.

In FIG. 42, the computer 301 includes the CD-ROM drive 3012, an MPU 3013, a bus 3014, a ROM 3015, a RAM 3016, and a hard disk 3017. In the ROM 3015, a program such as a boot up program is stored. The RAM 3016 is connected to the MPU 3013 and is a memory in which a command of an application program is temporarily stored and a temporary storage area is provided. In the hard disk 3017, typically, an application program, a system program, and data are stored. Although not shown, the computer 301 may further include a network card that provides connection to a LAN.

The programs for causing the computer system 300 to execute the functions of the information processing apparatus 1 and the like in the foregoing embodiments may be stored in a CD-ROM 3101 that is inserted into the CD-ROM drive 3012, and be transmitted to the hard disk 3017. Alternatively, the programs may be transmitted via a network (not shown) to the computer 301 and stored in the hard disk 3017. At the time of execution, the programs are loaded into the RAM 3016. The programs may be loaded from the CD-ROM 3101, or directly from a network.

The programs do not necessarily have to include, for example, an operating system (OS) or a third party program to cause the computer 301 to execute the functions of the information processing apparatus 1 and the like in the foregoing embodiments. The programs may only include a command portion to call an appropriate module in a controlled mode and obtain desired results. The manner in which the computer system 300 operates is well known, and thus a detailed description thereof has been omitted.

It should be noted that, in the program, in a step of transmitting information, a step of receiving information, or the like, processing that is performed by hardware, for example, processing performed by a modem or an interface card in the transmitting step (processing that can be performed only by hardware) is not included.

Furthermore, the computer that executes the programs may be a single computer, or may be multiple computers. That is to say, centralized processing may be performed, or distributed processing may be performed.

Furthermore, in the foregoing embodiments, it would be appreciated that two or more communication units in one device may be physically implemented by one medium.

In the foregoing embodiments, each process may be realized as centralized processing using a single apparatus, or may be realized as distributed processing using multiple apparatuses.

The present invention is not limited to the embodiment set forth herein. Various modifications are possible within the scope of the present invention.

INDUSTRIAL APPLICABILITY

As described above, the information processing apparatus according to the present invention has an effect that, when a terminal apparatus accesses a page, it is possible to execute processing regarding the page and the like, and provide a result of the processing to the terminal apparatus, and thus this apparatus is useful as a server and the like.

The invention claimed is:

1. An information processing apparatus comprising:

a management information storage unit in which pieces of management information each having user specifying information for specifying a user, page specifying information for specifying a page managed by a server outside the information processing apparatus and a processing identifier for identifying processing are stored, wherein the pieces of management information comprise a first management information for a first user specified by a first user specifying information and a second management information for a second user specified by a second user specifying information, and processing identified in the first management information is different from processing identified in the second management information;

an access information receiving unit that receives access information having a user identifier and a page identifier for identifying a page that a user identified with the user identifier accessed;

a management information determining unit that determines management information corresponding to the user identifier and the page identifier contained in the access information;

an executing unit that acquires a processing result obtained by executing processing which is identified by the processing identifier included in the management information determined by the management information determining unit;

a processing result transmitting unit that transmits the processing result acquired by the executing unit to a terminal apparatus that has accessed to the page; and a page alteration instruction receiving unit that, after transmission of the processing result, receives, from the terminal apparatus, a page alteration instruction to alter a page identified with the page identifier, the page alteration instruction being input to the terminal apparatus, wherein:

when the user is identified as an administrator of the page, the executing unit acquires the processing result of at least one processing of acquiring user information on all other users who are visiting the page that the user is currently being accessed, or performing statistical processing on access information to or operation information on the page that the user is currently being accessed, the processing result transmitting unit transmits the processing result of the at least one processing to the terminal apparatus of the user identified as the administrator to be display on the terminal apparatus of the user identified as the administrator, and after transmission of the processing result of the at least one processing, the page alteration instruction receiving unit receives the page alteration instruction from the terminal apparatus of the user identified as the administrator.

2. The information processing apparatus according to claim 1, further comprising:

a user information storage unit in which pieces of user information each having a user identifier for identifying a user and a user type identifier for specifying a type of the user are stored, wherein:

the user specifying information contains the user type identifier of the user, the user type identifier comprises administrator flag information indicating whether the user is the administrator, and the management information determining unit determines management information corresponding to a user type identifier that is paired with the user identifier contained in the access information and the page identifier contained in the access information.

3. The information processing apparatus according to claim 1, wherein the user type identifier contains level information for identifying a level of a general user other than the administrator.

4. The information processing apparatus according to claim 1, wherein the process identified in the processing identifier of each of the pieces of management information further comprises transmitting a message from the user to other users who satisfy a predetermined condition and are visiting the page that the user is currently being accessed.

5. The information processing apparatus according to claim 1, further comprising:

a page alteration processing unit that performs page alteration processing for altering the page corresponding to the page alteration instruction, wherein:

after the page alteration processing is performed, when a general user other than the administrator accesses the page, an altered page generated by performing the page alteration processing on the page is output to a terminal apparatus of the general user other than the administrator.

6. The information processing apparatus according to claim 5, wherein the page alteration processing includes one or at least two of addition processing for adding information to the page, deletion processing for deleting information from the page, and alteration processing for altering information in the page.

7. The information processing apparatus according to claim 5, wherein:

the page alteration instruction has a user type identifier, the user type identifier comprises administrator flag information indicating whether the user is the administrator, and the page alteration processing unit performs the page alteration processing in association with the user type identifier contained in the page alteration instruction.

8. The information processing apparatus according to claim 5, further comprising:

an alteration management information storage unit in which one or more pieces of alteration management information each having page alteration information and page specifying information are stored, the page alteration information being information corresponding to the page alteration processing and being information for altering the content of the page, wherein the page alteration processing unit configures page alteration information corresponding to the page alteration instruction, and accumulates alteration management information having the page alteration information and the page specifying information for specifying a page, in the alteration management information storage unit, and the executing unit includes a page alteration information acquiring part that acquires a processing result that is page alteration information that is paired with the page specifying information corresponding to the page identifier contained in the access information received by the access information receiving unit.

9. The information processing apparatus according to claim 8, wherein the alteration management information further has a user type identifier, the user type identifier comprises administrator flag information indicating whether the user is the administrator, and the page alteration information acquiring part acquires a processing result that is page alteration information that is paired with the page specifying information corresponding to the page identifier contained in the access information received by the access information receiving unit and the user type identifier corresponding to the user identifier contained in the access information received by the access information receiving unit.

10. The information processing apparatus according to claim 5, further comprising:

a management information alteration instruction receiving unit that receives a management information alteration instruction, which is an instruction to alter management information in the management information storage unit and is an instruction having a page identifier; and a management information alteration unit that alters the management information corresponding to the page identifier contained in the management information alteration instruction according to the management information alteration instruction.

11. A terminal apparatus comprising:

a terminal storage unit in which a user identifier is stored;

a terminal accepting unit that accepts a page identifier;

a page acquiring unit that acquires a page using the page identifier accepted by the terminal accepting unit;

a terminal access information acquiring unit that acquires access information having the user identifier in the terminal storage unit and the page identifier accepted by the terminal accepting unit, in response to the page acquiring unit acquiring a page;

a terminal transmitting unit that transmits the access information acquired by the terminal access information acquiring unit to the information processing apparatus according to claim 5;

a terminal receiving unit that receives a processing result from the information processing apparatus, in response to the terminal transmitting unit transmitting access information; and a terminal output unit that outputs the processing result received by the terminal receiving unit and the page acquired by the page acquiring unit, wherein:

the user identifier in the terminal storage unit comprises administrator flag information indicating that a user of the terminal apparatus is an administrator of the page, the processing unit receives processing result of at least one processing of acquiring user information on all other users who are visiting the page that the user is currently being accessed, or performing statistical processing on access information to or operation information on the page that the user is currently being accessed, performed by the information processing apparatus, and the terminal output unit displays the processing result of at least one processing, after the processing result of at least one processing is displayed, the terminal accepting unit accepts a page alteration instruction, and the terminal transmitting unit transmits the page alteration instruction to the information processing apparatus.

12. The terminal apparatus according to claim 11, wherein embedded information for accessing the information processing apparatus is embedded in the page acquired by the page acquiring unit, the terminal access information acquiring unit acquires the embedded information from the page, and the terminal transmitting unit transmits the access information acquired by the terminal access information acquiring unit to the information processing apparatus, using the embedded information.

13. The information processing apparatus according to claim 5, wherein the page alteration processing includes deletion processing for deleting information from the page.

14. The information processing apparatus according to claim 5, wherein the page alteration processing comprises allowing or prohibiting the general user to input a comment on the page depending on the user identifier of the general user.

15. An information processing method realized using a management information storage unit in which pieces of management information each having user specifying information for specifying a user, page specifying information for specifying a page managed by a server outside a computer on which the information processing method is executed and a processing identifier for identifying processing are stored, an access information receiving unit, a management information determining unit, an executing unit, a processing result transmitting unit, and a page alteration instruction receiving unit, wherein the pieces of management information comprise a first management information for a first user specified by a first user specifying information and a second management information for a second user specified by a second user specifying information, and processing identified in the first management information is different from processing identified in the second management information, comprising:

an access information receiving step of the access information receiving unit receiving access information having a user identifier and a page identifier for identifying a page that a user identified with the user identifier accessed;

a management information determining step of the management information determining unit determining management information corresponding to the user identifier and the page identifier contained in the access information;

an executing step of the executing unit acquiring a processing result obtained by executing processing which is identified by the processing identifier included in the management information determined in the management information determining step;

a processing result transmitting step of the processing result transmitting unit transmitting the processing result acquired in the executing step to a terminal apparatus that has accessed to the page; and a page alteration instruction receiving step of the page alteration instruction receiving unit, after transmission of the processing result, receiving, from the terminal apparatus, a page alteration instruction to alter a page identified with the page identifier, the page alteration instruction being input to the terminal apparatus, wherein:

as a result that the user is identified as an administrator of the page, the executing unit acquires the processing result of at least one processing of acquiring user information on all other users who are visiting the page that the user is currently being accessed, or performing statistical processing on access information to or operation information on the page that the user is currently being accessed, the processing result transmitting unit transmits the processing result of the at least one processing to the terminal apparatus of the user identified as the administrator to be display on the terminal apparatus of the user identified as the administrator, and after transmission of the processing result of the at least one processing, the page alteration instruction receiving unit receives the page alteration instruction from the terminal apparatus of the user identified as the administrator.

16. The information processing method according to claim 15, wherein the process identified in the processing identifier of each of the pieces of management information further comprises transmitting a message from the user to other users who satisfy a predetermined condition and are visiting the page that the user is currently being accessed.

17. The information processing method according to claim 15, wherein:

the information processing method is realized further using a page alteration processing unit, and the information processing method further comprises:

a page alteration processing step of the page alteration processing unit performing page alteration processing for altering the page corresponding to the page alteration instruction, wherein after the page alteration processing is performed, when a general user other than the administrator accesses the page, an altered page generated by performing the page alteration processing on the page is output to a terminal apparatus of the general user other than the administrator.

18. The information processing method according to claim 17, wherein the page alteration processing includes deletion processing for deleting information from the page.

19. The information processing method according to claim 17, wherein the page alteration processing comprises allowing or prohibiting the general user to input a comment on the page depending on the user identifier of the general user.

* * * * *